US012507650B2

(12) United States Patent
Marks et al.

(10) Patent No.: US 12,507,650 B2
(45) Date of Patent: Dec. 30, 2025

(54) OILSEED PLANTS HAVING REDUCED POD SHATTER

(71) Applicants: Regents of the University of Minnesota, Minneapolis, MN (US); The Board of Trustees of Illinois State University, Normal, IL (US)

(72) Inventors: Michael David Marks, Roseville, MN (US); John C. Sedbrook, Bloomington, IL (US); Ratan Chopra, Minneapolis, MN (US); Maliheh Esfahanian, Bloomington, IL (US)

(73) Assignees: Regents of the University of Minnesota, Minneapolis, MN (US); The Board of Trustees of Illinois State University, Normal, IL (US)

( * ) Notice: Subject to any disclaimer, the term of this patent is extended or adjusted under 35 U.S.C. 154(b) by 281 days.

(21) Appl. No.: 18/137,263

(22) Filed: Apr. 20, 2023

(65) Prior Publication Data
US 2024/0065193 A1   Feb. 29, 2024

Related U.S. Application Data

(62) Division of application No. 16/104,478, filed on Aug. 17, 2018, now Pat. No. 11,707,029.

(60) Provisional application No. 62/547,684, filed on Aug. 18, 2017.

(51) Int. Cl.
| C12N 15/82 | (2006.01) |
| A01H 6/20 | (2018.01) |
| C07K 14/415 | (2006.01) |
| C12N 9/24 | (2006.01) |

(52) U.S. Cl.
CPC ............ *A01H 6/20* (2018.05); *C07K 14/415* (2013.01); *C12N 9/2402* (2013.01); *C12N 15/8213* (2013.01); *C12N 15/8266* (2013.01); *C12Y 302/01015* (2013.01); *C12N 9/24* (2013.01)

(58) Field of Classification Search
None
See application file for complete search history.

(56) References Cited

U.S. PATENT DOCUMENTS

| 11,337,391 B2 | 5/2022 | Marks et al. |
| 11,396,657 B2 | 7/2022 | Marks et al. |
| 11,408,008 B2 | 8/2022 | Marks et al. |
| 11,707,029 B2 | 7/2023 | Marks et al. |
| 12,221,612 B2 | 2/2025 | Marks et al. |
| 2005/0120417 A1 | 6/2005 | Yanofsky et al. |
| 2008/0160530 A1 | 7/2008 | Li |
| 2014/0351967 A1* | 11/2014 | Laga .................. C07K 14/415 536/23.6 |
| 2015/0143573 A1 | 5/2015 | Denolf et al. |
| 2017/0051299 A1 | 2/2017 | Fabijanski et al. |
| 2019/0053457 A1 | 2/2019 | Marks et al. |
| 2019/0053458 A1 | 2/2019 | Marks et al. |
| 2020/0131523 A1 | 4/2020 | Marks et al. |
| 2020/0308596 A1 | 10/2020 | Marks et al. |
| 2020/0370062 A1 | 11/2020 | Marks et al. |

FOREIGN PATENT DOCUMENTS

| WO | WO 2000/036114 | 6/2000 |
| WO | WO 2006/052912 | 5/2006 |
| WO | WO 2013/112578 | 8/2013 |
| WO | WO 2017/004375 | 1/2017 |
| WO | WO 2017/117633 | 7/2017 |
| WO | WO 2018/140782 | 8/2018 |

OTHER PUBLICATIONS

Braatz, Janina, et al. "The effect of Indehiscent point mutations on silique shatter resistance in oilseed rape (*Brassica napus*)." Theoretical and Applied Genetics 131 (2018): 959-971. (Year: 2018).*
Sedbrook, John C., Winthrop B. Phippen, and M. David Marks. "New approaches to facilitate rapid domestication of a wild plant to an oilseed crop: example pennycress (*Thlaspi arvense* L.)." Plant Science 227 (2014): 122-132. (Year: 2014).*
Bai et al., "The Biochemistry of Headgroup Exchange During Triacylglycerol Synthesis in Canola," The Plant Journal, 103(1):83-94, Jan. 2020.
Ballester et al., "Shattering fruits: variations on a dehiscent theme," Curr. Opin. Plant Biology, Feb. 2017, 35:68-75.
Batsale et al., "Biosynthesis and Functions of Very-Long-Chain Fatty Acids in the Responses of Plants to Abiotic and Biotic Stresses," Cells, May 21, 2021, 10:1284, 26 pages.
Baud et al., "Physiological and developmental regulation of seed oil production," Prog Lipid Res., 49(3):235-49, Jul. 2010.
Belide et al., "Modification of seed oil composition in *Arabidopsis* by artificial microRNA-mediated gene silencing," Frontiers in plant science, 3:168, Jul. 2012.
Bell, "Factors affecting the nutritional value of canola meal: a review," Canadian Journal of Animal Science, 73(4):679-697, Dec. 1993.
Bennett et al., "Morphogenesis in pinoid mutants of *Arabidopsis thaliana*," Plant Journal, Oct. 1995, 8(4):505-520.
Blacklock et al., "Substrate specificity of *Arabidopsis* 3-ketoacyl-CoA synthases," Biochem. Biohpys. Res. Communications, Jun. 5, 2006, 346(2):583-590.
Blande et al. (GenBank Sequence Accession No. GEVK01020461.1, Published Nov. 4, 2016).
Bligh et al., "A rapid method of total lipid extraction and purification," Canadian Journal of Biochemistry and Physiology, 37(8):911-917, Aug. 1959.

(Continued)

*Primary Examiner* — Weihua Fan
(74) *Attorney, Agent, or Firm* — Fish & Richardson P.C.

(57) ABSTRACT

This document relates to materials and methods for domesticating oilseed (e.g., pennycress) plants. For example, oilseed plants having reduced seedpod shatter, as well as materials and methods for making and using oilseed plants having reduced seedpod shatter are provided.

14 Claims, 34 Drawing Sheets

Specification includes a Sequence Listing.

(56) References Cited

OTHER PUBLICATIONS

Boateng et al., "Producing stable pyrolysis liquids from the oil-seed presscakes of mustard family plants: Pennycress (*Thlaspi arvense* L.) and Camelina (*Camelina sativa*)," Energy & Fuels, 24(12):6624-6632, Nov. 2010.
Britt, "From stinkweed to oilseed," Nat. Food, 1:24-25, Jan. 2020.
Chopra et al., "Identification and stacking of crucial traits required for the domestication of pennycress," Nat. Food, 1:84-91, Jan. 2020.
Chopra et al., "The adaptable use of Brassica NIRS calibration equations to identify pennycress variants to facilitate the rapid domestication of a new winter oilseed crop," Industrial Crops and Products, 128:55-61, Feb. 2019.
Chopra et al., "Transcriptome profiling and validation of gene based single nucleotide polymorphisms (SNPs) in sorghum genotypes with contrasting responses to cold stress," BMC Genomics, 16(1):1040, Dec. 2015.
Chopra et al., "Translational genomics using *Arabidopsis* as a model enables the characterization of pennycress genes through forward and reverse genetics," The Plant Journal, 96(6):1093-1105, Dec. 2018.
Claver et al., "Functional analysis of β-ketoacyl-CoA synthase from biofuel feedstock Thlaspi arvense reveals differences in the triacylglycerol biosynthetic pathway among *Brassicaceae*," Plant Mol. Biology, 104(3):283-296, Aug. 1, 2020.
Claver et al., "Identification of target genes and processes involved in erucic acid accumulation during seed development in the biodiesel feedstock Pennycress (*Thlaspi arvense* L.)," Journal of plant physiology, 208:7-16, Jan. 2017.
Crevillén et al., "Epigenetic reprogramming that prevents transgenerational inheritance of the vernalized state," Nature, 515(7528):587-90, Nov. 2014.
Dorn et al., "A draft genome of field pennycress (*Thlaspi arvense*) provides tools for the domestication of a new winter biofuel crop," DNA Research, Apr. 2015, 22(2):121-131.
Dorn et al., "De novo assembly of the pennycress (*Thlaspi arvense*) transcriptome provides tools for the development of a winter cover crop and biodiesel feedstock," The Plant Journal, 75(6):1028-38, Sep. 2013.
Downey et al., "Genetic control of fatty acid biosynthesis in rapeseed (*Brassica napus* L.)," Journal of the American Oil Chemists' Society, Jul. 41(7):475-8, Jul. 1964.
ENA Accession No. PRJEB46635, "Chromosome-level Thlaspi arvense genome provides new tools for translational research and for a newly domesticated cash cover crop of the cooler climates," dated Aug. 2, 2021, 2 pages.
Fauser et al., "Both CRISPR/C as-based nucleases and nickases can be used efficiently for genome engineering in *Arabidopsis thaliana*," Plant J., 79(2):348-359, Jul. 2014.
Ferrándiz et al., "Negative regulation of the Shatterproof genes by Fruitfull during *Arabidopsis* fruit development," Science, 289(5478):436-438, Jul. 2000.
Fourmann et al., "The two genes homologous to *Arabidopsis* FAE1 co-segregate with the two loci governing erucic acid content in *Brassica napus*," Theor. Appl. Genet., 96(6-7):852-8, May 1998.
GenBank Accession No. AAC49186.1, "beta-ketoacyl-CoA synthase [Simmondsia chinensis]," dated Oct. 31, 1995, 2 pages.
GenBank Accession No. AZNP01000000.1, "Thlaspi arvense cultivar MN106, whole genome shotgun sequencing project," dated Mar. 19, 2015, 1 page.
GenBank Accession No. KT223025.1, "Thlaspi arvense cultivar French 3-ketoacyl-CoA synthase (FAE1) mRNA, complete cds," Nov. 29, 2015, 2 pages.
GenBank Accession No. NP_195178.1, "3-ketoacyl-CoA synthase 18 [*Arabidopsis thaliana*]," dated Jan. 22, 2014, 2 pages.
Geng et al., "Genomic analysis of field pennycress (*Thlaspi arvense*) provides insights into mechanisms of adaptation to high elevation," BMC Biology, Jul. 22, 2021, 19:143, 14 pages.
Gigolashvili et al., "The R2R3-MYB transcription factor HAG1/MYB28 is a regulator of methionine-derived glucosinolate biosynthesis in *Arabidopsis thaliana*," Plant Journal, 51(2):247-261, Jul. 2007.
Girin et al., "Brassicaceae Indehiscent genes specify valve margin cell fate and repress replum formation," Plant J., 63(2):329-338, Jul. 2010.
Golebiowski et al., "Near infrared reflectance spectroscopy of oil in intact canola seed (*Brassica napus* L.). II. Association between principal components and oil content," Journal of Near Infrared Spectroscopy, 13(5):255-264, Oct. 2005.
Han et al., "Functional characterization of beta-ketoacyl-CoA synthase genes from *Brassica napus* L," Plant Mol. Biol., 46(2):229-39, May 2001.
Haslam et al., "Extending the story of very-long-chain fatty acid elongation," Plant Science, 210:93-107, Sep. 2013.
James et al., "Directed Tagging of the *Arabidopsis* Fatty Acid Elongationi (FAEI) Gene with the Maize Transposon Activator," The Plant Cell, 7:309-319, Mar. 1995.
Javidfar and Cheng, "Single locus, multiallelic inheritance of erucic acid content and linkage mapping of FAE1 gene in yellow mustard," Crop Science, 53(3):825-32, May 2013.
Joubes et al., "The VLCFA elongase gene family in *Arabidopsis thaliana*: phylogenetic analysis, 3D modelling and expression profiling," Plant Mol. Biol., May 9, 2008, 67(5):547-566.
Kafri et al., "The regulatory utilization of genetic redundancy through responsive backup circuits," Proc. Nat. Acad. Sci. USA, 103(31):11653-11658, Aug. 2006.
Kano-Murakami et al., "A rice homeotic gene, OSH1, causes unusual phenotypes in transgenic tobacco," FEBS Lett., 334(3):365-8, Nov. 1993.
Katavic et al., "Alteration of Seed Fatty Acid Composition by an Ethyl Methanesulfonate-induced Mutation in *Arabidopsis thaliana* Affecting Diacylglycerol Acyltransferase Activity," Plant Physiology, May 1995, 108(1):399-409.
Kim et al., "Toward production of jet fuel functionality in oilseeds: identification of FatB acyl-acyl carrier protein thioesterases and evaluation of combinatorial expression strategies in Camelina seeds," Journal of Experimental Botany, 66(14):4251-4265, May 2015.
Lassner et al., "A jojoba beta-Ketoacyl-CoA synthase cDNA complements the canola fatty acid elongation mutation in transgenic plants," Plant Cell, 8(2):281-292, Feb. 1996.
Liljegren et al., "Shatterproof MADS-box genes control seed dispersal in *Arabidopsis*," Nature, 404(6779):766-770, Apr. 2000.
Lu et al., "*Arabidopsis* Mutants Deficient in Diacylglycerol Acyltransferase Display Increased Sensitivity to Abscisic Acid, Sugars, and Osmotic Stress During Germination and Seedling Development," Plant Physiology, Jul. 2002, 129(3):1352-1358.
Lu et al., "Expression pattern of diacylglycerol acyltransferase-1, an enzyme involved in triacylglycerol biosynthesis, in *Arabidopsis thaliana*," Plant Mol. Biology, May 2003, 52(1):31-41.
McGinn et al., "Molecular tools enabling pennycress (*Thlaspi arvense*) as a model plant and oilseed cash cover crop," Plant Biotechnology Journal, 17(4):776-788, Apr. 2019.
Millar et al., "Very-long-chain fatty acid biosynthesis is controlled through the expression and specificity of the condensing enzyme," Plant Journal, Jul. 1997, 12(1):121-131.
Montero de Espinosa et al., "Plant oils: The perfect renewable resource for polymer science?!" European Polymer Journal, 47(5):837-852, May 2011.
Morineau et al., "Dual Fatty Acid Elongase Complex Interactions in *Arabidopsis*," PLoS One, Sep. 1, 2016, 11(9):e0160631, 20 pages.
Moser et al., "Composition and physical properties of cress (*Lepidium sativum* L.) and field pennycress (*Thlaspi arvense* L.) oils," Industrial Crops and Products, 30(2):199-205, Sep. 2009.
Moser et al., "Production and evaluation of biodiesel from field pennycress (*Thlaspi arvense* L.) oil," Energy & Fuels, 23(8):4149-4155, Jul. 2009.
Nunn et al., "Chromosome-level Thlaspi arvense genome provides new tools for translational research and for a newly domesticated cash cover crop of the cooler climates," bioRxiv, Aug. 1, 2021, 48 pages.

(56) References Cited

OTHER PUBLICATIONS

Phippen et al., "Soybean seed yield and quality as a response to field pennycress residue," Crop Science, 52(6):2767-2773, Nov. 2012.
Riu et al., "[Detection of erucic acid and glucosinolate in intact rapeseed by near-infrared diffuse reflectance spectroscopy]," Spectroscopy and Spectral Analysis, Dec. 2006, 26(12):2190-2192, (with English abstract).
Roeder et al., "The role of the Replumless homeodomain protein in patterning the *Arabidopsis* fruit," Curr. Biol., 13(18):1630-1635, Sep. 2003.
Rosas et al., "One-step, codominant detection of imidazolinone resistance mutations in weedy rice (*Oryza sativa* L.)," Electron. J. Biotechnol., 17:95-101, Mar. 2014.
Roscoe et al., "Mutations in the fatty acid elongation 1 gene are associated with a loss of β-ketoacyl-CoA synthase activity in low erucic acid rapeseed," FEBS letters, 492(1-2):107-11, Mar. 2001.
Routaboul et al., "The TAG1 locus of *Arabidopsis* encodes for a diacylglycerol acyltransferase," Plant Physiol Biochemistry, Nov. 1999, 37(11):831-840.
Sanyal et al., "Stearic sunflower oil as a sustainable and healthy alternative to palm oil. A review," Agron. Sustain. Development, May 17, 2017, 37:18, 11 pages.
Sedbrook et al., "New approaches to facilitate rapid domestication of a wild plant to an oilseed crop: example pennycress (*Thlaspi arvense* L.)," Plant Sci., 227:122-32, Oct. 2014.
Shen et al., "Resistance gene candidates identified by PCR with degenerate oligonucleotide primers map to clusters of resistance genes in lettuce," Mol. Plant Microbe Interactions, 11(8):815-823, Aug. 1998.
Sidhu et al., "Diode Array Near Infrared Spectrometer Calibrations for Composition Analysis of Single Plant Canola (*Brassica napus*) Seed," Applied Engineering in Agriculture, 30(1):69-76, Jan. 2014.
Steinert et al., "Highly efficient heritable plant genome engineering using Cas9 orthologues from *Streptococcus thermophilus* and *Staphylococcus aureus*," Plant J., 84:1295-305, Dec. 2015.
Tresch et al., "Inhibition of saturated very-long-chain fatty acid biosynthesis by mefluidide and perfluidone, selective inhibitors of 3-ketoacyl-CoA synthases," Phytochemistry, Apr. 2012, 76:162-171.
Van Gelderen et al., "An Indehiscent-Controlled Auxin Response Specifies the Separation Layer in Early *Arabidopsis* Fruit," Molecular Plant, Jun. 2016, 9:857-869.
Vogel et al., "Expression of the *Arabidopsis* Wrinkled 1 transcription factor leads to higher accumulation of palmitate in soybean seed," Plant Biotechnol. Journal, Jan. 17, 2019, 17(7):1369-1379.
Wang et al., "A functional genomics resource for *Brassica napus*: development of an EMS mutagenized population and discovery of FAE1 point mutations by Tilling," New Phytologist, Dec. 2008, 180(4):751-765.
Warwick et al., "The biology of Canadian weeds. 9. *Thlaspi arvense* L. (updated)," Canadian Journal of Plant Science, 82(4):803-823, Oct. 2002.
Wu et al., "Zero erucic acid trait of rapeseed (*Brassica napus* L.) results from a deletion of four base pairs in the fatty acid elongase 1 gene," Theoretical and applied genetics, 116(4):491-9, Feb. 2008.
Xie et al., "RNA-Guided Genome Editing in Plants Using a CRISPR-Cas System," Molecular Plant, Nov. 2013, 6(6):1975-1983.
Xin et al., "Mid-infrared spectral characteristics of lipid molecular structures in *Brassica carinata* seeds: relationship to oil content, fatty acid and glucosinolate profiles, polyphenols, and condensed tannins," J. Agric. Food Chem., 62(32):7977-7988, Aug. 2014.
Yang et al., "Comprehensive analysis of KCS gene family in Citrinae reveals the involvement of CsKCS2 and CsKCS11 in fruit cuticular wax synthesis at ripening," Plant Science, Sep. 2021, 310:110972, 11 pages.
Yu et al., "Modulation of brassinosteroid-regulated gene expression by Jumonji domain-containing proteins ELF6 and REF6 in *Arabidopsis*," Proceedings of the National Academy of Sciences, 105(21):7618-23, May 2008.
Zarhloul et al., "Breeding high-stearic oilseed rape (*Brassica napus*) with high- and low-erucic background using optimised promoter-gene constructs," Mol. Breeding, Sep. 2006, 18(3):241-251.
Zeng et al., "Transposable Element Insertion and Epigenetic Modification Cause the Multiallelic Variation in the Expression of FAE1 in Sinapis alba," Plant cell, Jun. 2014, 26:2648-2659.
Zou et al., "The *Arabidopsis thaliana* TAG1 mutant has a mutation in a diacylglycerol acyltransferase gene.," The Plant Journal, Sep. 1999, 19(6):645-653.
U.S. Appl. No. 16/480,881, filed Jul. 25, 2019, Michael David Marks, Issued as U.S. Pat. No. 11,396,657.
U.S. Appl. No. 16/104,318, filed Aug. 17, 2018, Michael David Marks, Issued as U.S. Pat. No. 11,337,391.
U.S. Appl. No. 16/969,434, filed Aug. 12, 2020, Michael David Marks, Published as U.S. Publication No. 2020/0370062.
U.S. Appl. No. 16/831,145, filed Mar. 26, 2020, Michael David Marks, Issued as U.S. Pat. No. 11,408,008.
Kadkol et al., "Evaluation of *Brassica* genotypes for resistance to shatter. I. Development of a laboratory test," Euphytica, Mar. 1984, 33:63-73.
Liljegren et al., "Control of fruit patterning in *Arabidopsis* by Indehiscent," Cell, Mar. 2004, 116(6):843-853.

\* cited by examiner

WT pennycress SPT
SEQ ID NO:1

ATGATATCACAAAGAGAAGAGAGAGAAGAGAAGAGAGTGATGGGAGATAAGAAATTGATTTCATCG
TCTTCTTCTATTGCCTCGGTTTACGATACTCGTAATAATAACAATCATCATCACCCACCGTCTTCC
TCCGACGAGATTTCTCAGTTTCTCCGGCATATTTTCGACCGTTCTTCTCCTCTCCCTTCTTACTAT
TCTCCGGCGACGATGACGACGGCGCAATCGGAGTGCACGGCGACCCACATGCAGACAACCCCCGG
AGCTTCGTTTCTCATCCGCCGTCTGACTCTGCGCTCCCGTCGAAGCGCCCCGCTGATTACTCTGAG
GTTTTAATAGGCTCCGCCGTTGGATCAGCCTCCGCCGTTGGATCAGGCTCAGCCCCGTGTTTTGGT
TTCTCCGGAGGTAATAACATTGCCCAAGGAAACAGCTCAGGGACTCGAGTTTCGTCTTCTTCCGTT
GGAGCTAGCGGGAATGACACCGACGAGTACGATTGCGAAAGCGAGtctctctctctatgtgca
tgttctaaaagttcccatctttgtctgtttcctgagaaaatgttatactgtgactttctctaacgg
atctgtactttcttttctcaccattcaagtgagcaaattaaatttgccttttttttctgtgtgtgt
gtttttttagtgaagtttgtgaatgttaataatgcacacagagtgtttgttgatttgcttgaatga
atcagGAAGGAGTAGAAGCTGTGGTTGATGATGATCTTCCCTCAAAGTCTGGTCCTTCTCGTAGC
TCATCAAAGCGATGCAGAGCTGCTGAAGTTCATAATTTGTCTGAAAAGgttttttatttgctcctt
gtttttgttttctctcccaaaatcacattccttttttactcagagattgatgtgatcttgttctgac
agAGGAGGAGAAGTAGGATCAACGAAAAAATGAAAGCTTTACAAAGTCTCATCCCAAATTCAAACA
AGgtaaaaatacatacaaatgctgaatcattctctcatttgtctcttgttattgtgtctgattata
taatgtccattgcaatgcgttgatgattggtgggaagACGGATAAGGCTTCAATGCTTGATGAAGC
TATAGAGTATCTGAAACAGCTTCAGCTTCAAGTCCAGgtcacaaaatatccattctcaaaaagata
tgatacattcacttttcccgaatcaatcttatgaacagattactctgtgttttgcagATGTTGACA
ATGAGGAATGGAATAAACTTGCATCCTCTGTGCTTACCTGGAACTACATTACACCCATTGCAACTC
TCTCAGGTTCGAGGGATGCCTCAAGAAGCAACCAATGATCATCTGCTTAATCACACCAACCAATTC
GGTTCGACCTCTAACGCACCTGAGATGATCAACACCGTGCCTTCCTCATACTCGTTGGAACCTTCC
GTCCGCAGTCACTTTGGACCTTTCCCTCTCCTTACTTCACACGCGgtgcgtggtttcataacacat
tttcaatctataaaccctagattcttgaaagctagtgttcttactagaaatttattgttttttcgt
aaagGAGATGAGTCGAGAAGGTGGACTAACTCATCACAGGTTGAGCATTGGTCATTCCAACACAAA
CTTAACCGgtaaagtcttcctgatttctgaattctcgtgaagaagttttttaagacattgacaatgt
taaaaatgttgcgacgtttgggtatttgcagGGGCACAAGCTGTGTTTAATGGACAAGAACAACCT
GACATAAAAGATCGACTTACTTGA

FIG. 2A

WT pennycress SPT
SEQ ID NO:2

MISQREEREEKRVMGDKKLISSSSSIASVYDTRNNNNHHHPPSSSDEISQFLRHIFDRSSPLPSYY
SPATMTTAAIGVHGDPHADNPRSFVSHPPSDSALPSKRPADYSEVLIGSAVGSASAVGSGSAPCFG
FSGGNNIAQGNSSGTRVSSSSVGASGNDTDEYDCESEEGVEAVVDDDLPSKSGPSRSSSKRCRAAE
VHNLSEKRRRSRINEKMKALQSLIPNSNKTDKASMLDEAIEYLKQLQLQVQMLTMRNGINLHPLCL
PGTTLHPLQLSQVRGMPQEATNDHLLNHTNQFGSTSNAPEMINTVPSSYSLEPSVRSHFGPFPLLT
SHAEMSREGGLTHHRLSIGHSNTNLTGAQAVFNGQEQPDIKDRLT

FIG. 2B modified pennycress SPT (spt-1)
SEQ ID NO:3

ATGATATCACAAAGAGAAGAGAGAGAAGAGAAGAGAGTGATGGGAGATAAGAAATTGATTTCATCG
TCTTCTTCTATTGCCTCGGTTTACGATACTCGTAATAATAACAATCATCATCACCCACCGTCTTCC
TCCGACGAGATTTCTCAGTTTCTC*T*GGCATATTTTCGACCGTTCTTCTCCTCTCCTTCTTACTAT
TCTCCGGCGACGATGACGACGGCGGCAATCGGAGTGCACGGCGACCCACATGCAGACAACCCCCGG
AGCTTCGTTTCTCATCCGCCGTCTGACTCTGCGCTCCCGTCGAAGCGCCCCGCTGATTACTCTGAG
GTTTTAATAGGCTCCGCCGTTGGATCAGCCTCCGCCGTTGGATCAGGCTCAGCCCCGTGTTTTGGT
TTCTCCGGAGGTAATAACATTGCCCAAGGAAACAGCTCAGGGACTCGAGTTTCGTCTTCTTCCGTT
GGAGCTAGCGGGAATGACACCGACGAGTACGATTGCGAAAGCGAGgtctctctctctatgtgca
tgttctaaaagttcccatctttgtctgtttcctgagaaaatgttatactgtgactttctctaacgg
atctgtactttcttttctcaccattcaagtgagcaaattaaatttgcctttttttctgtgtgtgt
gttttttagtgaagtttgtaatgttaataatgcacacagagtgtttgttgatttgcttgaatga
aatcagGAAGGAGTAGAAGCTGTGGTTGATGATGATCTTCCCTCAAAGTCTGGTCCTTCTCGTAGC
TCATCAAAGCGATGCAGAGCTGCTGAAGTTCATAATTTGTCTGAAAAGgttttttatttgctcctt
gttttgttttctctcccaaaatcacattccttttactcagagattgatgtgatcttgttctgac
agAGGAGGAGAAGTAGGATCAACGAAAAAATGAAAGCTTTACAAAGTCTCATCCCAAATTCAAACA
AGgtaaaaatacatacaaatgctgaatcattctctcatttgtctcttgttattgtgtctgattata
taatgtccattgcaatgcgttgatgattggtgggaagACGGATAAGGCTTCAATGCTTGATGAAGC
TATAGAGTATCTGAAACAGCTTCAGCTTCAAGTCCAGgtcacaaaatatccattctcaaaaagata
tgatacattcactttcccgaatcaatcttatgaacagATTACTCTGTGTTTTGCAGATGTTGACA
ATGAGGAATGGAATAAACTTGCATCCTCTGTGCTTACCTGGAACTACATTACACCCATTGCAACTC
TCTCAGGTTCGAGGGATGCCTCAAGAAGCAACCAATGATCATCTGCTTAATCACACCAACCAATTC
GGTTCGACCTCTAACGCACCTGAGATGATCAACACCGTGCCTTCCTCATACTCGTTGGAACCTTCC
GTCCGCAGTCACTTTGGACCTTTCCCTCTCCTTACTTCACACGCGgtgcgtggtttcataacacat
tttcaatctataaaccctagattcttgaaagctagtgttcttactagaaatttattgttttttcgt
aaagGAGATGAGTCGAGAAGGTGGACTAACTCATCACAGGTTGAGCATTGGTCATTCCAACACAAA
CTTAACCGgtaaagtcttcctgatttctgaattctcgtgaagaagtttttaagacattgacaatgt
taaaaatgttgcgacgtttgggtatttgcagGGGCACAAGCTGTGTTTAATGGACAAGAACAACCT
GACATAAAGATCGACTTACTTGA

FIG. 2C modified pennycress SPT (spt-1)
SEQ ID NO:4

MISQREEREEKRVMGDKKLISSSSSIASVYDTRNNNNHHHPPSSSDEISQFL*W*HIFDRSSPLPSYY
SPATMTTAAIGVHGDPHADNPRSFVSHPPSDSALPSKRPADYSEVLIGSAVGSASAVGSGSAPCFG
FSGGNNIAQGNSSGTRVSSSSVGASGNDTDEYDCESEEGVEAVVDDDLPSKSGPSRSSSKRCRAAE
VHNLSEKRRRSRINEKMKALQSLIPNSNKTDKASMLDEAIEYLKQLQLQVQMLTMRNGINLHPLCL
PGTTLHPLQLSQVRGMPQEATNDHLLNHTNQFGSTSNAPEMINTVPSSYSLEPSVRSHFGPFPLLT
SHAEMSREGGLTHHRLSIGHSNTNLTGAQAVFNGQEQPDIKDRLT

FIG. 2D

WT pennycress ALC
SEQ ID NO:5

ATGGGCAATCCCGACGACGGTGATCGTCTTCCTCCTCCATCTTCTTCCGACGAACTCTCGAGC
GTTCTCCGGCAGATTCTGTCCCGTGCCCCGATAACTCAACCTTCGTCGTCACCACCGAGGAGA
GTCGTTTCCTCCGCTGAAATGTTCGACCGGACCTTCCCTTTCGTTCCCGGCGGAGCGGTTTCT
TCCGCCGCCTATAAAGTCGCTGGCGAAGACAAATGTGCTTTCGAAAACAAGgtaagctaacat
ttttaagctgtcgagaaacttcactcgcttcgtttatgaattaagctaacatttctttgtaat
ggtaacaacactaaagAGAAATGGAGGAGCTAAACATCGAAATTCGTTGAAGAGAAACAATGA
TGCACAATTCCACAACTTGTCTGAAAAGgttctgtcttttaatcttctaaagattctcgattt
gagaaagaaaagcaattgtgattttaatttatagaatctgaaattatttgcagAGGAGGAGGA
GCAAGATCAACGAGAAAATGAAAGCTTTGCAGAAACTGATACCCAATTCCAACAAGgtaaatg
aaaaaagttggaatctttctacttctgaatacaatcgtgagaaacaccgttatgcttttgttt
gtttgtttgtagACTGATAAAGCCTCAATGCTCGATGAAGCTATAGAGTATATGAAGCAGCTT
CAACTTCAAGTGCAGgttttggctttactaagatcatatacaaccaaattataatttttgt
aaaactcagcgcttatttgatcatacaatggataatgcagACTTTAGCAGTCATGAATGGTTT
AGGCCTAA*ACCCAA*TGCGATTACCACCAACACAG*ACAAGGATCAATGAGGCCTTACACATGCA
GACTCTGCTTGGCGGTTCTCACTCGCTTGTTCACCGTGAACCACCCGAAGCAAGTCAAGAAAT
GTGCTTTTCCGCTGCGGCTCGTCTTTAA

FIG. 3A

WT pennycress ALC
SEQ ID NO:6

MGNPDDGDRLPPPSSSDELSSVLRQILSRAPITQPSSSPPRRVVSSAEMFDRTFPFVPGGAVS
SAAYKVAGEDKCAFENKRNGGAKHRNSLKRNNDAQFHNLSEKRRRSKINEKMKALQKLIPNSN
KTDKASMLDEAIEYMKQLQLQVQTLAVMNGLGLNPMRLPPTQTRINEALHMQTLLGGSHSLVH
REPPEASQEMCFSAAARL

FIG. 3B modified pennycress ALC (alc-1)
SEQ ID NO:7

ATGGGCAATCCCGACGACGGTGATCGTCTTCCTCCTCCATCTTCTTCCGACGAACTCTCGAGC
GTTCTCCGGCAGATTCTGTCCCGTGCCCCGATAACTCAACCTTCGTCGTCACCACCGAGGAGA
GTCGTTTCCTCCGCTGAAATGTTCGACCGGACCTTCCCTTTCGTTCCCGGCGGAGCGGTTTCT
TCCGCCGCCTATAAAGTCGCTGGCGAAGACAAATGTGCTTTCGAAAACAAGgtaagctaacat
ttttaagctgtcgagaaacttcactcgcttcgtttatgaattaagctaacatttctttgtaat
ggtaacaacactaaagAGAAATGGAGGAGCTAAACATCGAAATTCGTTGAAGAGAAACAATGA
TGCACAATTCCACAACTTGTCTGAAAAGgttctgtcttttaatcttctaaagattctcgattt
gagaaagaaaagcaattgtgattttaatttatagaatctgaaattatttgcagAGGAGGAGGA
GCAAGATCAACGAGAAAATGAAAGCTTTGCAGAAACTGATACCCAATTCCAACAAGgtaaatg
aaaaaagttggaatctttctacttctgaatacaatcgtgagaaacaccgttatgcttttgttt
gtttgtttgtagACTGATAAAGCCTCAATGCTCGATGAAGCTATAGAGTATATGAAGCAGCTT
CAACTTCAAGTGCAGgttttggctttactaagatcatatacaaccaaattataatttttttgt
aaaactcagcgcttatttgatcatacaatggataatgcagACTTTAGCAGTCATGAATGGTTT
AGGCCTAAacccaatgcgTCTCATTACCACCAACACAGACAAGGATCAATGAGGCCTTACACA
TGCAGACTCTGCTTGGCGGTTCTCACTCGCTTGTTCACCGTGAACCACCCGAAGCAAGTCAAG
AAATGTGCTTTTCCGCTGCGGCTCGTCTTTAA

FIG. 3C modified pennycress ALC (alc-1)
SEQ ID NO:8

MGNPDDGDRLPPPSSSDELSSVLRQILSRAPITQPSSSPPRRVVSSAEMFDRTFPFVPGGAVS
SAAYKVAGEDKCAFENKRNGGAKHRNSLKRNNDAQFHNLSEKRRRSKINEKMKALQKLIPNSN
KTDKASMLDEAIEYMKQLQLQVQTLAVMNGLGL*IS*LPPTQTRINEALHMQTLLGGSHSLVHRE
PPEASQEMCFSAAARL

FIG. 3D

WT pennycress IND
SEQ ID NO:9

ATGAATTGGAACAAACCTAATGATCTCATCACACAAGAATACCCCTTTCTCCACGATCCTCAT
CTCATGATAGATCCACCTCCCGAAACCCTAAGTCATTTCCAGCCCCGCCGACACTTTTCTCC
GGTCACGGAGGGGAGGAAGAAGAAGAAGAAGATAATGAAGAGGAAGAGATGGATGCGATGAAG
GAGATGCAGTACACGATCGCTGCCATGCAGCCCGTGGACATCGATCCAGCCACCGTTCCTAAA
CCGAACCGCCGTAACGTAAGGGTAAGCGACGACACTCAGACGGTGGTGGCTCGTCGGCGTCGA
GAAAGATAAGCGAGAAGATCCGAATATTGAAGAGGATGGTGCCAGGCGGTGCGAAGATGGAC
ACAGCCTCCATGCTCGACGAAGCCATCCGTTATACCAAGTTCTTGAAACGGCAGGTGAAGCTT
CTTCAGCCTCACTCTCAGCTTGGAGCTCCTATGTCTGACCCCTCTTGCCTTTGTTATTACCAC
AACTCCCAAACCTAA

WT pennycress IND
SEQ ID NO:69

ATGTTTGGCTCAAAAGCAGATCCACCCATAACCCCAATAGTCATGATGGAGCCTCAACCTCAT
CATCTCCTCATGAATTGGAACAAACCTAATGATCTCATCACACAAGAATACCCCTTTCTCCAC
GATCCTCATCTCATGATAGATCCACCTCCCGAAACCCTAAGTCATTTCCAGCCCCGCCGACA
CTTTTCTCCGGTCACGGAGGGGAGGAAGAAGAAGAAGAAGATAATGAAGAGGAAGAGATGGAT
GCGATGAAGGAGATGCAGTACACGATCGCTGCCATGCAGCCCGTGGACATCGATCCAGCCACC
GTTCCTAAACCGAACCGCCGTAACGTAAGGGTAAGCGACGACACTCAGACGGTGGTGGCTCGT
CGGCGTCGAGAAAGATAAGCGAGAAGATCCGAATATTGAAGAGGATGGTGCCAGGCGGTGCG
AAGATGGACACAGCCTCCATGCTCGACGAAGCCATCCGTTATACCAAGTTCTTGAAACGGCAG
GTGAAGCTTCTTCAGCCTCACTCTCAGCTTGGAGCTCCTATGTCTGACCCCTCTTGCCTTTGT
TATTACCACAACTCCCAAACCTAAATGTTTGGCTCAAAAGCAGATCCACCCATAACCCCAATA
GTCATGATGGAGCCTCAACCTCATCATCTCCTCATGAATTGGAACAAACCTAATGATCTCATC
ACACAAGAATACCCCTTTCTCCACGATCCTCATCTCATGATAGATCCACCTCCCGAAACCCTA
AGTCATTTCCAGCCCCGCCGACACTTTTCTCCGGTCACGGAGGGGAGGAAGAAGAAGAAGAA
GATAATGAAGAGGAAGAGATGGATGCGATGAAGGAGATGCAGTACACGATCGCTGCCATGCAG
CCCGTGGACATCGATCCAGCCACCGTTCCTAAACCGAACCGCCGTAACGTAAGGGTAAGCGAC
GACACTCAGACGGTGGTGGCTCGTCGGCGTCGAGAAAGATAAGCGAGAAGATCCGAATATTG
AAGAGGATGGTGCCAGGCGGTGCGAAGATGGACACAGCCTCCATGCTCGACGAAGCCATCCGT
TATACCAAGTTCTTGAAACGGCAGGTGAAGCTTCTTCAGCCTCACTCTCAGCTTGGAGCTCCT
ATGTCTGACCCCTCTTGCCTTTGTTATTACCACAACTCCCAAACCTAA

FIG. 4A

WT pennycress IND
SEQ ID NO:10

MNWNKPNDLITQEYPFLHDPHLMIDPPPETLSHFQPPPTLFSGHGGEEEEEEDNEEEEMDAMK
EMQYTIAAMQPVDIDPATVPKPNRRNVRVSDDTQTVVARRRREKISEKIRILKRMVPGGAKMD
TASMLDEAIRYTKFLKRQVKLLQPHSQLGAPMSDPSCLCYYHNSQT

WT pennycress IND
SEQ ID NO:70

MFGSKADPPITPIVMMEPQPHHLLMNWNKPNDLITQEYPFLHDPHLMIDPPPETLSHFQPPPT
LFSGHGGEEEEEEDNEEEEMDAMKEMQYTIAAMQPVDIDPATVPKPNRRNVRVSDDTQTVVAR
RRREKISEKIRILKRMVPGGAKMDTASMLDEAIRYTKFLKRQVKLLQPHSQLGAPMSDPSCLC
YYHNSQT

FIG. 4B modified pennycress IND (ind-1)
SEQ ID NO:11

ATGAATTGGAACAAACCTAATGATCTCATCACACAAGAATACCCCTTTCTCCACGATCCTCAT
CTCATGATAGATCCACCTCCCGAAACCCTAAGTCATTTCCAGCCCCCGCCGACACTTTTCTCC
GGTCACGGAGGGGAGGAAGAAGAAGAAGAAGATAATGAAGAGGAAGAGATGGATGCGATGAAG
GAGATGCAGTACACGATCGCTGCCATGCAGCCCGTGGACATCGATCCAGCCACCGTT*T*CTAAA
CCGAACCGCCGTAACGTAAGGGTAAGCGACGACACTCAGACGGTGGTGGCTCGTCGGCGTCGA
GAAAAGATAAGCGAGAAGATCCGAATATTGAAGAGGATGGTGCCAGGCGGTGCGAAGATGGAC
ACAGCCTCCATGCTCGACGAAGCCATCCGTTATACCAAGTTCTTGAAACGGCAGGTGAAGCTT
CTTCAGCCTCACTCTCAGCTTGGAGCTCCTATGTCTGACCCTCTTGCCTTTGTTATTACCAC
AACTCCCAAACCTAA

FIG. 4C modified pennycress IND (ind-1)
SEQ ID NO:12

MNWNKPNDLITQEYPFLHDPHLMIDPPPETLSHFQPPPTLFSGHGGEEEEEEDNEEEEMDAMK
EMQYTIAAMQPVDIDPATV*S*KPNRRNVRVSDDTQTVVARRRREKISEKIRILKRMVPGGAKMD
TASMLDEAIRYTKFLKRQVKLLQPHSQLGAPMSDPSCLCYYHNSQT

FIG. 4D modified pennycress IND (ind-2)
SEQ ID NO:13

ATGAATTGGAACAAACCTAATGATCTCATCACACAAGAATACCCCTTTCTCCACGATCCTCAT
CTCATGATAGATCCACCTCCCGAAACCCTAAGTCATTTCCAGCCCCCGCCGACACTTTTCTCC
GGTCACGGAGGGGAGGAAGAAGAAGAAGAAGATAATGAAGAGGAAGAGATGGATGCGATGAAG
GAGATGCAGTACACGATCGCTGCCATGCAGCCCGTGGACATCGATCCAGCCACCGTTCCTAAA
CCGAACCACCGTAACGTAAGGGTAAGCGACGACACTCAGACGGTGGTGGCTCGTCGGCGTCGA
GAAAAGATAAGCGAGAAGATCCGAATATTGAAGAGGATGGTGCCAGGCGGTGCGAAGATGGAC
ACAGCCTCCATGCTCGACGAAGCCATCCGTTATACCAAGTTCTTGAAACGGCAGGTGAAGCTT
CTTCAGCCTCACTCTCAGCTTGGAGCTCCTATGTCTGACCCCTCTTGCCTTTGTTATTACCAC
AACTCCCAAACCTAA

FIG. 4E modified pennycress IND (ind-2)
SEQ ID NO:14

MNWNKPNDLITQEYPFLHDPHLMIDPPPETLSHFQPPPTLFSGHGGEEEEEEDNEEEEMDAMK
EMQYTIAAMQPVDIDPATVPKPNHRNVRVSDDTQTVVARRRREKISEKIRILKRMVPGGAKMD
TASMLDEAIRYTKFLKRQVKLLQPHSQLGAPMSDPSCLCYYHNSQT

FIG. 4F modified pennycress IND (ind-3; also named rps1-1)
SEQ ID NO:15

ATGAATTGGAACAAACCTAATGATCTCATCACACAAGAATACCCCTTTCTCCACGATCCTCAT
CTCATGATAGATCCACCTCCCGAAACCCTAAGTCATTTCCAGCCCCCGCCGACACTTTTCTCC
GGTCACGGAGGGGAGGAAGAAGAAGAAGAAGATAATGAAGAGGAAGAGATGGATGCGATGAAG
GAGATGCAGTACACGATCGCTGCCATGCAGCCCGTGGACATCGATCCAGCCACCGTTCCTAAA
CCGAACCGCCGTAACGTAAGGGTAAGCGACGACACTCAGACGGTGGTGACTCGTCGGCGTCGA
GAAAAGATAAGCGAGAAGATCCGAATATTGAAGAGGATGGTGCCAGGCGGTGCGAAGATGGAC
ACAGCCTCCATGCTCGACGAAGCCATCCGTTATACCAAGTTCTTGAAACGGCAGGTGAAGCTT
CTTCAGCCTCACTCTCAGCTTGGAGCTCCTATGTCTGACCCCTCTTGCCTTTGTTATTACCAC
AACTCCCAAACCTAA

FIG. 4G modified pennycress IND (ind-3; also named rps1-1)
SEQ ID NO:16

MNWNKPNDLITQEYPFLHDPHLMIDPPPETLSHFQPPPTLFSGHGGEEEEEEDNEEEEMDAMK
EMQYTIAAMQPVDIDPATVPKPNRRNVRVSDDTQTVVTRRRREKISEKIRILKRMVPGGAKMD
TASMLDEAIRYTKFLKRQVKLLQPHSQLGAPMSDPSCLCYYHNSQT

FIG. 4H

WT pennycress SHP1
SEQ ID NO:17

ATGGAAGAGGGTGGGAGTAGTCACGACGCAGAGAGTAGCAAGAAGATAGGGAGAGGGAAGATA
GAGATAAAGAGGATAGAGAACACAACGAATCGTCAAGTAACTTTCTGCAAACGACGCAATGGT
CTTCTCAAGAAAGCTTATGAGCTCTCTGTCTTGTGTGATGCCGAAGTTGCCCTCGTTATCTTC
TCCACTCGTGGCCGTCTCTATGAGTATGCCAACAACAGTGTGAAGGGTACAATTGAAAGGTAC
AAGAAAGCTTGTTCAGATGCCGTCAATCCCCCTCCGTCACCGAAGCTAATACTCAGTACTAT
CAGCAAGAAGCCTCTAAGCTTCGGAGGCAGATTCGAGACATTCAGAACTCAAACAGGCATATT
GTTGGGGAATCACTTGGTTCCTTGAACTTCAAGGAACTCAAAAACCTCGAAGGACGCCTTGAA
AAAGGAATTAGCCGCGTCCGATCCAAGAAGAATGAGTTGTTAGTGGCAGAGATTGAGTATATG
CAGAAGAGGGAAATGGATTTGCAACACGATAACATGTACCTGCGAGCTAAGATATCCGAAGGC
GTGAGGTTGAATCCGGAACAGCACGGATCGAGTGTGATACAAGGAACAGCGATTTACGAATCC
GGTGTGTCTTCTCATGATCAGTCGCAGCATTATAATCGGAACTATATTCCAGTGAACCTTCTT
GAACCAAATCAGCAATTCTCCGGTCAAGACCAACCTCCTCTTCAACTTGTTTAA

FIG. 5A

WT pennycress SHP1
SEQ ID NO:18

MEEGGSSHDAESSKKIGRGKIEIKRIENTTNRQVTFCKRRNGLLKKAYELSVLCDAEVALVIF
STRGRLYEYANNSVKGTIERYKKACSDAVNPPSVTEANTQYYQQEASKLRRQIRDIQNSRHI
VGESLGSLNFKELKNLEGRLEKGISRVRSKKNELLVAEIEYMQKREMDLQHDNMYLRAKISEG
VRLNPEQHGSSVIQGTAIYESGVSSHDQSQHYNRNYIPVNLLEPNQQFSGQDQPPLQLV

FIG. 5B modified pennycress SHP1 (shp1-1)
SEQ ID NO:19

ATGGAAGAGGGTGGGAATAGTCACGACGCAGAGAGTAGCAAGAAGATAGGGAGAGGGAAGATA
GAGATAAAGAGGATAGAGAACACAACGAATCGTCAAGTAACTTTCTGCAAACGACGCAATGGT
CTTCTCAAGAAAGCTTATGAGCTCTCTGTCTTGTGTGATGCCGAAGTTGCCCTCGTTATCTTC
TCCACTCGTGGCCGTCTCTATGAGTATGCCAACAACAGTGTGAAGGGTACAATTGAAAGGTAC
AAGAAAGCTTGTTCAGATGCCGTCAATCCCCCTCCGTCACCGAAGCTAATACTCAGTACTAT
CAGCAAGAAGCCTCTAAGCTTCGGAGGCAGATTCGAGACATTCAGAACTCAAACAGGCATATT
GTTGGGGAATCACTTGGTTCCTTGAACTTCAAGGAACTCAAAAACCTCGAAGGACGCCTTGAA
AAAGGAATTAGCCGCGTCCGATCCAAGAAGAATGAGTTGTTAGTGGCAGAGATTGAGTATATG
CAGAAGAGGGAAATGGATTTGCAACACGATAACATGTACCTGCGAGCTAAGATATCCGAAGGC
GTGAGGTTGAATCCGGAACAGCACGGATCGAGTGTGATACAAGGAACAGCGATTTACGAATCC
GGTGTGTCTTCTCATGATCAGTCGCAGCATTATAATCGGAACTATATTCCAGTGAACCTTCTT
GAACCAAATCAGCAATTCTCCGGTCAAGACCAACCTCCTCTTCAACTTGTTTAA

FIG. 5C modified pennycress SHP1 (shp1-1)
SEQ ID NO:20

MEEGGNSHDAESSKKIGRGKIEIKRIENTTNRQVTFCKRRNGLLKKAYELSVLCDAEVALVIF
STRGRLYEYANNSVKGTIERYKKACSDAVNPPSVTEANTQYYQQEASKLRRQIRDIQNSRHI
VGESLGSLNFKELKNLEGRLEKGISRVRSKKNELLVAEIEYMQKREMDLQHDNMYLRAKISEG
VRLNPEQHGSSVIQGTAIYESGVSSHDQSQHYNRNYIPVNLLEPNQQFSGQDQPPLQLV

FIG. 5D

WT pennycress SHP2
SEQ ID NO:21

ATGGAGGGTGGTGCGAGTAATGAAGTAGCAGAGAGCAGCAAGAAGATAGGGAGAGGGAAGATA
GAGATAAAGAGGATAGAGAATACTACGAATCGTCAAGTAACTTTCTGCAAACGACGCAATGGT
TTGCTCAAGAAAGCTTACGAGCTCTCCGTCTTGTGTGATGCGGAGGTTGCTCTCGTCATATTC
TCCACTCGAGGTCGTCTCTACGAGTACGCCAACAACAGTGTAAGAGGAACGATCGAAAGGTAC
AAGAAAGCTTGCTCCGACGCCGTGAATCCTCCTTCCGTCACCGAAGCTAATACTCAGTATTAT
CAGCAAGAGTCGTCGAAGCTACGGAGACAGATTCGAGACATTCAGAATCTGAACAGACACATT
CTTGGTGAGTCTCTTGGTTCCTTGAATCTCAAGGAACTAAAGAACCTCGAAGGTAGGCTTGAG
AAAGGCATCAGTCGCGTCCGCTCCAAGAAGCACGAGATGTTAGTTGCAGAGATAGAGTACATG
CAAAAAAGGGAAATCGAGCTGCAAAACGATAACATGTATCTCCGATCCAAGATTACGAAAGG
GCAGGAGTACAGCAGCAGGAATCGAGTGTGATACATCAAGGAACGGTTTACGAGTCGGGTGTA
TCGTCTTCTCATCAGACTGAGCAGTATAACCGGAGTTATATTCCGGTTAATCTGCTCGAACCA
AATCCGAATTCCTCCGACCAAGACCAACCACCTCTCCAACTTGTCTAA

FIG. 6A

WT pennycress SHP2
SEQ ID NO:22

MEGGASNEVAESSKKIGRGKIEIKRIENTTNRQVTFCKRRNGLLKKAYELSVLCDAEVALVIF
STRGRLYEYANNSVRGTIERYKKACSDAVNPPSVTEANTQYYQQESSKLRRQIRDIQNLNRHI
LGESLGSLNLKELKNLEGRLEKGISRVRSKKHEMLVAEIEYMQKREIELQNDNMYLRSKITER
AGVQQQESSVIHQGTVYESGVSSSHQTEQYNRSYIPVNLLEPNPNSSDQDQPPLQLV

FIG. 6B modified pennycress SHP2 (shp2-1)
SEQ ID NO:23

ATGGAGGGTGGTGCGAGTAATGAAGTAGCAGAGAGCAGCAAGAAGATAGGGAGAGGGAAGATA
GAGATAAAGAGGATAGAGAATACTACGAATCGTCAAGTAACTTTCTGCAAACGACGCAATGGT
TTGCTCAAGAAAGCTTACGAGCTCTCCGTCTTGTGTGATGCGGAGGTTACTCTCGTCATATTC
TCCACTCGAGGTCGTCTCTACGAGTACGCCAACAACAGTGTAAGAGGAACGATCGAAAGGTAC
AAGAAAGCTTGCTCCGACGCCGTGAATCCTCCTTCCGTCACCGAAGCTAATACTCAGTATTAT
CAGCAAGAGTCGTCGAAGCTACGGAGACAGATTCGAGACATTCAGAATCTGAACAGACACATT
CTTGGTGAGTCTCTTGGTTCCTTGAATCTCAAGGAACTAAAGAACCTCGAAGGTAGGCTTGAG
AAAGGCATCAGTCGCGTCCGCTCCAAGAAGCACGAGATGTTAGTTGCAGAGATAGAGTACATG
CAAAAAAGGGAAATCGAGCTGCAAAACGATAACATGTATCTCCGATCCAAGATTACGGAAAGG
GCAGGAGTACAGCAGCAGGAATCGAGTGTGATACATCAAGGAACGGTTTACGAGTCGGGTGTA
TCGTCTTCTCATCAGACTGAGCAGTATAACCGGAGTTATATTCCGGTTAATCTGCTCGAACCA
AATCCGAATTCCTCCGACCAAGACCAACCACCTCTCCAACTTGTCTAA

FIG. 6C modified pennycress SHP2 (shp2-1)
SEQ ID NO:24

MEGGASNEVAESSKKIGRGKIEIKRIENTTNRQVTFCKRRNGLLKKAYELSVLCDAEVTLVIF
STRGRLYEYANNSVRGTIERYKKACSDAVNPPSVTEANTQYYQQESSKLRRQIRDIQNLNRHI
LGESLGSLNLKELKNLEGRLEKGISRVRSKKHEMLVAEIEYMQKREIELQNDNMYLRSKITER
AGVQQQESSVIHQGTVYESGVSSSHQTEQYNRSYIPVNLLEPNPNSSDQDQPPLQLV

FIG. 6D

WT pennycress PID
SEQ ID NO:25

ATGTTACGGGAATCAGACGGTGAGATGAGCTTAGAGACGACGAACTCGCCGATTAGCAGCGGA
ACAGAGAGCTGCAGCAGTTTCAGCCGGTTATCTTTCGACGCGCCGCCGTCAACCACCGCGATT
ATCCCCGAGGAAGAGAGCCTTCTCTCTATTAAACCGCACCGATCCTCCGATTTCGCATACTCG
GAGATCCGACGGCGGCGGAAACAAGGCCTCACCTTCCGAGATTTTCGACTCATGCGTCGAATC
GGCGCCGGAGACATCGGGACCGTGTACTTGTGCCGTCTCGCCGGAGACGAAGAAGAGAGCCGG
AGCTCGTATTTCGCGATGAAAGTGGTGGACAAGAAGCGCTTGCGATGAAGAAGAAGATGCAC
AGAGCAGAGATGGAGAAGACGATTCTGAAGATGCTTGACCATCGTTTTGCCGACTCTTTAC
GCCGAGTTTGACGCATCGCATTTCTCTTGCATCGTCATGGAGTATTGCTCCGGCGGAGATTTG
CACTCCCTCCGTCACAAACAGCTCAACCGCAGATTCTCCCTTTCCTCCGCCAGATTTTACGCG
GCTGAAGTTCTTGTGGCGCTGGAATATCTACACATGCTGGGTATCATCTACAGAGATCTGAAG
CCTGAAAATATCTTAGTTAGATCGGACGGTCACATTATGCTCTCTGACTTTGATCTCTCCTTA
TGCTCCGACTCAATCGCAGCCGTTGAATCCTCCACATCTTCACCGGAGAATCAACCCCGTTCT
TCCCGGCGCCGACTCACTCGACTCTCTAGGATCTTCCACCGAGTCTTGCGGTCCAAAAAGGTT
CAGACGCTCGAACCGAACCGTCTCTTTGTTGCCGAACCGGTCACCGCTCGGTCCGGTTCGTTT
GTTGGTACGCATGAATACGTGGCACCAGAAGTCGCCTCAGGTGGGTCTCATGGAAATGCCGTT
GACTGGTGGGCCTTCGGAGTATTCCTCTACGAGATGATCTACGGCCGGACTCCATTCGCCGCG
CCGACGAATGACGTCATCCTTCGTAACATCGTGAAGAGACCGTTGAGTTTCCCGACCGATTCG
CCGTCGACGATGTTCGAGCTTCACGCGCGGGATTGATCTCCGGGTTGCTAACAAGGATCCG
AACAAACGACTCGGGTCACGGCGAGGCGCGGCGGAGGTTAAAGTGCATCCGTTTTTCAAAGGT
CTAAACTTTGCGCTCATTCGTACATTAACTCCGCCGGAGATTCCCTCCGAGGTCAGGATACCG
AAGAAATCGTCGACGTTCGGTGGTAGAGCTAGTAAACCAGCGGCGTTCGATTACTTTTGA

FIG. 7A

WT pennycress PID
SEQ ID NO:26

MLRESDGEMSLETTNSPISSGTESCSSFSRLSFDAPPSTTAIIPEEESLLSIKPHRSSDFAYS
EIRRRRKQGLTFRDFRLMRRIGAGDIGTVYLCRLAGDEEESRSSYFAMKVVDKEALAMKKKMH
RAEMEKTILKMLDHPFLPTLYAEFDASHFSCIVMEYCSGGDLHSLRHKQLNRRFSLSSARFYA
AEVLVALEYLHMLGIIYRDLKPENILVRSDGHIMLSDFDLSLCSDSIAAVESSTSSPENQPRS
SRRRLTRLSRIFHRVLRSKKVQTLEPNRLFVAEPVTARSGSFVGTHEYVAPEVASGGSHGNAV
DWWAFGVFLYEMIYGRTPFAAPTNDVILRNIVKRPLSFPTDSPSTMFELHARGLISGLLNKDP
NKRLGSRRGAAEVKVHPFFKGLNFALIRTLTPPEIPSEVRIPKKSSTFGGRASKPAAFDYF

FIG. 7B modified pennycress PID (pid-1)
SEQ ID NO:27

```
ATGTTACGGGAATCAGACGGTGAGATGAGCTTAGAGACGACGAACTCGCCGATTAGCAGCGGA
ACAGAGAGCTGCAGCAGTTTCAGCCGGTTATCTTTCGACGCGCCGCCGTCAACCACCGCGATT
ATCCCCGAGGAAGAGAGCCTTCTCTCTATTAAACCGCACCGATCCTCCGATTTCGCATACTCG
GAGATCCGACGGCGGCGGAAACAAGGCCTCACCTTCCGAGATTTTCGACTCATGCGTCGAATC
GGCGCCGGAGACATCGGGACCGTGTACTTGTGCCGTCTCGCCGGAGACGAAGAAGAGAGCCGG
AGCTCGTATTTCGCGATGAAAGTGGTGGACAAAGAAGCGCTTGCGATGAAGAAGAAGATGCAC
AGAGCAGAGATGGAGAAGACGATTCTGAAGATGCTTGACCATCCGTTTTTGCCGACTCTTTAC
GCCGAGTTTGACGCATCGCATTTCTCTTACATCGTCATGGAGTATTGCTCCGGCGGAGATTTG
CACTCCCTCCGTCACAAACAGCTCAACCGCAGATTCTCCCTTTCCTCCGCCAGATTTTACGCG
GCTGAAGTTCTTGTGGCGCTGGAATATCTACACATGCTGGGTATCATCTACAGAGATCTGAAG
CCTGAAAATATCTTAGTTAGATCGGACGGTCACATTATGCTCTCTGACTTTGATCTCTCCTTA
TGCTCCGACTCAATCGCAGCCGTTGAATCCTCCACATCTTCACCGGAGAATCAACCCCGTTCT
TCCCGGCGCCGACTCACTCGACTCTCTAGGATCTTCCACCGAGTCTTGCGGTCCAAAAAGGTT
CAGACGCTCGAACCGAACCGTCTCTTTGTTGCCGAACCGGTCACCGCTCGGTCCGGTTCGTTT
GTTGGTACGCATGAATACGTGGCACCAGAAGTCGCCTCAGGTGGGTCTCATGGAAATGCCGTT
GACTGGTGGGCCTTCGGAGTATTCCTCTACGAGATGATCTACGGCCGGACTCCATTCGCCGCG
CCGACGAATGACGTCATCCTTCGTAACATCGTGAAGAGACCGTTGAGTTTCCCGACCGATTCG
CCGTCGACGATGTTCGAGCTTCACGCGCGGGATTGATCTCCGGGTTGCTCAACAAGGATCCG
AACAAACGACTCGGGTCACGGCGAGGCGCGGCGGAGGTTAAAGTGCATCCGTTTTTCAAAGGT
CTAAACTTTGCGCTCATTCGTACATTAACTCCGCCGGAGATTCCCTCCGAGGTCAGGATACCG
AAGAAATCGTCGACGTTCGGTGGTAGAGCTAGTAAACCAGCGGCGTTCGATTACTTTTGA
```

FIG. 7C modified pennycress PID (pid-1)
SEQ ID NO:28

```
MLRESDGEMSLETTNSPISSGTESCSSFSRLSFDAPPSTTAIIPEEESLLSIKPHRSSDFAYS
EIRRRRKQGLTFRDFRLMRRIGAGDIGTVYLCRLAGDEEESRSSYFAMKVVDKEALAMKKKMH
RAEMEKTILKMLDHPFLPTLYAEFDASHFSYIVMEYCSGGDLHSLRHKQLNRRFSLSSARFYA
AEVLVALEYLHMLGIIYRDLKPENILVRSDGHIMLSDFDLSLCSDSIAAVESSTSSPENQPRS
SRRRLTRLSRIFHRVLRSKKVQTLEPNRLFVAEPVTARSGSFVGTHEYVAPEVASGGSHGNAV
DWWAFGVFLYEMIYGRTPFAAPTNDVILRNIVKRPLSFPTDSPSTMFELHARGLISGLLNKDP
NKRLGSRRGAAEVKVHPFFKGLNFALIRTLTPPEIPSEVRIPKKSSTFGGRASKPAAFDYF
```

FIG. 7D

WT pennycress ADPG1
SEQ ID NO:29

ATGGCTCGTCGTTTCGGACTTCTTGCTATCTTCTTATGTGTTCTTTTGATGCTCTCGTGGTGC
GAAGCTTTGAGTAGCAACGTTGATGATGGATATGGTCATGAAGATGGAAGCTTCGAATCCGAT
AGCTTACTCAAACTTAAGAACGACGACGACGACGTTCTTACCTTGAAAAGCTCCGATAAAACC
ACTTCCGAATCATCAACTGTTAGTGTTACCGATTTCGGTGCTAAAGGAGATGGGGAAAACGAT
GATACTCAGGCCTTCAAGAAAGCATGGAAGAAAGCATGTTCAACAAAGGGAGTTACTAGTTTC
TTAATTCCTAAAGGAAAGACTTATCTCCTTAAGTCTACTCGATTCAGAGGCCCATGCAAATCT
TTACGTAACTTTCAGATCCTAGGCACTTTATCAGCATCTACAAAACGATCTGATTATAAGAAT
GACAGAAACCATTGGCTTGTCTTGGAGGACGTTAACAATCTATCACTGGATGGCGGCTCGACG
GGAATTATTGATGGCAACGGAAAAATCTGGTGGCAAAATTCATGCAAAATCGACCAATCTAAG
CCATGCACAAAAGCCCCAACGGCTCTTACTTTCTACAACTTAAAGAATTTGAATGTGAAGAAT
CTGAGAGTGAGAAATGCGCAGCAGATTCAGATTTCGATTGAGAAATGCAACAATGTTAACGTC
AACAATGTCGAGATCACTGCTCCTGACGATAGTCCCAACACCGATGGTATTCACATCACTAAT
ACACAAAACATTCGAATCTCCAATTCAGACATTGGCACAGGTGATGATTGCATATCCATTGAG
GATGGATCCCAAAATGTTCAAATCAATGATTTAACTTGCGGCCCCGGTCACGGGATCAGCATT
GGGAGTTTGGGGGATGACAATTCGAAAGCTTATGTCTCGGGGATTAATGTAGATGGTGCTAAG
CTCTCTTCTACTGATAATGGAGTTAGAATTAAAACTTACCAGGGAGGATCAGGAACTGCCAAG
AACATTAAATTTCAAAATATTCGTATGGAAAATGTCAAGAATCCAATCATAATCGACCAGAAC
TACTGCGACAAGGACAAATGCGAAGAACAAGAATCCGCGGTGCAAGTAAACAATGTGGTGTAC
CGGAACATAACCGGTACGAGCGCAACGGATGTGGCGATAATGTTTAATTGCAGTGAGAAATAT
CCATGCCAAGGGATTGTGCTTGAGAACGTGAATATCGAAGGAGGAACAGCTTCTTGCAAAAAT
GCCAATGTTAAGGATCAAGGCACTGTATCTCCTCAGTGCTCTTCCACTTGA

FIG. 8A

WT pennycress ADPG1
SEQ ID NO:30

MARRFGLLAIFLCVLLMLSWCEALSSNVDDGYGHEDGSFESDSLLKLKNDDDDVLTLKSSDKT
TSESSTVSVTDFGAKGDGENDDTQAFKKAWKKACSTKGVTSFLIPKGKTYLLKSTRFRGPCKS
LRNFQILGTLSASTKRSDYKNDRNHWLVLEDVNNLSLDGGSTGIIDGNGKIWWQNSCKIDQSK
PCTKAPTALTFYNLKNLNVKNLRVRNAQQIQISIEKCNNVNVNNVEITAPDDSPNTDGIHITN
TQNIRISNSDIGTGDDCISIEDGSQNVQINDLTCGPGHGISIGSLGDDNSKAYVSGINVDGAK
LSSTDNGVRIKTYQGGSGTAKNIKFQNIRMENVKNPIIIDQNYCDKDKCEEQESAVQVNNVVY
RNITGTSATDVAIMFNCSEKYPCQGIVLENVNIEGGTASCKNANVKDQGTVSPQCSST

FIG. 8B modified pennycress ADPG1 (adpg1-1)
SEQ ID NO:31

```
ATGGCTCGTCGTTTCGGACTTCTTGCTATCTTCTTATGTGTTCTTTTGATGCTCTCGTGGTGC
GAAGCTTTGAGTAGCAACGTTGATGATGGATATGGTCATGAAGATGGAAGCTTCGAATCCGAT
AGCTTACTCAAACTTAAGAACGACGACGACGACGTTCTTACCTTGAAAAGCTCCGATAAAACC
ACTTCCGAATCATCAACTGTTAGTGTTACCGATTTCGGTGCTAAAGGAGATGGGGAAAACGAT
GATACTCAGGCCTTCAAGAAAGCATGGAAGAAAGCATGTTCAACAAAGGGAGTTACTAGTTTC
TTAATTCCTAAAGGAAAGACTTATCTCCTTAAGTCTACTCGATTCAGAGGCCCATGCAAATCT
TTACGTAACTTTCAGATCCTAGGCACTTTATCAGCATCTACAAAACGATCTGATTATAAGAAT
GACAGAAACCATTGGCTTGTCTTGGAGGACGTTAACAATCTATCACTGGATGGCGGCTCGACG
GGAATTATTGATGGCAACGGAAAAATCTGGTGGCAAAATTCATGCAAAATCGACCAATCTAAG
CCATGCACAAAAGCCCCAACGGCTCTTACTTTCTACAACTTAAAGAATTTGAATGTGAAGAAT
CTGAGAGTGAGAAATGCGCAGCAGATTCAGATTTCGATTGAGAAATGCAACAATGTTAACGTC
AACAATGTCGAGATCACTGCTCCTGACGATAGTCCCAACACCGATGGTATTCACATCACTAAT
ACACAAAACATTCGAATCTCCAATTCAGACATTGGCACAGGTGATGATTGCATATCCATTGAG
GATGGATCCCAAAATGTTCAAATCAATGATTTAACTTGCGGCCCCGGTCACGGGATCAGCATT
GGGAGTTTGGGGGATGACAATTCGAAAGCTTATGTCTCGGGGATTAATGTAGATGGTGCTAAG
CTCTCTTCTACTGATAATGGAGTTAGAATTAAAACTTACCAGGGAGGATCAGGAACTGCCAAG
AACATTAAATTTCAAATATTCGTATGGAAATGTCAAGAATCCAATCATAATCGACCAGAAC
TACTGCGACAAGGACAAATGCGAAGAACAAGAATCCGCGGTGCAAGTAAACAATGTGGTGTAC
CGGAACATAACCGGTACGAGCGCAACGGATGTGGCGATAATGTTTAATTGCAGTGAGAAATAT
CCATGCCAAGGGATTGTGCTTGAGAACGTGAATATCGAAGGAGGAACAGCTTCTTGCAAAAAT
GCCAATGTTAAGGATCAAGGCACTGTATCTCCTCAGTGCTCTTCCACTTGA
```

FIG. 8C modified pennycress ADPG1 (adpg1-1)
SEQ ID NO:32

MARRFGLLAIFLCVLLMLSWCEALSSNVDDGYGHEMEASNPIAYSNLRTTTTTFLP

FIG. 8D modified pennycress ADPG1 (adpg1-2)
SEQ ID NO:33

ATGGCTCGTCGTTTCGGACTTCTTGCTATCTTCTTATGTGTTCTTTTGATGCTCTCGTGGTGC
GAAGCTTTGAGTAGCAACGTTGATGATGGATATGGTCATGAAGATGGAAGCTTCGAATCCGAT
AGCTTACTCAAACTTAAGAACGACGACGACGACGTTCTTACCTTGAAAAGCTCCGATAAAACC
ACTTCCGAATCATCAACTGTTAGTGTTACCGATTTCGGTGCTAAAGGAGATGGGGAAAACGAT
GATACTCAGGCCTTCAAGAAAGCATGGAAGAAAGCATGTTCAACAAAGGGAGTTACTAGTTTC
TTAATTCCTAAAGGAAAGACTTATCTCCTTAAGTCTACTCGATTCAGAGGCCCATGCAAATCT
TTACGTAACTTTCAGATCCTAGGCACTTTATCAGCATCTACAAAACGATCTGATTATAAGAAT
GACAGAAACCATTGGCTTGTCTTGGAGGACGTTAACAATCTATCACTGGATGGCGGCTCGACG
GGAATTATTGATGGCAACGGAAAAATCTGGTGGCAAAATTCATGCAAAATCGACCAATCTAAG
CCATGCACAAAAGCCCCAACGGCTCTTACTTTCTACAACTTAAAGAATTTGAATGTGAAGAAT
CTGAGAGTGAGAAATGCGCAGCAGATTCAGATTTCGATTGAGAAATGCAACAATGTTAACGTC
AACAATGTCGAGATCACTGCTCCTGACGATAGTCCCAACACCGATGGTATTCACATCACTAAT
ACACAAACATTCGAATCTCCAATTCAGACATTGGCACAGGTGATGATTGCATATCCATTGAG
GATGGATCCCAAAATGTTCAAATCAATGATTTAACTTGCGGCCCCGGTCACGGGATCAGCATT
GGGAGTTTGGGGGATGACAATTCGAAAGCTTATGTCTCGGGGATTAATGTAGATGGTGCTAAG
CTCTCTTCTACTGATAATGGAGTTAGAATTAAAACTTACCAGGGAGGATCAGGAACTGCCAAG
AACATTAAATTTCAAAATATTCGTATGGAAATGTCAAGAATCCAATCATAATCGACCAGAAC
TACTGCGACAAGGACAAATGCGAAGAACAAGAATCCGCGGTGCAAGTAAACAATGTGGTGTAC
CGGAACATAACCGGTACGAGCGCAACGGATGTGGCGATAATGTTTAATTGCAGTGAGAAATAT
CCATGCCAAGGGATTGTGCTTGAGAACGTGAATATCGAAGGAGGAACAGCTTCTTGCAAAAAT
GCCAATGTTAAGGATCAAGGCACTGTATCTCCTCAGTGCTCTTCCACTTGA

FIG. 8E modified pennycress ADPG1 (adpg1-2)
SEQ ID NO:34

MARRFGLLAIFLCVLLMLSWCEALSSNVDDGYGQMEASNPIAYSNLRTTTTTFLP

FIG. 8F

```
At_SPT    MISQREEREEKKQRVMGDKKLISSS-SSSSVYDTRINHHLHHPPSSSDEISQFLRHIFDR
Ta_SPT    ---------------MGDKKLISSSSSIASVYDTRNNNNHHHPPSSSDEISQFLRHIFDR
Ta_spt-1  ---------------MGDKKLISSSSSIASVYDTRNNNNHHHPPSSSDEISQFLXHIFDR
Gm_SPT    ------------------------------MAGDIGRALPPPDSEEFSTLFNQLLHN
Os_SPT    ------------------------------------------------------------
Sl_SPT    -----------------------MADPY----RTNPHASSSLESEDMSSFFLNFLQG At_SPT    SSPLPSYYSPATTTTTASLIGVHGSGDPHADNSRSLVSHHPPSDSVLMSKRVGDFSEVLI
Ta_SPT    SSPLPSYYSPATMTTA---AIGV---HGDPHADNPRSFVS-HPPSDSALPSKRPADYSEVLI
Ta_spt-1  SSPLPSYYSPATMTTA---AIGV---HGDPHADNPRSFVS-HPPSDSALPSKRPADYSEVLI
Gm_SPT    SPPLGMD--------------------------------PNHSPSDFTPHNT
Os_SPT    ------------------------------------------------------------
Sl_SPT    TPASSSAT-----------AAAGFY-----------------------------------

At_SPT    ---GGGSGSA---------AACFGFSGGGNNNNVQGNSS-GTRVSSSSVG-----------
Ta_SPT    ---GSAVGSASAVGSGSAPCFGFSGGN---NIAQGNSS-GTRVSSSSVG-------------
Ta_spt-1  ---GSAVGSASAVGSGSAPCFGFSGGN---NIAQGNSS-GTRVSSSSVG-------------
Gm_SPT    TININSNNNNNTVPSSPSNFNFSDPHHYIP---ASD-ATTFKQHNIN--------------
Os_SPT    ------------------------------------------------------------
Sl_SPT    -----NRSGPAPVAESSSSLNFSDPGRFYAAEFKEGVENVFASAGLGECDGMNSANRREF At_SPT    ASGNETDEYDCESEEGGEAVVDEAPSSKSGPSSRSSSKRCRAAEVHNLSEKRRRSRINEK
Ta_SPT    ASGNDTDEYDCESEEGVEAVVDDDLPSKSGPS-RSSSKRCRAAEVHNLSEKRRRSRINEK
Ta_spt-1  ASGNDTDEYDCESEEGVEAVVDDDLPSKSGPS-RSSSKRCRAAEVHNLSEKRRRSRINEK
Gm_SPT    HNNNHTPDFTSS------HVEKSVEASKPVPPPRSSSKRSRAAEFHNLSEKRRRSRINEK
Os_SPT    ---------EAG------GSSSEPEAAAGAPPRGGSGSKRSRAAEVHNLSEKRRRSKINEK
Sl_SPT    LEDDKVDNFGFSSE------ECDGLDMPSDPTHPRSSKRSRSAEVHNLSEKRRRSRINEK At_SPT    MKALQSLIPNSNKTDKASMLDEAIEYLKQLQLQVQMLTMRNGINLHPLCLPGTTLHPLQL
Ta_SPT    MKALQSLIPNSNKTDKASMLDEAIEYLKQLQLQVQMLTMRNGINLHPLCLPGTTLHPLQL
Ta_spt-1  MKALQSLIPNSNKTDKASMLDEAIEYLKQLQLQVQMLTMRNGINLHPLCLPGTTLHPLQL
Gm_SPT    MKALQNLIPNSNKTDKASMLDEAIEYLKQLQLQVQMLMMRNGLSLHPMSLPGGL-RPMIM
Os_SPT    MKALQSLIPNSNKTDKASMLDEAIEYLKQLQLQVQMLSMRNGVYLNFSYLSGAL-EPAQA
Sl_SPT    LKALQNLIPNSNKTDKASMLDEAIEYLKQLQLQVQILTLRNGLSLYPGYVPGSLQ-SVQL At_SPT    SQIR---PPEATNDPLLNHTNQFASTSNAPEMIN------------------TVASS
Ta_SPT    SQVRGMPQEATNDHLLNHTNQFGSTSNAPEMIN------------------TVPSS
Ta_spt-1  SQVRGMPQEATNDHLLNHTNQFGSTSNAPEMIN------------------TVPSS
Gm_SPT    PQTGLNL--DGSNGFQNSTCAIASSSNDESLVRHAFSF----PKQCSISNKSIGVPSVKNI
Os_SPT    SQMFAAL--GGNNVTVVHPGTVMPPVNQSSGAHHLFDPLNSPFQN---QPQSLILPSVPST
Sl_SPT    PSGNE------FDGRSFMLSANGGATLP-VNREMPQTAFEISNQNP---------SGKPTITSH At_SPT    -------YALEP-SIRSHFGPFPLLTSPVEMSREGGLTHPRLNIGHSNANITGEQALFDGQ
Ta_SPT    -------YSLEP-SVRSHFGPFPLLTSHAEMSREGGLTHHRLSIGHSNTNLTGAQAVFNGQ
Ta_spt-1  -------YSLEP-SVRSHFGPFPLLTSHAEMSREGGLTHHRLSIGHSNTNLTGAQAVFNGQ
Gm_SPT    ATSDTSSTFHPSIKDALYGNMPQPFMDT------------TKIGKPS--------------
Os_SPT    AIPE--PPFHLESSQSHLRQFQLP-----------------GSS----------------
Sl_SPT    NT-ENAVALE-TTIQNHYGLLNHLASSKDMCRDNTLSPLHLDMSCSGNNSSSGVSS----

At_SPT    --PDLKDRIT-
Ta_SPT    EQPDIKDRLT*
Ta_spt-1  EQPDIKDRLT*
Gm_SPT    --PDVS-----
Os_SPT    ---EVI-----
Sl_SPT    -----------
```

FIG. 9

```
AT_IND     MEN----GMYKKKGVC----DSCVSSKSRSNHSPKRSMMEPQP-HHLLMDWNKANDLLTQEH
Ta_IND     ----------------------------------------------MNWNKPNDLITQEY
Ta_ind-1   ----------------------------------------------MNWNKPNDLITQEY
Ta_ind-2   ----------------------------------------------MNWNKPNDLITQEY
Ta_ind-3   ----------------------------------------------MNWNKPNDLITQEY
Gm_IND     MDTNTSTLFTNVNSTWNLEKMETNEQQQHDDHSIILQVQD-PMGSGIWPIN-------NY
Os_IND     ----MTHNSSSSSWDLDMSLGSHHHF------LLF-DQP-PPPPPPPPP-----------
Sl_IND     MDIN---HINKLTTSTWDPTMSNMDNQQV---------FRDQQQQQQPCLSSIPNDHIYHEH AT_IND     A---AFLNDPHHLMLDPPPETLIHLDE---------------------------------
Ta_IND     ----PFLHDP-HLMIDPPPETLSHFQPPPTLF--------------------SGHGG----
Ta_ind-1   ----PFLHDP-HLMIDPPPETLSHFQPPPTLF--------------------SGHGG----
Ta_ind-2   ----PFLHDP-HLMIDPPPETLSHFQPPPTLF--------------------SGHGG----
Ta_ind-3   ----PFLHDP-HLMIDPPPETLSHFQPPPTLF--------------------SGHGG----
Gm_IND     Q--NLL----QMHQTPNTTTSSTVIVPPSSS---------------------SGFLG----
Os_IND     P--PLPFHLHHHPLDPSPS--SSLFPPPPHHHHHAHHLHHPLDLDQRRGHHDYGGGDQGG
Sl_IND     HHHQQQFHFEHNPIWPS-----FPLQNPQHH-----HLPSSSTQQQ----------QQQQ AT_IND     -------------------------------DEEYDEDMDAMKEMQYMIAVMQPVDIDPAT
Ta_IND     -------------------------------EEEEEEDNEEEEMDAMKEMQYTIAAMQPVDIDPAT
Ta_ind-1   -------------------------------EEEEEEDNEEEEMDAMKEMQYTIAAMQPVDIDPAT
Ta_ind-2   -------------------------------EEEEEEDNEEEEMDAMKEMQYTIAAMQPVDIDPAT
Ta_ind-3   -------------------------------EEEEEEDNEEEEMDAMKEMQYTIAAMQPVDIDPAT
Gm_IND     -------------------------------DILGVHHNLEEDEEPEEELGAMKEMMYKIAAMQPVDIDPAT
Os_IND     DEELRLQQEAA-----AGGGGGGGQDGGGGGDQDADEELGAMKEMMYRIAAMQPVDIDPAT
Sl_IND     EEVVVVPFDHVLNNHVQTLIEDQEHDDQDEDEEEEEELGAMKEMMFKIASMQPVDIDPST AT_IND     VPKPNRRNVRISDDPQTVVARRRPERISEKIRILKRIVPGGAKMDTASMLDEAIRYTKFL
Ta_IND     VPKPNRRNVRVSDDTQTVVARRRPEKISEKIRILKRMVPGGAKMDTASMLDEAIRYTKFL
Ta_ind-1   VSKPNRRNVRVSDDTQTVVARRRPEKISEKIRILKRMVPGGAKMDTASMLDEAIRYTKFL
Ta_ind-2   VPKPNRRNVRVSDDTQTVVARRRPEKISEKIRILKRMVPGGAKMDTASMLDEAIRYTKFL
Ta_ind-3   VPKPNRRNVRVSDDTQTVVTRRRPEKISEKIRILKRMVPGGAKMDTASMLDEAIRYTKFL
Gm_IND     IRKPKRRNVRISDDPQSVAARHRPERISEKIRILQRLVPGGTKMDTASMLDEAIRYVKFL
Os_IND     IKKPRRRNVRISDDPQSVAARHRPERISERIRILQRLVPGGTKMDTASMLDEAIRYIKFL
Sl_IND     IRKPKRRNVRISNDPQSVAARLRRERISEKIRILQRLVPGGTKMDTASMLDEAIRYVKFL AT_IND     KRQVRILQPHSQIGAPMANPSYLCYYHN--------SQP---------------------
Ta_IND     KRQVKLLQPHSQLGAPMSDPSCLCYYHN--------SQT*--------------------
Ta_ind-1   KRQVKLLQPHSQLGAPMSDPSCLCYYHN--------SQT*--------------------
Ta_ind-2   KRQVKLLQPHSQLGAPMSDPSCLCYYHN--------SQT*--------------------
Ta_ind-3   KRQVKLLQPHSQLGAPMSDPSCLCYYHN--------SQT*--------------------
Gm_IND     KRQIRLLQSIPQPSR--QPPQCIGVAST-------TPHASTLL----LAPS------SDWP
Os_IND     KRQVQELQHQPGPPPPPYPAGAAPAAGPS--TSAVGPPGRPFLPLGGGGPM-----IDWV
Sl_IND     KRQIRQLQSSNHNLPPAQIPVSSCPNNENWANNIVTPSTK-GLILGSSSSTTTNNVTTFV AT_IND     ------------------------------------------------------------
Ta_IND     ------------------------------------------------------------
Ta_ind-1   ------------------------------------------------------------
Ta_ind-2   ------------------------------------------------------------
Ta_ind-3   ------------------------------------------------------------
Gm_IND     F---APNVL----PRSTAVSASMDMSAGLGFDGHAHACDGSSSFNHHEVIS
Os_IND     G---LTRPVDIHGPTSSSSSSSMGGALGFGF-----GCGGGGQSSHGMH--
Sl_IND     GNTTLDPPYEVIGN------------------------------------
```

FIG. 12

 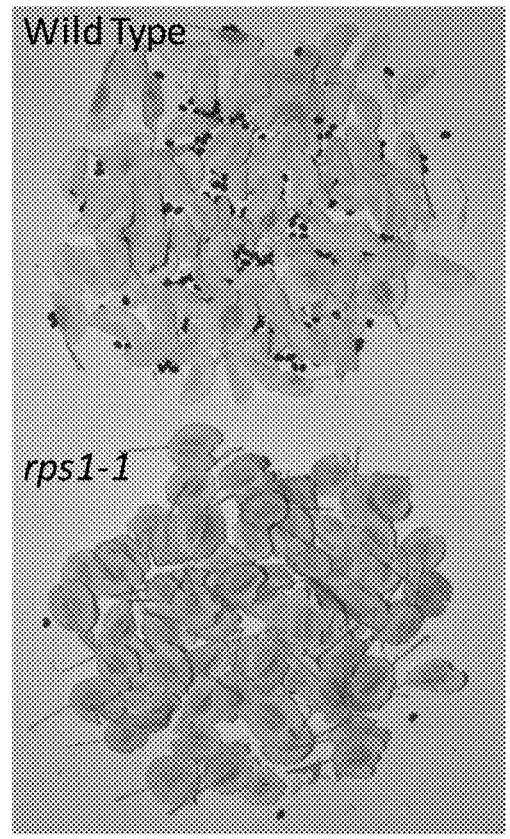
FIG. 13A  FIG. 13B
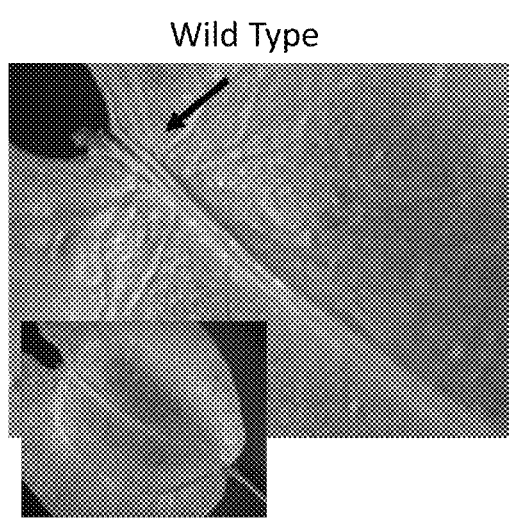 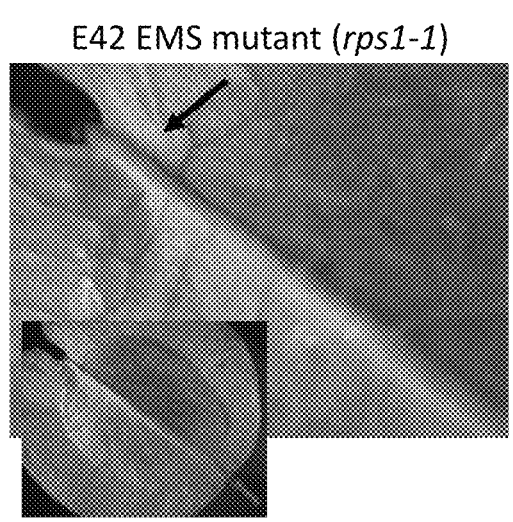
FIG. 13C  FIG. 13D

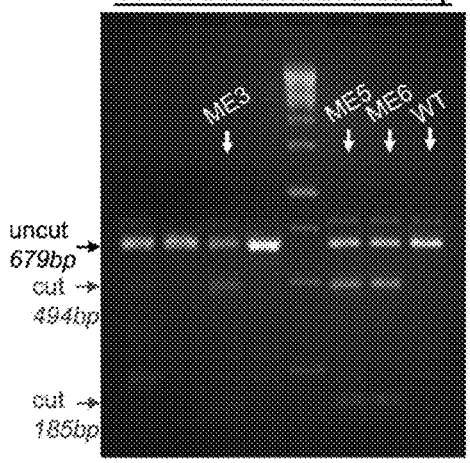
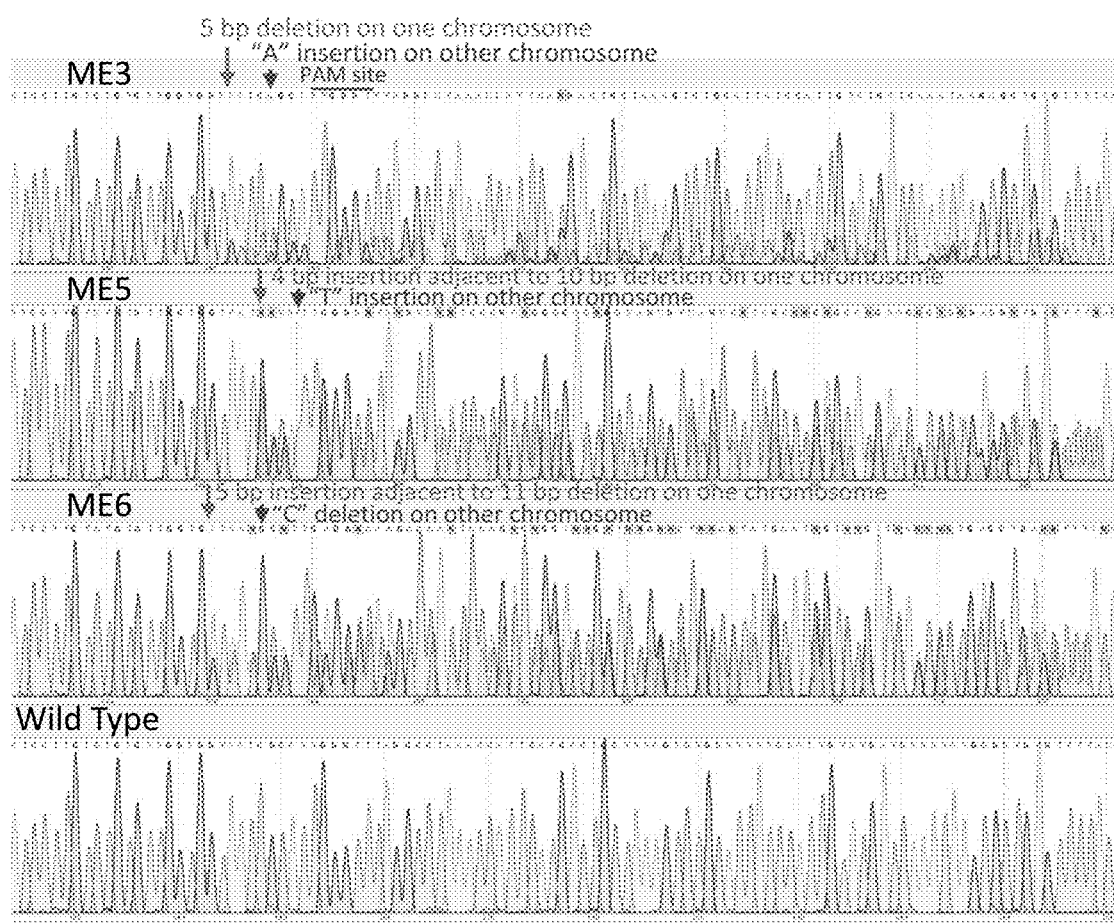
FIG. 15

```
Ta_PID    ----------------------------MLRESDGEMSLETTNSPISSGTESCSSFSR
Ta_pid-1  ----------------------------MLRESDGEMSLETTNSPISSGTESCSSFSR
At_PID    ----------------------------MLRESDGEMSLGTTNSPISSGTESCSSFSR
Gm_PID    -------------------------METGGGRDSGMSSETINSSTQRTSMSNESVCS
Os_PID    MVAAVRAPVKPEMVELSPAAMERYSSDADTTAPNSSLSSAASSTGSLARCSSLSRLSFDC
Sl_PID    ----------------------MATTNRDESDKDSTASSSITMPESSRRSWMSSTNLS Ta_PID    LSFDAPPSTTAIIPEEESLLSIKPHRSSDFAYSEIRRRRKQGLT----FRDFRLMRRIGAG
Ta_pid-1  LSFDAPPSTTAIIPEEESLLSIKPHRSSDFAYSEIRRRRKQGLT----FRDFRLMRRIGAG
At_PID    LSFDAPP----STIPEEESFLSLKPHRSSDFAYAEIPRRKKQGLT---FRDFRLMPRIGAG
Gm_PID    TSFSRLSFDLPPPSSSPETLFVKPHRSSDFAYSAILRR-KSALT---FRDFHLLRRIGAG
Os_PID    SPSAAVAAAATSCSPPRASVLLRPHRSGDVAWAAIRAASTTSAAPLGPRDFKLVRRIGGG
Sl_PID    SFSSRRSSISLCNENPYFSNSHKPHKSNQISWELIRRIRVESGQ-IKLEHFRLLRRVGGG Ta_PID    DIGTVYLCRLAGD-----EEESRSSYFAMKVVDKEALAMKKKMHRAEMEKTILKMLDHPF
Ta_pid-1  DIGTVYLCRLAGD-----EEESRSSYFAMKVVDKEALAMKKKMHRAEMEKTILKMLDHPF
At_PID    DIGTVYLCRLAGD-----EEESRSSYFAMKVVDKEALALKKKMHRAEMEKTILKMLDHPF
Gm_PID    DIGTVYLCRLRHDAGDEDDDED-PCFYAMKVVDKEAVALKKKAQRAEMERKILKMVDHPF
Os_PID    DIGTVYLCRLRSS-----PERESPCMYAMKVVDRRAVARKQKLGRAAAEKRILRQLDHPF
Sl_PID    DIGSVYLCEIRNP-----VVGLPQCFYAMKVVDREAVEIRKKLQRGEMEKEILGIIDHPF Ta_PID    LPTLYAEFDAS-HFSCIVMEYCSGGDLHSLRHKQLNRRFSLSSARFYAAEVLVALEYLHM
Ta_pid-1  LPTLYAEFDAS-HFSYIVMEYCSGGDLHSLRHKQLNRRFSLSSARFYAAEVLVALEYLHM
At_PID    LPTLYAEFEAS-HFSCIVMEYCSGGDLHSLRHRQPHRRFSLSSARFYAAEVLVALEYLHM
Gm_PID    LPTLYAEFEAS-NFSCIVMEYCSGGDLHSLQHNHPNNRFSLSSARFYAAEVLVALEYLHM
Os_PID    LPTLFADFDATPHFSCAVMEFCPGGDLHSLRHRMPSRRFPLPSARFYAAEVLLAIEYLHM
Sl_PID    LPTLYAQFEAS-HYSCLVMEYCPGGDLHAVRQRQPGKRFSISSAKFYAAEILLALEYLHM Ta_PID    LGIIYRDLKPENILVRSDGHIMLSDFDLSLCSDSIAAVESSTSSPENQPR-------SSR
Ta_pid-1  LGIIYRDLKPENILVRSDGHIMLSDFDLSLCSDSIAAVESSTSSPENQPR-------SSR
At_PID    LGIIYRDLKPENILVRSDGHIMLSDFDLSLCSDSIAAVESSSSSPENQQL-------RSP
Gm_PID    LGIIYRDLKPENVLVRSDGHIMLSDFDLSLCSDAIPAVESPDCSLDPAFAPALR---YTR
Os_PID    MGIVYRDLKPENVLIRADGHIMLTDFDLSQSTTSPSLDGDTDTDDEASG-----------
Sl_PID    MGIVYRDLKPENVLVRSDGHIMLSDFDLSFKCDEVVPTLVKSKTTKSIAKTPRN--SYCA Ta_PID    RRLTRLSRIFHRVLRSKKVQTLEPNRLFVAEPVTARSGSFVGTHEYVAPEVASGGSHGNA
Ta_pid-1  RRLTRLSRIFHRVLRSKKVQTLEPNRLFVAEPVTARSGSFVGTHEYVAPEVASGGSHGNA
At_PID    RRFTRLARLFQRVLRSKKVQTLEPTRLFVAEPVTARSGSFVGTHEYVAPEVASGGSHGNA
Gm_PID    QYSTPFSCLSNRVFRSRKVQTLQPNRLFVAEPVGARSCSFVGTHEYVSPEVASGNSHGNA
Os_PID    --GASCFPDHLLRFKRRPNAVAAPRPRFVAEPVDARSCSFVGTHEYVAPEVASGGAHGAA
Sl_PID    MPIQPVLSCFLSQKTEQNHENQEEDQEIVAEPINARSKSFVGTHEYLAPEVISGQGHGSA Ta_PID    VDWWAFGVFLYEMIYGRTPFAAPTNDVILRNIVKRPLSFPTDSPST-----MFELHARGLI
Ta_pid-1  VDWWAFGVFLYEMIYGRTPFAAPTNDVILRNIVKRPLSFPTDSPST----MFELHARGLI
At_PID    VDWWAFGVFLYEMIYGKTPFVAPTNDVILRNIVKRQLSFPTDSPAT----MFELHARNLI
Gm_PID    VDWWSFGIFIYEMVYGRTPFAGSSNEATLRSIIKKPLAFPTSTPSS----TLEMHARDLI
Os_PID    VDWWAYGVFLYELIYGRTPFAGATNEATLRNIVRRPLAFPSGSGSCG----PADADARDLI
Sl_PID    VDWWTLGVFLYELIFGTTPFKGENNEKTLVNILKKPLTFPRIAISSSKEYEEMVKVQDLI Ta_PID    SGLLNKDPNKRLGSRRGAAEVKVHPFFKGLNFALIRTLTPPEIPSEVRIP--KKSSTFGG
Ta_pid-1  SGLLNKDPNKRLGSRRGAAEVKVHPFFKGLNFALIRTLTPPEIPSEVRIP--KKSSTFGG
At_PID    SGLLNKDPTKRLGSRRGAAEVKVHPFFKGLNFALIRTLTPPEIPSSVVKKPMKSATFSGR
Gm_PID    SGLLNKDPNRRLGSKRGSADVKKHPFFAGLNLALIRTVTPPEVPSLRRHKTTPFYYPANV
Os_PID    ARLLAKDPAARLGSRRGAADVKSHPFFKSLNLALLRSSRFPVVPGAGAGAAPLHRSQSCK
Sl_PID    SRLLVKNPKKRIGSLQGSVEIKKHEFFKGVNWALIRSIKPPQVPNDLVKMRGVVPKLSKK Ta_PID    RASKPAAFDYF--------------
Ta_pid-1  RASKPAAFDYF--------------
At_PID    SSNKPAAFDYF--------------
Gm_PID    NNSRQQLTAFDYF------------
Os_PID    AAPTTPPPPTTTKPANATARFDLF
Sl_PID    QREEPYQIPQYFDYF----------
```

FIG. 17

Wild type
Representative shatter mutant (pid-1)
FIG. 18A
FIG. 18B
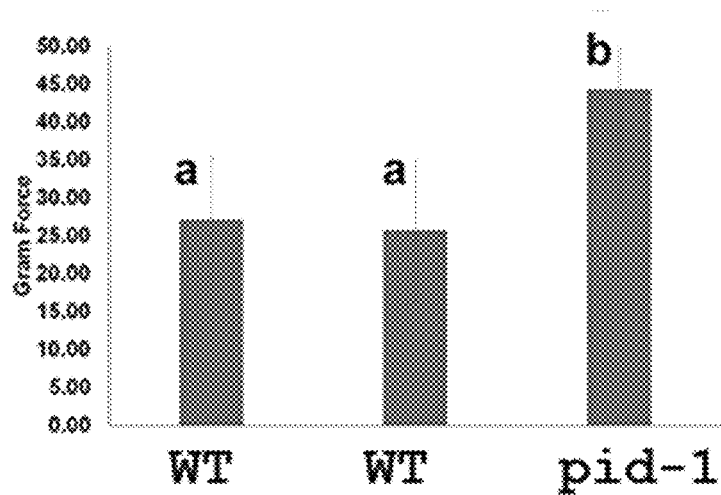
FIG. 18C

OILSEED PLANTS HAVING REDUCED POD SHATTER

CROSS-REFERENCE TO RELATED APPLICATIONS

This application is a Divisional of, and claims the benefit of priority, U.S. application Ser. No. 16/104,478 filed on Aug. 17, 2018, which also claims the benefit of priority of U.S. Application Ser. No. 62/547,684, filed on Aug. 18, 2017. The disclosures of the prior applications are considered part of (and are incorporated by reference in) the disclosure of this application.

STATEMENT REGARDING FEDERAL FUNDING

This invention was made with government support under 2014-67009-22305 awarded by the United States Department of Agriculture. The government has certain rights in the invention.

SEQUENCE LISTING

This application contains a Sequence Listing that has been submitted electronically as an XML file named 09531-040002 SL ST26.xml. The XML file, created on Aug. 15, 2023, is 88,870 bytes in size. The material in the XML file is hereby incorporated by reference in its entirety.

BACKGROUND

1. Technical Field

This document relates to materials and methods for domesticating oilseed (e.g., pennycress) plants. For example, this document provides oilseed plants having reduced seedpod shatter, as well as materials and methods for making and using oilseed plants having reduced seedpod shatter.

2. Background Information

Across the Upper Midwestern USA tens of millions of acres of farmland are rotated between *Zea mays* L. and *Glycine max* (L.) Merr. Only 2% of this region is typically protected by a cover crop in the fallow period between autumn harvest and the following spring planting. This leaves farmlands across the Midwest vulnerable to nutrient leaching and soil erosion, threatening the sustainability of current farming practices and the health of rural populations. Cover crops such as winter rye (*Secale cereale* L.) that can be grown during the fallow period can greatly reduce nutrient leaching; however, rye provides no economic return.

SUMMARY

This document provides materials and methods for domesticating oilseed (e.g., pennycress) plants. For example, this document provides domesticated oilseed plants having reduced seedpod shatter, as compared to corresponding wild type oilseed plants. This document also provides materials and methods for making and/or using the domesticated oilseed plants described herein (e.g., having reduced seedpod shatter).

As demonstrated herein, loss-of-function modifications in the pennycress SPATULA (SPT), ALCATRAZ (ALC), INDEHISCENT (IND), SHATTERPROOF (SHP; e.g., SHP1 and SHP2), PINOID (PID), and DZ POLYGALACTURONASE (ADPG; e.g., ADPG1 and ADPG2) genes resulted in reduced seedpod shatter as compared to corresponding wild type pennycress plants. Domesticated oilseed plants having reduced seedpod shatter can have increased yield (e.g., increased harvestable plant yield and/or longer harvest-time windows) as compared to corresponding wild type pennycress plants.

Having the ability to design oilseed (e.g., pennycress) plants having reduced seedpod shatter provides a unique and unrealized opportunity to improve the sustainability of current farming practices. For example, oilseed plants provided herein can be grown in the interval between corn harvest and soybean establishment the following spring in the Midwestern United States as well as in other regions and cropping systems, thereby maximizing potential production from land already in use. Oil from the seeds of oilseed plants provided herein can be used as edible oil or used for the production of biodiesel, jet fuel, and other bioproducts. In addition, oilseed plants provided herein can provide ecosystem services such as reducing nutrient leaching and soil erosion and providing food for pollinators. Thus, pennycress plants described here have the potential to reduce nutrient leaching while providing farmers with an oilseed cash crop.

In general, one aspect of this document features an oilseed plant having reduced seedpod shatter (e.g., as compared to a corresponding wild type oilseed plant), where the oilseed plant includes a modification in one or more genes encoding a polypeptide and/or a microRNA involved in seedpod shatter. The oilseed plant can be a pennycress plant. The oilseed plant can include seedpods that require about 20 grams to about 120 grams pulling force to shatter. The oilseed plant can include seedpods that are resistant to shatter under less than about 30 grams force. The modification can be a loss-of-function modification. In some cases, the gene can be a SPT gene. The modified SPT gene can include a single base-pair substitution. The single base-pair substitution can be a C to T substitution at nucleotide residue 157. The modified SPT gene can include the sequence set forth in SEQ ID NO:3. The modified SPT gene can encode a modified SPT polypeptide. The modified SPT polypeptide can include the sequence set forth in SEQ ID NO:4. In some cases, the gene can be a ALC gene. The modified ALC gene can include a 10 base pair deletion and a 4 base pair insertion. The oilseed plant of claim 13, wherein said 10 base pair deletion includes deletion of residues 827 to 836. The 4 base pair insertion can be a TCTC insertion following nucleotide residue 827. The modified ALC gene can include the sequence set forth in SEQ ID NO:7. The modified ALC gene can encode a modified ALC polypeptide. The modified ALC polypeptide can be as set forth in SEQ ID NO:8.

In another aspect, this document features an oilseed plant having reduced seedpod shatter (e.g., as compared to a corresponding wild type oilseed plant). The oilseed plant can have a modification in one or more genes encoding a polypeptide and/or a microRNA involved in seedpod shatter. The gene encoding a polypeptide and/or a microRNA involved in seedpod shatter can be selected from the group consisting of SPT, ALC, IND, RPL, SHP1, SHP2, FUL, NST1, NST3, PID, ADPG1, and/or ADPG2. The modified gene can encode a modified polypeptide and/or a modified microRNA. The oilseed plant can be a pennycress plant. The oilseed plant can have seedpods that require about 20 grams to about 120 grams pulling force to shatter. The oilseed plant can have seedpods that are resistant to shatter under less than about 30 grams force. When the gene encoding a polypeptide involved in seedpod shatter is a SPT gene, the modified SPT gene can encode a modified SPT polypeptide. The modified SPT gene can include a C to T substitution at nucleotide residue 157 as set forth in SEQ ID NO:3, and the modified SPT polypeptide can include the amino acid sequence set forth in SEQ ID NO:4. When the gene encoding a polypeptide involved in seedpod shatter is a ALC gene, the modified ALC gene can encode a modified ALC polypeptide. The modified ALC gene can include a 10 base pair deletion of residues 827 to 836 and a TCTC insertion following nucleotide residue 827 as set forth in SEQ ID NO:7, and wherein said modified ALC polypeptide can include the amino acid sequence set forth in SEQ ID NO:8. When the gene encoding a polypeptide involved in seedpod shatter is a IND gene, the modified IND gene can encode a modified IND polypeptide. The modified IND gene can include a C to T substitution at nucleotide residue 247 as set forth in SEQ ID NO:11, and the modified IND polypeptide can include the amino acid sequence set forth in SEQ ID NO:12. The modified IND gene can include a G to A substitution at nucleotide residue 260 as set forth in SEQ ID NO:13, and the modified IND polypeptide can include the amino acid sequence set forth in SEQ ID NO:14. The modified IND gene can include a G to A substitution at nucleotide residue 301 as set forth in SEQ ID NO:15, and the modified IND polypeptide can include the amino acid sequence set forth in SEQ ID NO:16. When the gene encoding a polypeptide involved in seedpod shatter is a SHP1 gene, the modified SHP1 gene can encode a modified SHP1 polypeptide. The modified SHP1 gene can include a G to A substitution at nucleotide residue 17 as set forth in SEQ ID NO:19, and the modified SHP1 polypeptide can include the amino acid sequence set forth in SEQ ID NO:20. When the gene encoding a polypeptide involved in seedpod shatter is a SHP2 gene, the modified SHP2 gene can encode a modified SHP2 polypeptide. The modified SHP2 gene can include a G to A substitution at nucleotide residue 175 as set forth in SEQ ID NO:23, and the modified SHP2 polypeptide can include the amino acid sequence set forth in SEQ ID NO:24. When the gene encoding a polypeptide involved in seedpod shatter is a PID gene, the modified PID gene encodes a modified PID polypeptide. The modified PID gene can include a G to A substitution at nucleotide residue 470 as set forth in SEQ ID NO:27, and the modified PID polypeptide can include the amino acid sequence set forth in SEQ ID NO:28. When the gene encoding a polypeptide involved in seedpod shatter is a ADPG1 gene, the modified ADPG1 gene can encode a modified ADPG1 polypeptide. The modified ADPG1 gene can include single base pair deletion of residue 104 as set forth in SEQ ID NO:31, and the modified ADPG1 polypeptide can include the amino acid sequence set forth in SEQ ID NO:32. The modified ADPG1 gene can include a 4 base pair deletion of residues 101 to 104 as set forth in SEQ ID NO:33, and the modified ADPG1 polypeptide can include the amino acid sequence set forth in SEQ ID NO:34.

In another aspect, this document features a seed produced by an oilseed plant having reduced seedpod shatter (e.g., as compared to a corresponding wild type oilseed plant), where the oilseed plant includes a modification in one or more genes encoding a polypeptide and/or a microRNA involved in seedpod shatter.

In another aspect, this document features a method for generating an oilseed plant having reduced seedpod shatter (e.g., as compared to a corresponding wild type oilseed plant). The method includes, or consists essentially of, modifying a gene in the oilseed plant genome, where the gene encodes a polypeptide and/or a microRNA involved in seedpod shatter, and where the modification is effective to reduce pod shatter in the plant. The modifying can include site-specific editing. The oilseed plant can be a pennycress plant. The oilseed plant can include seedpods that require about 20 grams to about 120 grams pulling force to shatter. The modification can be a loss-of-function modification. In some cases, the gene can be a SPT gene. The modified SPT gene can include a single base-pair substitution (e.g., a C to T substitution) at nucleotide residue 157. The modified SPT gene can include the sequence set forth in SEQ ID NO:3. The modified SPT gene can encode a modified SPT polypeptide. The modified SPT polypeptide can include the sequence set forth in SEQ ID NO:4. In some cases, the gene can be a ALC gene. The modified ALC gene can include a 10 base pair deletion of residues 827 to 836, and a 4 base pair TCTC insertion following nucleotide residue 827. The modified ALC gene can include the sequence set forth in SEQ ID NO:7. The modified ALC gene can encode a modified ALC polypeptide. The modified ALC polypeptide can include the sequence set forth in SEQ ID NO:8.

In another aspect, this document features a method for generating an oilseed plant having reduced seedpod shatter (e.g., as compared to a corresponding wild type oilseed plant). The method includes, or consists essentially of, introducing into an oilseed plant cell a nuclease and a guide sequence, where the guide sequence includes a nucleic acid sequence specific to the ALC gene; selecting an oilseed plant cell having reduced seedpod shatter as compared to a wild oilseed plant; and regenerating an oilseed plant having reduced seedpod shatter from the selected oilseed plant cell. The oilseed plant can be a pennycress plant. The nuclease can be a clustered regularly interspaced short palindromic repeats (CRISPR) associated system (Cas) nuclease. The Cas nuclease can be a Cas9 nuclease. The Cas9 nuclease can be a *Staphylococcus aureus* Cas9. The guide sequence can include SEQ ID NO:53.

In another aspect, this document features a method for generating an oilseed plant having reduced seedpod shatter (e.g., as compared to a corresponding wild type oilseed plant). The method includes, or consists essentially of, modifying one or more genes in the oilseed plant genome, where the gene encodes a polypeptide and/or a microRNA involved in seedpod shatter. The gene that encodes a polypeptide involved in seedpod shatter can be SPT, ALC, IND, RPL, SHP1, SHP2, FUL, NST1, NST3, PID, ADPG1, and/or ADPG2. The modified gene can encode a modified polypeptide. The oilseed plant can be a pennycress plant. The modifying can include site-specific editing. The site-specific editing can include introducing a guide sequence and a nuclease into an oilseed plant cell, where the guide sequence includes a nucleic acid sequence specific to a gene encoding a polypeptide involved in seedpod shatter, and where the nuclease is a Cas nuclease. The modifying can include mutagenesis. The mutagenesis can include introducing a mutagen into an oilseed plant cell. The mutagen can include ethyl methane sulphonate (EMS). The method also can include selecting an oilseed plant cell having reduced seedpod shatter as compared to a wild oilseed plant; and regenerating an oilseed plant having reduced seedpod shatter from the selected oilseed plant cell.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIGS. 2A-2D show exemplary SPT sequences. A) A wild type (WT) pennycress SPT nucleotide sequence (SEQ ID NO:1) with lowercase letters indicating introns. B) A WT pennycress SPT polypeptide sequence (SEQ ID NO:2). C) A modified pennycress SPT nucleotide sequence having a C to T substitution at nucleotide residue 157 (SEQ ID NO:3) with the bold, italic T indicating the substitution and the lower case letters indicating introns. D) A modified pennycress SPT polypeptide sequence having a R to W substitution at amino acid residue 53 (SEQ ID NO:4) with the bold, italic W indicating the substitution.

FIGS. 3A-3E show exemplary ALC sequences. A) A WT pennycress ALC nucleotide sequence (SEQ ID NO:5) with lower case letters indicating introns. A protospacer location and PAM site that can be targeted by, for example, CRISPR-SaCas9 gRNA are underlined and in bold (protospacer) or italicized (PAM site). B) A WT pennycress ALC polypeptide sequence (SEQ ID NO:6). C) A modified pennycress ALC nucleotide sequence having a 10 base pair deletion of residues 827 to 836, and a 4 base pair TCTC insertion following nucleotide residue 827 (SEQ ID NO:7) with the bold, italic TCTC indicating the insertion and the letters indicating the deletion. D) A modified pennycress ALC polypeptide sequence having a deletion of asparagine-proline-methionine-arginine (NPMR) at residues 160-163, and an insertion of isoleucine-serine (IS) at residues 160-161 (SEQ ID NO:8) with the bold, italic IS indicating the substituted amino acids. E) Additional exemplary modified pennycress ALC nucleotide sequences having deletions, insertions, and/or base substitutions induced in the pennycress ALC gene at the CRISPR-SaCas9 gRNA site (mutations highlighted in red) using CRISPR-Cas9 methodology. Sequences shown include, from top to bottom, a fragment of a wild type ALC nucleotide sequence (SEQ ID NO:59), a G to A transition (SEQ ID NO:60), a 6 base pair deletion found in the alc-1 mutant (SEQ ID NO:61), a 9 base pair deletion (SEQ ID NO:62), a 4 base pair deletion in the alc-2 mutant (SEQ ID NO:63), a 4 base pair deletion (SEQ ID NO:64), a 2 base pair deletion in the alc-3 mutant (SEQ ID NO:65), a 6 base pair deletion plus a 5 base pair insertion (SEQ ID NO:66), a 1 base pair insertion in the alc-4 mutant (SEQ ID NO:67), and a 1 base pair insertion (SEQ ID NO:68).

FIGS. 4A-4H show exemplary IND sequences. A) WT pennycress IND nucleotide sequences (SEQ ID NO:9 and SEQ ID NO:69). B) WT pennycress IND polypeptides sequence (SEQ ID NO:10 and SEQ ID NO:70). C) A modified pennycress IND nucleotide sequence having a C to T substitution at nucleotide residue 247 (SEQ ID NO:11) with the bold, italic T indicating the substitution. D) A modified pennycress IND polypeptide sequence having a P to S substitution at amino acid residue 83 (SEQ ID NO:12) with the bold, italic S indicating the substitution. E) A modified pennycress IND nucleotide sequence having a G to A substitution at nucleotide residue 260 (SEQ ID NO:13) with the bold, italic A indicating the substitution. F) A modified pennycress IND polypeptide sequence having a R to H substitution at amino acid residue 87 (SEQ ID NO:14) with the bold, italic H indicating the substitution. G) A modified pennycress IND nucleotide sequence having a G to A substitution at nucleotide residue 301 (SEQ ID NO:15) with the bold, italic G indicating the substitution. H) A modified pennycress IND polypeptide sequence having a A to T substitution at amino acid residue 101 (SEQ ID NO:16) with the bold, italic T indicating the substitution. Residue numbers in FIGS. 4C-4H are with reference to SEQ ID NO:9 or SEQ ID NO:10.

FIGS. 5A-5D show exemplary SHP1 sequences. A) A WT pennycress SHP1 nucleotide sequence (SEQ ID NO:17). B) A WT pennycress SHP1 polypeptide sequence (SEQ ID NO:18). C) A modified pennycress SHP1 nucleotide sequence having a G to A substitution at nucleotide residue 17 (SEQ ID NO:19) with the bold, italic A indicating the substitution. D) A modified pennycress SHP1 polypeptide sequence having a S to N substitution at amino acid residue 6 (SEQ ID NO:20) with the bold, italic N indicating the substitution.

FIGS. 6A-6D show exemplary SHP2 sequences. A) A WT pennycress SHP2 nucleotide sequence (SEQ ID NO:21). B) A WT pennycress SHP2 polypeptide sequence (SEQ ID NO:22). C) A modified pennycress SHP2 nucleotide sequence having a G to A substitution at nucleotide residue 175 (SEQ ID NO:23) with the bold, italic A indicating the substitution. D) A modified pennycress SHP2 polypeptide sequence having an A to T substitution at amino acid residue 59 (SEQ ID NO:24) with the bold, italic T indicating the substitution.

FIGS. 7A-7D show exemplary PID sequences. A) A WT pennycress PID nucleotide sequence (SEQ ID NO:25). B) A WT pennycress PID polypeptide sequence (SEQ ID NO:26). C) A modified pennycress PID nucleotide sequence having a G to A substitution at nucleotide residue 470 (SEQ ID NO:27) with the bold, italic A indicating the substitution. D) A modified pennycress PID polypeptide sequence having a C to Y substitution at amino acid residue 157 (SEQ ID NO:28) with the bold, italic Y indicating the substitution.

FIGS. 8A-8F show exemplary ADPG1 sequences. A) A WT pennycress ADPG1 nucleotide sequence (SEQ ID NO:29). A protospacer location and PAM site that can be targeted by, for example, CRISPR-SaCas9 gRNA are underlined and in bold (protospacer) or italicized (PAM site). B) A WT pennycress ADPG1 polypeptide sequence (SEQ ID NO:30). C) A modified pennycress ADPG1 nucleotide sequence having a single base pair deletion of residue 104 (SEQ ID NO:31) with the letter indicating the deletion. The aberrant amino acid sequence leading up to the stop codon is highlighted in yellow. D) A modified pennycress ADPG1 polypeptide sequence having a truncation (SEQ ID NO:32) with the aberrant amino acid residues (highlighted in bold; resulting from a frameshift) leading up to the stop codon (highlighted in bold in SEQ ID NO:31). E) A modified pennycress ADPG1 nucleotide sequence having a 4 base pair deletion of residues 101 to 104 (SEQ ID NO:33) with the letters indicating the deletion. F) A modified pennycress ADPG1 polypeptide sequence having a truncation (SEQ ID NO:34) with the aberrant amino acid residues (highlighted in bold; resulting from a frameshift) leading up to the stop codon (highlighted in bold in SEQ ID NO:33).

FIG. 9 contains a sequence alignment of SPT polypeptides from *Arabidopsis thaliana* (At_SPT; SEQ ID NO:35), *Thlaspi arvense* (Ta_SPT; SEQ ID NO:2), a modified *Thlaspi arvense* (Ta_spt-1; mutant strain A7-129; SEQ ID NO:4), *Glycine max* (Gm_SPT; SEQ ID NO:36), *Oryza sativa* (Os_SPT; SEQ ID NO:37), and *Solanum lycopersicum* (Sl_SPT; SEQ ID NO:38).

FIG. 12 contains a sequence alignment of IND polypeptides from *Arabidopsis thaliana* (At_SPT; SEQ ID NO:39), *Thlaspi arvense* (Ta_SPT; SEQ ID NO:10), a modified *Thlaspi arvense* (Ta_ind-1; mutant strain E5-552; SEQ ID NO:12), a modified *Thlaspi arvense* (Ta_ind-2; mutant strain E5-550; SEQ ID NO:14), a modified *Thlaspi arvense* (Ta_ind-3; mutant strain Spring32_NS; SEQ ID NO:16), *Glycine max* (Gm_IND; SEQ ID NO:40), *Oryza sativa* (Os_IND; SEQ ID NO:41), and *Solanum lycopersicum* (Sl_IND; SEQ ID NO:42).

FIGS. 13A-13F show an analysis of seedpod shatter in pennycress plants. A) Images showing growth chamber-grown mature pods for wild type and rps1-1 mutant (line E42; also referred to as ind-3) pennycress plants. rps1-1 plants grew like wild type. B) Images showing seedpods from wild type and rps1-1 mutant (line E42; also referred to as ind-3) pennycress plants. rps1-1 plants had reduced seedpod shatter compared to wild-type pods. C) Microscopic images of pennycress seedpods from a wild type pennycress plant D) Microscopic images of seedpods from a ind-3 (rps1-1) mutant (line E42) and wild type. rps1-1 pods show no dehiscence zone separation. E) A graph with averages of the amounts of pulling force necessary to break the pods open. Seedpods from a mutant pennycress plant having a modified IND gene (ind-3; also referred to as rps1-1) often tore open within a valve instead of at the dehiscence zone. Asterisks represent significant differences compared to wild type as determined by Student's t-test. Bars represent standard deviations; n=12. F) Greater force is required to break open the seedpods from a mutant pennycress plant having a modified IND gene (lines ind-1 and ind-2). Bars represent standard deviations. Letters that are different represent significant differences based on ANOVA.

FIG. 15 shows an image of an agarose gel containing electrophoresed ALCATRAZ-gene PCR products, amplified from six CRISPR-Cas9 ALCATRAZ T2-generation plants and from wild type; those products were digested with the T7 endonuclease enzyme. T7 endonuclease cuts DNA at sites where base-pair mismatches are present. Therefore, the agarose gel data indicate plant lines ME3, ME5, and ME6 likely have CRISPR-Cas9-induced edits that caused DNA base-pair mismatches. Also shown are DNA sequence chromatograms obtained from sequencing the PCR products derived from plant lines ME3 (SEQ ID NO:43), ME5 (SEQ ID NO:44), ME6 (SEQ ID NO:45), and wild type (SEQ ID NO:46); arrows indicate locations where genome edits had occurred near the PAM site (different mutations were observed on each chromosome pair) resulting in likely loss-of-function mutations including frameshift mutations and the observed reduced seedpod shatter phenotypes.

FIG. 17 contains a sequence alignment of PID polypeptides from *Thlaspi arvense* (Ta_PID; SEQ ID NO:26), a modified *Thlaspi arvense* (Ta_pid-1; mutant strain A7-236; SEQ ID NO:28), *Arabidopsis thaliana* (At_PID; SEQ ID NO:47), *Glycine max* (Gm_IND; SEQ ID NO:48), *Oryza sativa* (Os_IND; SEQ ID NO:49), and *Solanum lycopersicum* (Sl_IND; SEQ ID NO:50).

FIGS. 18A-18C show an analysis of seedpod shatter in pennycress plants. A) An image showing field grown mature pods for a wild type pennycress plant. B) An image showing field grown mature pods for a representative mutant pennycress plant having a modified PID gene (line pid-1). The pennycress plant having a modified PID gene shows few shattered pods as highlighted by arrows in the wild type image. C) Greater force is required to break open the seedpods from a mutant pennycress plant having a modified PID gene (line pid-1). Bars represent standard deviations. Letters that are different represent significant differences based on ANOVA.

DETAILED DESCRIPTION

Figure 1:
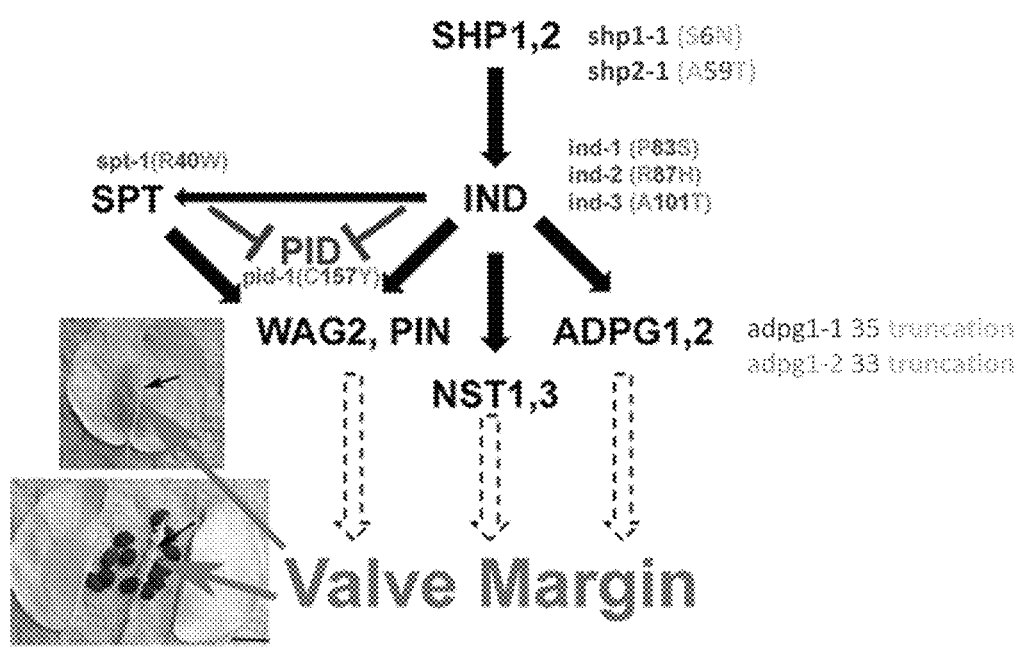
FIG. 1 contains a schematic of the polypeptides controlling the cascade of events leading to formation and a weakening of the layer of cells in the Arabidopsis seedpod referred to as the valve margin. This region is highlighted in the corresponding regions of pennycress pods. The weakening allows the pods to readily split as shown. Also shown are the nature of various mutant alleles for most of the genes in the pathway (mutant alleles (purple), (amino acid changes (blue), position of changes in the peptides (red)).

This document provides oilseed (e.g., pennycress) plants having reduced seedpod shatter. In some cases, this document provides oilseed plants having reduced expression levels of one or more polypeptides involved in seedpod shatter (e.g., as compared to corresponding wild type plants). For example, an oilseed plant having reduced seedpod shatter can have a one or more modifications in one or more genes encoding a polypeptide involved in seedpod shatter where the modification(s) are effective to reduce polypeptide expression. In some cases, this document provides oilseed plants having reduced function of one or more polypeptides involved in seedpod shatter (e.g., as compared to corresponding wild type plants). For example, an oilseed plant having reduced seedpod shatter can have one or more modifications in a polypeptide involved in seedpod shatter where the modification(s) are effective to reduce polypeptide function.

This document also provides materials and methods for making and/or using the oilseed plants described herein (e.g., oilseed plants having reduced seedpod shatter). In some cases, mutagenesis (e.g., chemical mutagenesis) can be used to modify one or more genes encoding a polypeptide involved in seedpod shatter. As described herein, mutagenesis can be used to produce an oilseed plant having a loss-of-function modification in a SPT gene, a loss-of-function modification in a IND gene, a loss-of-function modification in one or more SHP genes, and/or a loss-of-function modification in a PID gene. In some cases, site-specific gene editing can be used to modify one or more genes encoding a polypeptide involved in seedpod shatter. As described herein, gene editing techniques (e.g., CRISPR-Cas systems) can be used to produce an oilseed plant having a loss-of-function modification in a ALC gene and/or a loss-of-function modification in an ADPG1 gene. One or more modifications to a gene encoding a polypeptide involved in seedpod shatter in a plant can be effective to cause a reduced polypeptide expression and/or polypeptide function, thereby reducing seedpod shatter in the plant.

The oilseed plants described herein (e.g., oilseed plants having reduced seedpod shatter) can be used as a cover crop that can reduce nutrient leaching, can reduce soil erosion, and/or can provide nectar and pollen provisions for pollinating insects such as bees.

The oilseed plants described herein (e.g., oilseed plants having reduced seedpod shatter) also can produce an economically viable product (e.g., edible oil, edible meal, and/or oil that can be used for the production of biodiesel, jet fuel, and/or other bioproducts).

The oilseed plants described herein (e.g., oilseed plants having reduced seedpod shatter) can be derived from any appropriate species of oilseed plant. An oilseed plant can be a monocotyledonous oilseed plant. An oilseed plant can be a dicotyledonous oilseed plant. An oilseed plant can be a member of the family Brassicaceae (e.g., the mustard family). For example, an oilseed plant can be a member of the genus *Brassica*. Examples of oilseed plants include, without limitation, pennycress, rapeseed, soybean, sunflower, canola, flax, camelina, *carinata, lepidium*, and *crambe* plants. In some cases, a domesticated oilseed plant having reduced seedpod shatter as described herein can be a pennycress plant.

In some cases, oilseed plants provided herein can have reduced seedpod (e.g., seedpod) shatter. The term "reduced seedpod shatter" as used herein with respect to seedpods of an oilseed plant refers to the seedpod requiring a greater amount of force to break open than an amount of force needed to break open a wild type seedpod. It will be appreciated that comparable oilseed plants are used when determining whether or not a particular oilseed plant has reduced seedpod shatter. Reduced seedpod shatter can also be referred to as, for example, increased pod shatter resistance. For example, a seedpod of a wild type pennycress plant typically shatters under about 3 grams to about 20 grams of force (e.g., pulling force). In some cases, a pennycress plant having reduced seedpod shatter as described herein can have seedpods that require greater than about 10 (e.g., greater than about 20, greater than about 30, greater than about 40, greater than about 50, greater than about 60, greater than about 70, greater than about 80, greater than about 90, greater than about 100, greater than about 110, or greater than about 120) grams force (e.g., pulling force) to shatter. In some cases, an oilseed plant having reduced seedpod shatter as described herein can have seedpods that require about 20 grams to about 120 grams (e.g., about 20 grams to about 100 grams, about 20 grams to about 90 grams, about 20 grams to about 80 grams, about 20 grams to about 60 grams, about 20 grams to about 45 grams, about 25 grams to about 120 grams, about 30 grams to about 120 grams, about 40 grams to about 120 grams, about 50 grams to about 120 grams, about 70 grams to about 120 grams, about 100 grams to about 120 grams, about 25 grams to about 100 grams, about 30 grams to about 90 grams, about 40 grams to about 80 grams, or about 50 grams to about 70 grams) force (e.g., pulling force) to shatter. For example, a pennycress plant having reduced seedpod shatter as described herein can have seedpods that require about 20 grams to about 45 grams pulling force to shatter. For example, a pennycress plant having reduced seedpod shatter as described herein can have seedpods that require about 40 grams to about 120 grams pulling force to shatter. In some cases, an oilseed plant having reduced seedpod shatter as described herein can have seedpods that are resistant to shatter under about 10 grams to about 30 grams pulling force. For example, a pennycress plant having reduced seedpod shatter as described herein can have seedpods that are resistant to shatter under less than about 30 (e.g., less than about 25, less than about 20, less than about 18, less than about 15, less than about 12, less than about 10, or less than about 7) grams force (e.g., pulling force). The oilseed plants having reduced seedpod shatter as described herein can be identified by, for example, measuring shatter resistance (e.g., as described in the Examples).

The oilseed plants having reduced seedpod shatter as described herein can be from the A7-129, A7-236, E42, ME3, ME5, or ME6 line as described, for example, in the Examples, or can be progeny derived from those lines.

The oilseed plants having reduced seedpod shatter as described herein can include any appropriate type of modification(s) in one or more genes that encode polypeptides involved in seedpod shatter. For example, a modification can be a loss-of-function modification. As used herein, a loss-of-function modification can be any modification that is effective to reduce polypeptide expression or polypeptide function. In some cases, reduced polypeptide expression or reduced polypeptide function can be eliminated polypeptide expression or eliminated polypeptide function. Examples of genetic modifications include, without limitation, deletions, insertions, substitutions, translocations, inversions, and duplications.

The oilseed plants having reduced seedpod shatter as described herein can include one or more modification(s) in any appropriate gene that encodes any appropriate polypeptide involved in seedpod shatter. Gens that encode polypeptides involved in seedpod shatter include, without limitation, SPT, alcatraz (ALC), indehiscent (IND), replumless (RPL), shatterproof (SHP; e.g., SHP1 and SHP2), fruitfull (FUL), nac secondary wall thickening promoting factor1 and 3 (NST1 and NST3), pinoid (PID), and dz polygalacturonase 1 and 2 (ADPG1 and ADPG2). Polypeptides involved in seedpod shatter include, without limitation, SPT, ALC, IND, RPL, SHP (e.g., SHP1 and SHP2), FUL, NST1, NST3, PID, ADPG1, and ADPG2.

In some cases, oilseed plants having reduced seedpod shatter as described herein can include one or more modifications (e.g., one or more loss-of-function modifications) in a SPT gene (e.g., in a SPT coding sequence) such that the one or more modifications are effective to reduce SPT polypeptide expression and/or SPT polypeptide function. A representative wild type pennycress SPT gene (e.g., coding sequence) is as set forth in SEQ ID NO:1.

In some cases, a wild type pennycress SPT gene (e.g., coding sequence) can have a sequence that deviates from the sequence set in SEQ ID NO:1, sometimes referred to as a variant sequence, provided the variant sequence encodes a wild type pennycress SPT polypeptide. A representative wild type pennycress SPT polypeptide is as set forth in SEQ ID NO:2.

In some cases, a wild type pennycress SPT polypeptide can have a sequence that deviates from the polypeptide sequence set forth in SEQ ID NO:2, sometimes referred to as a variant sequence, provided the polypeptide maintains its wild type function. For example, a variant SPT polypeptide can have at least 80 (e.g., at least 85, at least 90, at least 95, at least 98, or at least 99) percent sequence identity to SEQ ID NO:2. For example, a variant SPT polypeptide can have one or more (e.g., 2, 3, 4, 5, 6, 7, 8, 9, or 10) amino acid modifications (e.g., substitutions) relative to SEQ ID NO:2.

In some cases, oilseed plants described herein (e.g., oilseed plants having reduced seedpod shatter) can have one or more modifications in an SPT gene (e.g., coding sequence). For example, a pennycress plant having reduced seedpod shatter can include a substitution (e.g., a single base-pair substitution) relative to the wild type pennycress SPT gene (e.g., coding sequence). In some cases, a modified SPT gene can include a single base-pair substitution of the cytosine (C) at nucleotide residue 157 in a wild type pennycress SPT gene (e.g., SEQ ID NO:1). The C at nucleotide residue 157 can be substituted with any appropriate nucleotide (e.g., thymine (T), adenine (A), and guanine (G)). For example, a single base-pair substitution can be a C to T substitution at nucleotide residue 157 in a wild type pennycress SPT gene (see, e.g., FIG. 2). A representative modified pennycress SPT gene having a loss-of-function single base pair substitution is as set forth in SEQ ID NO:3. In some cases, oilseed plants having reduced seedpod shatter as described herein (e.g., oilseed plants having reduced seedpod shatter) can have one or more modifications in an SPT polypeptide (e.g., an SPT polypeptide encoded by an SPT gene having one or more modifications). For example, a modified pennycress SPT gene (e.g., coding sequence) having a loss-of-function single base pair substitution (e.g., SEQ ID NO:3) can encode a modified SPT polypeptide (e.g., a modified SPT polypeptide having reduced SPT polypeptide expression and/or reduced SPT polypeptide function). For example, a modified pennycress SPT gene having a single base-pair substitution (e.g., SEQ ID NO:3) can encode a modified SPT polypeptide. In some cases, a modified SPT polypeptide can include a substitution of the arginine (R) at amino acid residue 53 in a wild type pennycress SPT protein (e.g., SEQ ID NO:2). The R at residue 53 can be substituted with any appropriate amino acid (e.g., tryptophan (W)). For example, a modified SPT polypeptide can include a single W substituted for the R at amino acid residue 53 in a wild type pennycress SPT polypeptide (see, e.g., FIG. 2). A representative modified pennycress SPT polypeptide is as set forth in SEQ ID NO:4.

In some cases, oilseed plants having reduced seedpod shatter as described herein can include one or more modifications (e.g., one or more loss-of-function modifications) in a ALC gene (e.g., in a ALC coding sequence) such that the one or more modifications are effective to reduce ALC polypeptide expression and/or ALC polypeptide function. A representative wild type pennycress ALC gene (e.g., coding sequence) is as set forth in SEQ ID NO:5. In some cases, a wild type pennycress ALC gene (e.g., coding sequence) can have a sequence that deviates from the sequence set forth in SEQ ID NO:5, sometimes referred to as a variant sequence, provided the variant sequence encodes a wild type pennycress ALC polypeptide. A representative wild type pennycress ALC polypeptide is as set forth in SEQ ID NO:6. In some cases, a wild type pennycress ALC polypeptide can have a sequence that deviates from the polypeptide sequence set forth above (SEQ ID NO:6), sometimes referred to as a variant sequence, provided the polypeptide maintains its wild type function. For example, a ALC polypeptide can have at least 80 (e.g., at least 85, at least 90, at least 95, at least 98, or at least 99) percent sequence identity to SEQ ID NO:6. An ALC polypeptide can have one or more (e.g., 2, 3, 4, 5, 6, 7, 8, 9, or 10) amino acid modifications (e.g., substitutions) relative to SEQ ID NO:6.

In some cases, oilseed plants described herein (e.g., oilseed plants having reduced seedpod shatter) can have one or more modifications in an ALC gene (e.g., coding sequence). For example, a pennycress plant having reduced seedpod shatter can include a deletion and/or an insertion (e.g., a combination of a deletion and an insertion in the location of the deletion) relative to the wild type pennycress ALC gene (e.g., coding sequence). The deletion can include any number of nucleotides (e.g., 1, 2, 3, 4, 5, 6, 7, 8, 9, 10, 11, 12, 13, 14 or 15 nucleotides). For example, a deletion can be a 5 base pair deletion or a 10 base pair deletion (see, e.g., FIG. 15). The insertion can include any appropriate number of nucleotides (e.g., 1, 2, 3, 4, 5, 6, 7, 8, or 9 nucleotides). For example, an insertion can be a 4 base pair insertion or a 5 base pair insertion (see, e.g., FIG. 15). The insertion can include any appropriate nucleotides (e.g., T, A, G, or C) in any appropriate sequence. For example, a 4 base pair insertion can have the sequence TCTC. In some cases, an oilseed plant having reduced seedpod shatter as described herein can include a 10 base pair deletion in a wild type pennycress ALC gene (e.g., SEQ ID NO:5) and a 4 base pair insertion in the location of the deletion. For example, an oilseed plant having reduced seedpod shatter as described herein can include a 10 base pair deletion of residues 827 to 836 in a wild type pennycress ALC gene, and a 4 base pair TCTC insertion following nucleotide residue 827 in a wild type pennycress ALC gene. A representative modified pennycress ALC gene (e.g., coding sequence) having a loss-of-function 4 base pair insertion in the location of a 10 base pair deletion is as set forth in SEQ ID NO:7. In some cases, oilseed plants having reduced seedpod shatter as described herein (e.g., oilseed plants having reduced seedpod shatter) can have one or more modifications in an ALC polypeptide (e.g., an ALC polypeptide encoded by an ALC gene having one or more modifications). For example, a modified pennycress ALC gene (e.g., coding sequence) having a loss-of-function 10 base pair deletion and a 4 base pair insertion in the location of the deletion (e.g., SEQ ID NO:7) can encode a modified ALC polypeptide (e.g., a modified ALC polypeptide having reduced ALC polypeptide expression and/or reduced ALC polypeptide function). In some cases, a modified pennycress ALC gene having a loss-of-function 10 base pair deletion and a 4 base pair insertion in the location of the deletion can encode a modified ALC polypeptide having a deletion of four amino acids, and an insertion of two different amino acids (e.g., SEQ ID NO:8). The deletion can include any number of amino acids (e.g., 1, 2, 3, 4, 5, 6, 7, 8, or 9 amino acids). For example, a deletion can be a 4 amino acid deletion. Any sequence of amino acids can be deleted. For example, the amino acids at residues 160-163 in a wild type pennycress ALC protein (e.g., SEQ ID NO:6) can be deleted. The insertion can include any appropriate number of amino acids (e.g., 1, 2, 3, or 4 amino acids). For example, an insertion can be a 2 amino acid insertion. The insertion can include any appropriate amino acids (e.g., isoleucine (I), serine (S), or W) in any appropriate sequence. For example, a 2 amino acid insertion can have the sequence IS. In some cases, a modified ALC polypeptide can include a deletion of the amino acid sequence asparagine-proline-methionine-arginine (NPMR) at residues 160-163 in a wild type pennycress ALC protein (e.g., SEQ ID NO:6), and an insertion of the amino acid sequence isoleucine-serine (IS) at residues 160-161 in the wild type pennycress ALC protein. A representative modified pennycress ALC polypeptide is as set forth in SEQ ID NO:8.

In some cases, oilseed plants having reduced seedpod shatter as described herein can include one or more modifications (e.g., one or more loss-of-function modifications) in a IND gene (e.g., in a IND coding sequence) such that the one or more modifications are effective to reduce IND polypeptide expression and/or IND polypeptide function. Representative wild type pennycress IND genes (e.g., coding sequences) are as set forth in SEQ ID NO:9 and SEQ ID NO:69. In some cases, a wild type pennycress IND gene (e.g., coding sequence) can have a sequence that deviates from the sequence set in SEQ ID NO:9 or SEQ ID NO:69, sometimes referred to as a variant sequence, provided the variant sequence encodes a wild type pennycress IND polypeptide. Representative wild type pennycress IND polypeptides are as set forth in SEQ ID NO:10 and SEQ ID NO:70. In some cases, a wild type pennycress IND polypeptide can have a sequence that deviates from the polypeptide sequence set forth in SEQ ID NO:10 or SEQ ID NO:70, sometimes referred to as a variant sequence, provided the polypeptide maintains its wild type function. For example, a variant IND polypeptide can have at least 80 (e.g., at least 85, at least 90, at least 95, at least 98, or at least 99) percent sequence identity to SEQ ID NO:10 or SEQ ID NO:70. For example, a variant IND polypeptide can have one or more (e.g., 2, 3, 4, 5, 6, 7, 8, 9, or 10) amino acid modifications (e.g., substitutions) relative to SEQ ID NO:10 or SEQ ID NO:70. In some cases, oilseed plants described herein (e.g., oilseed plants having reduced seedpod shatter) can have one or more modifications in an IND gene (e.g., coding sequence). For example, a pennycress plant having reduced seedpod shatter can include a substitution (e.g., a single base-pair substitution) relative to the wild type pennycress IND gene (e.g., coding sequence). In some cases, a modified IND gene can include a single base-pair substitution of the C at nucleotide residue 247 in a wild type pennycress IND gene (e.g., SEQ ID NO:9). The C at nucleotide residue 247 can be substituted with any appropriate nucleotide (e.g., T, A, and G). For example, a single base-pair substitution can be a C to T substitution at nucleotide residue 247 in a wild type pennycress IND gene (see, e.g., FIG. 4). A representative modified pennycress IND gene having a loss-of-function single base pair substitution is as set forth in SEQ ID NO:11. In some cases, oilseed plants having reduced seedpod shatter as described herein (e.g., oilseed plants having reduced seedpod shatter) can have one or more modifications in an IND polypeptide (e.g., an IND polypeptide encoded by an IND gene having one or more modifications). For example, a modified pennycress IND gene (e.g., coding sequence) having a loss-of-function single base pair substitution (e.g., SEQ ID NO:11) can encode a modified IND polypeptide (e.g., a modified IND polypeptide having reduced IND polypeptide expression and/or reduced IND polypeptide function). For example, a modified pennycress IND gene having a single base-pair substitution (e.g., SEQ ID NO:11) can encode a modified IND polypeptide. In some cases, a modified IND polypeptide can include a substitution of the proline (P) at amino acid residue 83 in a wild type pennycress IND protein (e.g., SEQ ID NO:10). The P at residue 83 can be substituted with any appropriate amino acid (e.g., serine (S)). For example, a modified IND polypeptide can include a single S substituted for the P at amino acid residue 83 in a wild type pennycress IND polypeptide (see, e.g., FIG. 4). A representative modified pennycress IND polypeptide is as set forth in SEQ ID NO:12. In some cases, a modified pennycress IND gene can have a modification as described relative to SEQ ID NO:9 in the corresponding residue in SEQ ID NO:69. In some cases, a modified pennycress IND polypeptide can have a modification as described relative to SEQ ID NO:10 in the corresponding residue in SEQ ID NO:70.

In some cases, a modified IND gene can include a single base-pair substitution of the G at nucleotide residue 260 in a wild type pennycress IND gene (e.g., SEQ ID NO:9). The G at nucleotide residue 260 can be substituted with any appropriate nucleotide (e.g., T, A, and C). For example, a single base-pair substitution can be a G to A substitution at nucleotide residue 260 in a wild type pennycress IND gene (see, e.g., FIG. 4). A representative modified pennycress IND gene having a loss-of-function single base pair substitution is as set forth in SEQ ID NO:13. In some cases, oilseed plants having reduced seedpod shatter as described herein (e.g., oilseed plants having reduced seedpod shatter) can have one or more modifications in an IND polypeptide (e.g., an IND polypeptide encoded by an IND gene having one or more modifications). For example, a modified pennycress IND gene (e.g., coding sequence) having a loss-of-function single base pair substitution (e.g., SEQ ID NO:13) can encode a modified IND polypeptide (e.g., a modified IND polypeptide having reduced IND polypeptide expression and/or reduced IND polypeptide function). For example, a modified pennycress IND gene having a single base-pair substitution (e.g., SEQ ID NO:13) can encode a modified IND polypeptide. In some cases, a modified IND polypeptide can include a substitution of the arginine (R) at amino acid residue 87 in a wild type pennycress IND protein (e.g., SEQ ID NO:10). The F at residue 87 can be substituted with any appropriate amino acid (e.g., histidine (H)). For example, a modified IND polypeptide can include a single H substituted for the R at amino acid residue 87 in a wild type pennycress IND polypeptide (see, e.g., FIG. 4). A representative modified pennycress IND polypeptide is as set forth in SEQ ID NO:14. In some cases, a modified pennycress IND gene can have a modification as described relative to SEQ ID NO:9 in the corresponding residue in SEQ ID NO:69. In some cases, a modified pennycress IND polypeptide can have a modification as described relative to SEQ ID NO:10 in the corresponding residue in SEQ ID NO:70.

In some cases, a modified IND gene can include a single base-pair substitution of the A at nucleotide residue 301 in a wild type pennycress IND gene (e.g., SEQ ID NO:9). The A at nucleotide residue 301 can be substituted with any appropriate nucleotide (e.g., T, G, and C). For example, a single base-pair substitution can be a G to A substitution at nucleotide residue 301 in a wild type pennycress IND gene (see, e.g., FIG. 4). A representative modified pennycress IND gene having a loss-of-function single base pair substitution is as set forth in SEQ ID NO:15. In some cases, oilseed plants having reduced seedpod shatter as described herein (e.g., oilseed plants having reduced seedpod shatter) can have one or more modifications in an IND polypeptide (e.g., an IND polypeptide encoded by an IND gene having one or more modifications). For example, a modified pennycress IND gene (e.g., coding sequence) having a loss-of-function single base pair substitution (e.g., SEQ ID NO:15) can encode a modified IND polypeptide (e.g., a modified IND polypeptide having reduced IND polypeptide expression and/or reduced IND polypeptide function). For example, a modified pennycress IND gene having a single base-pair substitution (e.g., SEQ ID NO:15) can encode a modified IND polypeptide. In some cases, a modified IND polypeptide can include a substitution of the alanine (A) at amino acid residue 101 in a wild type pennycress IND protein (e.g., SEQ ID NO:10). The A at residue 101 can be substituted with any appropriate amino acid (e.g., threonine (T)). For example, a modified IND polypeptide can include a single T substituted for the A at amino acid residue 101 in a wild type pennycress IND polypeptide (see, e.g., FIG. 4). A representative modified pennycress IND polypeptide is as set forth in SEQ ID NO:16. In some cases, a modified pennycress IND gene can have a modification as described relative to SEQ ID NO:9 in the corresponding residue in SEQ ID NO:69. In some cases, a modified pennycress IND polypeptide can have a modification as described relative to SEQ ID NO:10 in the corresponding residue in SEQ ID NO:70.

In some cases, sequences of modified IND genes and modified IND polypeptides can be as described elsewhere (see, e.g., Girin et al., 2010, *Plant J.*, 63:329-338).

In some cases, sequences of modified RPL genes and modified RPL polypeptides can be as described elsewhere (see, e.g., Roeder et al., 2003, *Curr. Biol.*, 13:1630-1635).

In some cases, oilseed plants having reduced seedpod shatter as described herein can include one or more modifications (e.g., one or more loss-of-function modifications) in a SHP1 gene (e.g., in a SHP1 coding sequence) such that the one or more modifications are effective to reduce SHP1 polypeptide expression and/or SHP1 polypeptide function. A representative wild type pennycress SHP1 gene (e.g., coding sequence) is as set forth in SEQ ID NO:17. In some cases, a wild type pennycress SHP1 gene (e.g., coding sequence) can have a sequence that deviates from the sequence set in SEQ ID NO:17, sometimes referred to as a variant sequence, provided the variant sequence encodes a wild type pennycress SHP1 polypeptide. A representative wild type pennycress SHP1 polypeptide is as set forth in SEQ ID NO:18. In some cases, a wild type pennycress SHP1 polypeptide can have a sequence that deviates from the polypeptide sequence set forth in SEQ ID NO:18, sometimes referred to as a variant sequence, provided the polypeptide maintains its wild type function. For example, a variant SHP1 polypeptide can have at least 80 (e.g., at least 85, at least 90, at least 95, at least 98, or at least 99) percent sequence identity to SEQ ID NO:18. For example, a variant SHP1 polypeptide can have one or more (e.g., 2, 3, 4, 5, 6, 7, 8, 9, or 10) amino acid modifications (e.g., substitutions) relative to SEQ ID NO:18.

In some cases, oilseed plants described herein (e.g., oilseed plants having reduced seedpod shatter) can have one or more modifications in an SHP1 gene (e.g., coding sequence). For example, a pennycress plant having reduced seedpod shatter can include a substitution (e.g., a single base-pair substitution) relative to the wild type pennycress SHP1 gene (e.g., coding sequence). In some cases, a modified SHP1 gene can include a single base-pair substitution of the G at nucleotide residue 17 in a wild type pennycress SHP1 gene (e.g., SEQ ID NO:17). The G at nucleotide residue 17 can be substituted with any appropriate nucleotide (e.g., T, A, and C). For example, a single base-pair substitution can be a G to A substitution at nucleotide residue 17 in a wild type pennycress SHP1 gene (see, e.g., FIG. 5). A representative modified pennycress SHP1 gene having a loss-of-function single base pair substitution is as set forth in SEQ ID NO:19. In some cases, oilseed plants having reduced seedpod shatter as described herein (e.g., oilseed plants having reduced seedpod shatter) can have one or more modifications in an SHP1 polypeptide (e.g., an SHP1 polypeptide encoded by an SHP1 gene having one or more modifications). For example, a modified pennycress SHP1 gene (e.g., coding sequence) having a loss-of-function single base pair substitution (e.g., SEQ ID NO:19) can encode a modified SHP1 polypeptide (e.g., a modified SHP1 polypeptide having reduced SHP1 polypeptide expression and/or reduced SHP1 polypeptide function). For example, a modified pennycress SHP1 gene having a single base-pair substitution (e.g., SEQ ID NO:19) can encode a modified SHP1 polypeptide. In some cases, a modified SHP1 polypeptide can include a substitution of the serine (S) at amino acid residue 6 in a wild type pennycress SHP1 protein (e.g., SEQ ID NO:18). The S at residue 6 can be substituted with any appropriate amino acid (e.g., asparagine (N)). For example, a modified SHP1 polypeptide can include a single S substituted for the S at amino acid residue 6 in a wild type pennycress SHP1 polypeptide (see, e.g., FIG. 5). A representative modified pennycress SHP1 polypeptide is as set forth in SEQ ID NO:20. In some cases, sequences of modified SHP1 genes and modified SHP1 polypeptides can be as described elsewhere (see, e.g., Liljegren et al., 2000, *Nature*, 404:766-770).

In some cases, oilseed plants having reduced seedpod shatter as described herein can include one or more modifications (e.g., one or more loss-of-function modifications) in a SHP2 gene (e.g., in a SHP2 coding sequence) such that the one or more modifications are effective to reduce SHP2 polypeptide expression and/or SHP1 polypeptide function. A representative wild type pennycress SHP2 gene (e.g., coding sequence) is as set forth in SEQ ID NO:21. In some cases, a wild type pennycress SHP2 gene (e.g., coding sequence) can have a sequence that deviates from the sequence set in SEQ ID NO:21, sometimes referred to as a variant sequence, provided the variant sequence encodes a wild type pennycress SHP2 polypeptide. A representative wild type pennycress SHP2 polypeptide is as set forth in SEQ ID NO:22. In some cases, a wild type pennycress SHP2 polypeptide can have a sequence that deviates from the polypeptide sequence set forth in SEQ ID NO:22, sometimes referred to as a variant sequence, provided the polypeptide maintains its wild type function. For example, a variant SHP2 polypeptide can have at least 80 (e.g., at least 85, at least 90, at least 95, at least 98, or at least 99) percent sequence identity to SEQ ID NO:22. For example, a variant SHP2 polypeptide can have one or more (e.g., 2, 3, 4, 5, 6, 7, 8, 9, or 10) amino acid modifications (e.g., substitutions) relative to SEQ ID NO:22.

In some cases, oilseed plants described herein (e.g., oilseed plants having reduced seedpod shatter) can have one or more modifications in an SHP2 gene (e.g., coding sequence). For example, a pennycress plant having reduced seedpod shatter can include a substitution (e.g., a single base-pair substitution) relative to the wild type pennycress SHP2 gene (e.g., coding sequence). In some cases, a modified SHP2 gene can include a single base-pair substitution of the G at nucleotide residue 175 in a wild type pennycress SHP2 gene (e.g., SEQ ID NO:21). The G at nucleotide residue 175 can be substituted with any appropriate nucleotide (e.g., T, A, and C). For example, a single base-pair substitution can be a G to A substitution at nucleotide residue 175 in a wild type pennycress SHP2 gene (see, e.g., FIG. 6). A representative modified pennycress SHP2 gene having a loss-of-function single base pair substitution is as set forth in SEQ ID NO:23. In some cases, oilseed plants having reduced seedpod shatter as described herein (e.g., oilseed plants having reduced seedpod shatter) can have one or more modifications in an SHP2 polypeptide (e.g., an SHP2 polypeptide encoded by an SHP2 gene having one or more modifications). For example, a modified pennycress SHP2 gene (e.g., coding sequence) having a loss-of-function single base pair substitution (e.g., SEQ ID NO:23) can encode a modified SHP2 polypeptide (e.g., a modified SHP2 polypeptide having reduced SHP2 polypeptide expression and/or reduced SHP2 polypeptide function). For example, a modified pennycress SHP2 gene having a single base-pair substitution (e.g., SEQ ID NO:23) can encode a modified SHP2 polypeptide. In some cases, a modified SHP2 polypeptide can include a substitution of the alanine (A) at amino acid residue 59 in a wild type pennycress SHP2 protein (e.g., SEQ ID NO:22). The A at residue 59 can be substituted with any appropriate amino acid (e.g., threonine (T)). For example, a modified SHP2 polypeptide can include a single T substituted for the A at amino acid residue 59 in a wild type pennycress SHP2 polypeptide (see, e.g., FIG. 6). A representative modified pennycress SHP2 polypeptide is as set forth in SEQ ID NO:24. In some cases, sequences of modified SHP2 genes and modified SHP2 polypeptides can be as described elsewhere (see, e.g., Liljegren et al., 2000, *Nature*, 404:766-770).

In some cases, sequences of modified FUL genes and modified FUL polypeptides can be as described elsewhere (see, e.g., Ferrándiz et al., 2000, *Science*, 289:436-438).

In some cases, oilseed plants having reduced seedpod shatter as described herein can include one or more modifications (e.g., one or more loss-of-function modifications) in a PID gene (e.g., in a PID coding sequence) such that the one or more modifications are effective to reduce PID polypeptide expression and/or PID polypeptide function. A representative wild type pennycress PID gene (e.g., coding sequence) is as set forth in SEQ ID NO:25. In some cases, a wild type pennycress PID gene (e.g., coding sequence) can have a sequence that deviates from the sequence set in SEQ ID NO:25, sometimes referred to as a variant sequence, provided the variant sequence encodes a wild type pennycress PID polypeptide. A representative wild type pennycress PID polypeptide is as set forth in SEQ ID NO:26. In some cases, a wild type pennycress PID polypeptide can have a sequence that deviates from the polypeptide sequence set forth in SEQ ID NO:26, sometimes referred to as a variant sequence, provided the polypeptide maintains its wild type function. For example, a variant PID polypeptide can have at least 80 (e.g., at least 85, at least 90, at least 95, at least 98, or at least 99) percent sequence identity to SEQ ID NO:26. For example, a variant PID polypeptide can have one or more (e.g., 2, 3, 4, 5, 6, 7, 8, 9, or 10) amino acid modifications (e.g., substitutions) relative to SEQ ID NO:26.

In some cases, oilseed plants described herein (e.g., oilseed plants having reduced seedpod shatter) can have one or more modifications in a PID gene (e.g., coding sequence). For example, a pennycress plant having reduced seedpod shatter can include a substitution (e.g., a single base-pair substitution) relative to the wild type pennycress PID gene (e.g., coding sequence). In some cases, a modified PID gene can include a single base-pair substitution of the G at nucleotide residue 470 in a wild type pennycress PID gene (e.g., SEQ ID NO:25). The G at nucleotide residue 470 can be substituted with any appropriate nucleotide (e.g., T, A, and C). For example, a single base-pair substitution can be a G to A substitution at nucleotide residue 470 in a wild type pennycress PID gene (see, e.g., FIG. 7). A representative modified pennycress PID gene having a loss-of-function single base pair substitution is as set forth in SEQ ID NO:27. In some cases, oilseed plants having reduced seedpod shatter as described herein (e.g., oilseed plants having reduced seedpod shatter) can have one or more modifications in a PID polypeptide (e.g., a PID polypeptide encoded by a PID gene having one or more modifications). For example, a modified pennycress PID gene (e.g., coding sequence) having a loss-of-function single base pair substitution (e.g., SEQ ID NO:27) can encode a modified PID polypeptide (e.g., a modified PID polypeptide having reduced PID polypeptide expression and/or reduced PID polypeptide function). For example, a modified pennycress PID gene having a single base-pair substitution (e.g., SEQ ID NO:27) can encode a modified PID polypeptide. In some cases, a modified PID polypeptide can include a substitution of the cysteine (C) at amino acid residue 157 in a wild type pennycress PID protein (e.g., SEQ ID NO:26). The C at residue 157 can be substituted with any appropriate amino acid (e.g., tyrosine (Y)). For example, a modified PID polypeptide can include a single Y substituted for the C at amino acid residue 157 in a wild type pennycress PID polypeptide (see, e.g., FIG. 7). A representative modified pennycress PID polypeptide is as set forth in SEQ ID NO:28.

In some cases, oilseed plants having reduced seedpod shatter as described herein can include one or more modifications (e.g., one or more loss-of-function modifications) in a ADPG1 gene (e.g., in a ADPG1 coding sequence) such that the one or more modifications are effective to reduce ADPG1 polypeptide expression and/or ADPG1 polypeptide function. A representative wild type pennycress ADPG1 gene (e.g., coding sequence) is as set forth in SEQ ID NO:29. In some cases, a wild type pennycress ADPG1 gene (e.g., coding sequence) can have a sequence that deviates from the sequence set in SEQ ID NO:29, sometimes referred to as a variant sequence, provided the variant sequence encodes a wild type pennycress ADPG1 polypeptide. A representative wild type pennycress ADPG1 polypeptide is as set forth in SEQ ID NO:30. In some cases, a wild type pennycress ADPG1 polypeptide can have a sequence that deviates from the polypeptide sequence set forth in SEQ ID NO:30, sometimes referred to as a variant sequence, provided the polypeptide maintains its wild type function. For example, a variant ADPG1 polypeptide can have at least 80 (e.g., at least 85, at least 90, at least 95, at least 98, or at least 99) percent sequence identity to SEQ ID NO:30. For example, a variant ADPG1 polypeptide can have one or more (e.g., 2, 3, 4, 5, 6, 7, 8, 9, or 10) amino acid modifications (e.g., substitutions) relative to SEQ ID NO:30.

In some cases, oilseed plants having reduced seedpod shatter as described herein (e.g., oilseed plants having reduced seedpod shatter) can have one or more modifications in an ADPG1 gene (e.g., coding sequence). For example, a pennycress plant having reduced seedpod shatter can include a deletion relative to the wild type pennycress ALC gene (e.g., coding sequence). The deletion can include any number of nucleotides (e.g., 1, 2, 3, 4, 5, 6, 7, 8, 9, 10, 11, 12, 13, 14 or 15 nucleotides). For example, a deletion can be a single base pair deletion or a 4 base pair deletion (see, e.g., FIG. 8). In some cases, an oilseed plant having reduced seedpod shatter as described herein can include a single base pair deletion in a wild type pennycress ADPG1 gene (e.g., SEQ ID NO:29). For example, an oilseed plant having reduced seedpod shatter as described herein can include a single base pair deletion of residue 104 in a wild type pennycress ADPG1 gene. A representative modified pennycress ALC gene (e.g., coding sequence) having a loss-of-function single base pair deletion is as set forth in SEQ ID NO:31. In some cases, oilseed plants having reduced seedpod shatter as described herein (e.g., oilseed plants having reduced seedpod shatter) can have one or more modifications in an ADPG1 polypeptide (e.g., an ADPG1 polypeptide encoded by an ADPG1 gene having one or more modifications). For example, a modified pennycress ADPG1 gene (e.g., coding sequence) having a loss-of-function single base pair deletion (e.g., SEQ ID NO:31) can encode a modified ADPG1 polypeptide (e.g., a modified ADPG1 polypeptide having reduced ADPG1 polypeptide expression and/or reduced ADPG1 polypeptide function). In some cases, a modified pennycress ADPG1 gene having a loss-of-function single base pair deletion can encode a modified ADPG1 polypeptide that is truncated relative to a wild type ADPG1 polypeptide (e.g., SEQ ID NO:30). In some cases, a single base pair deletion can result in a frameshift such that a modified ADPG1 polypeptide can include an aberrant amino acid sequence (e.g., an aberrant C-terminal amino acid sequence). A representative modified pennycress ALC polypeptide is as set forth in SEQ ID NO:32.

In some cases, an oilseed plant having reduced seedpod shatter as described herein can include a 4 base pair deletion in a wild type pennycress ADPG1 gene (e.g., SEQ ID NO:29). For example, an oilseed plant having reduced seedpod shatter as described herein can include a 4 base pair deletion of residues 101 to 104 in a wild type pennycress ADPG1 gene. A representative modified pennycress ALC gene (e.g., coding sequence) having a loss-of-function single base pair deletion is as set forth in SEQ ID NO:33. In some cases, oilseed plants having reduced seedpod shatter as described herein (e.g., oilseed plants having reduced seedpod shatter) can have one or more modifications in an ADPG1 polypeptide (e.g., an ADPG1 polypeptide encoded by an ADPG1 gene having one or more modifications). For example, a modified pennycress ADPG1 gene (e.g., coding sequence) having a loss-of-function 4 base pair deletion (e.g., SEQ ID NO:33) can encode a modified ADPG1 polypeptide (e.g., a modified ADPG1 polypeptide having reduced ADPG1 polypeptide expression and/or reduced ADPG1 polypeptide function). In some cases, a modified pennycress ADPG1 gene having a loss-of-function 4 base pair deletion can encode a modified ADPG1 polypeptide that is truncated relative to a wild type ADPG1 polypeptide (e.g., SEQ ID NO:30). In some cases, a 4 base pair deletion can result in a frameshift such that a modified ADPG1 polypeptide can include an aberrant amino acid sequence (e.g., an aberrant C-terminal amino acid sequence). A representative modified pennycress ALC polypeptide is as set forth in SEQ ID NO:34.

Any appropriate method can be used to introduce one or more modifications into a gene encoding a polypeptide involved in seedpod shatter to produce oilseed plants described herein (e.g., oilseed plants having reduced seedpod shatter).

In some cases, mutagenesis (e.g., chemical mutagenesis) can be used to produce oilseed plants having reduced seedpod shatter. For example, mutagenesis can be used to modify one or more genes encoding a polypeptide involved in seedpod shatter. Mutagenesis can be performed using any appropriate mutagen. A mutagen can be a chemical mutagen. Examples of mutagens that can be used to produce oilseed plants having reduced seedpod shatter include, without limitation, ethyl methane sulphonate (EMS), 1-methyl-1-nitrosourea, 1-ethyl-1-nitrosourea, fast neutrons (FN), gamma rays, x-rays, ultraviolet light, T-DNAs, RNA interference (RNAi), and micro RNAs. For example, EMS can be used to induce G to A substitutions and/or C to T substitutions in a nucleotide sequence. In cases where mutagenesis is used to produce oilseed plants having one or more modifications in a gene encoding a polypeptide involved in seedpod shatter, one or more genes encoding a polypeptide involved in seedpod shatter and/or one or more polypeptides involved in seedpod shatter can be sequenced to determine whether or not a modification described herein (e.g., a modification effective to result in reduced seedpod shatter) is present.

Figure 3E:
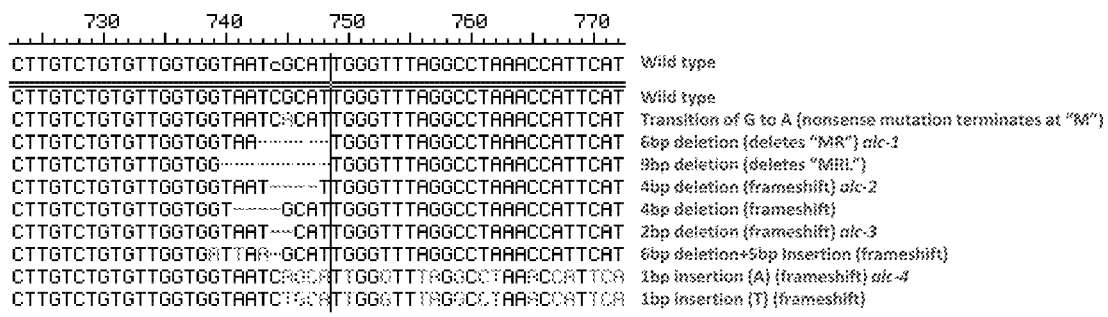

In some cases, genome editing can be used to produce oilseed plants having reduced seedpod shatter. For example, genome editing can be used to modify one or more genes encoding a polypeptide involved in seedpod shatter. Genome editing, or genome editing with engineered nucleases (GEEN) can insert, replace, or remove DNA from a genome using one or more site-specific nucleases (SSN) and, in some cases, a repair template (RT). Nucleases can be targeted to a specific position in the genome, where their action can introduce a particular modification to the endogenous sequences. For example, a SSN can introduce a targeted double-strand break (DSB) in the genome, such that cellular DSB repair mechanisms incorporate a RT into the genome in a configuration that produces heritable glyphosate resistance in the cell, in a plant regenerated from the cell, and in any progeny of the regenerated plant. Nucleases useful for genome editing include, without limitation, CRISPR-associated nucleases (e.g., Cas9, SpCas9, SaCas9, and Cpf1), zinc finger nucleases (ZFNs), transcription activator-like effector nucleases (TALE nucleases), and homing endonucleases (HE; also referred to as meganucleases). For example, a CRISPR-Cas9 system can be used to introduce one or more loss-of-function modifications described herein into a gene (e.g., coding sequence) encoding a polypeptide involved in seedpod shatter. For example, a CRISPR-Cas9 vector can include at least one guide sequence specific to a wild type pennycress ALC sequence (see, e.g., SEQ ID NO:5, FIG. 3, and Example 3) and/or at least one guide sequence specific to a pennycress ADPG1 sequence (see, e.g., SEQ ID NO:29, FIG. 8, and Example 4) upstream of a PAM. A Cas enzyme will bind to and cleave within the gene only if the target site is followed by a PAM sequence. For example, the canonical PAM is the sequence 5'-NGG-3', where N is any nucleotide followed by two guanine (G) nucleotides. The Cas9 component of a CRISPR-Cas9 system designed to introduce one or more loss-of-function modifications described herein can be any appropriate Cas9. In some cases, the Cas9 of a CRISPR-Cas9 system described herein can be a *Staphylococcus aureus* Cas9 (SaCas9). One example of a SaCas9 is described in, for example, Steinert et al., 2015 *Plant J.* 84:1295-305.

The genome editing reagents described herein can be introduced into an oilseed plant by any appropriate method. In some cases, nucleic acids encoding the genome editing reagents can be introduced into a plant cell using *Agrobacterium* or *Ensifer* mediated transformation, particle bombardment, liposome delivery, nanoparticle delivery, electroporation, polyethylene glycol (PEG) transformation, or any other method suitable for introducing a nucleic acid into a plant cell. In some cases, the SSN or other expressed gene editing reagents can be delivered as RNAs or as proteins to a plant cell and the RT, if one is used, can be delivered as DNA.

The invention will be further described in the following examples, which do not limit the scope of the invention described in the claims.

EXAMPLES

Example 1: Domesticated Pennycress Plants

To identify domestication genes in pennycress plants, pennycress seeds were mutagenized with several different mutagens, including ethyl methanesulfonate (EMS), fast neutrons (FN) and gamma rays (γ rays). Treatment of dry plant seeds with mutagens results in the generation of distinct sets of mutations in every cell in the seed. The fate of many of these cells can be followed when a mutation in one of these cells results in a visible phenotype creating a marked plant sector. For example, mutations that induce the formation of either yellow or pale sectors have been used to generate embryonic cellular fate maps in *Arabidopsis*. These fate maps make predictions about the contribution of cells in the embryonic meristem to development of subsequent plant structures. The largest of such sectors can be used to estimate the number of cells (known as the genetically effective cells) that give rise to the gametes in the treated dry M1 seeds. In such sectors, both the pollen and egg cells share common progenitor cells. After meiosis in commonly derived anthers and ovules, one quarter of the seeds will be homozygous for any mutations carried in common progenitor cells. Sectors similar to those seen in mutagenized *Arabidopsis* populations were observed in the EMS mutagenized M1 pennycress plants. The largest sectors observed in pennycress encompassed approximately a third of the floral meristem, which is consistent with the presence of three genetically effective cells in the dry seed. Thus, a pool of seeds collected from 10 M1 plants would represent approximately 30 different mutagenic events.

Pennycress plants exhibiting domestication enabling traits such as reduced seedpod shatter were analyzed and loss of function mutations in domestication genes were identified.

Materials and Methods

Mutagenesis (EMS, FN, and Gamma Ray).

Seeds treated with 0.2% EMS showed somatic chlorophyll sectoring in the leaves (comparable to what is seen with EMS mutagenized *Arabidopsis*) and all of the treated plants set seeds. Approximately 40,000 seeds were treated with EMS and planted in the field. The seeds germinated and a stand of pennycress was established. Approximately 1-2% of the seedlings showed somatic chlorophyll sectoring in the leaves. In addition to EMS, batches of seeds (40,000 per batch) were exposed to different levels of fast neutrons and gamma rays. Seeds were treated with gamma rays with levels ranging from 5 to 45 kilorads (kR) and were treated with fast neutrons (FN) with levels from 8 to 30 gray (Gy). All treated seeds germinated at similar levels and some somatic sectors were noted in seedlings treated with 30 Gy FN. These seeds were considered to be the progenitors of the M1 generation of plants.

Growth of Plants

Winter annual pennycress mutagenized M1 seeds were planted into small plots during the summer. In addition, M1 seeds from an EMS treated spring line were grown in growth chambers. M2 seeds were collected from mutagenized M1 plants and were either grown in the field or in growth chambers. The resulting M2 plants were screened for interesting morphological traits such as altered growth, early flowering and senescence, shatter resistance, and reduced stature. In addition, M3 seeds were collected from approximately 15,000 randomly selected individual M2 plants.

Impact of Shatter in the Field

Figures 10A, 10B, 10C:
FIGS. 10A-10G show an analysis of seedpod shatter in pennycress plants. A-C) Images showing field grown mature pods from wild type pennycress plants (A), a mutant pennycress plant having a modified SPT gene (line MNA7-129) (B), and a mutant pennycress plant having a modified SPT gene (line MNA7-236)(C). D) A gene model for a mutant pennycress plant having a modified SPT gene (line MNA7-129). E) A graph showing losses due to shatter induced by environmental conditions or by mechanical harvest machinery. F) A graph showing gram-force needed to break open wild type (line MN 106) and mutant (lines MNA7-129 and MNA7-236) seedpods. G) Greater force is required to break open the seedpods of the mutant pennycress plants having a modified SPT gene.
Figure 10D:
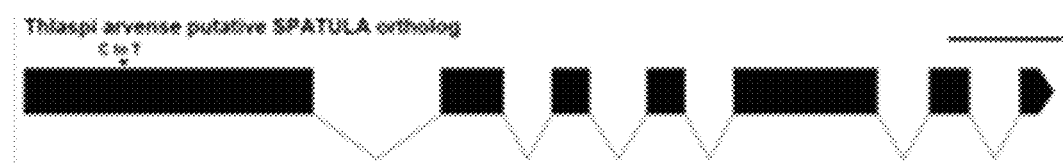
Figure 10E:
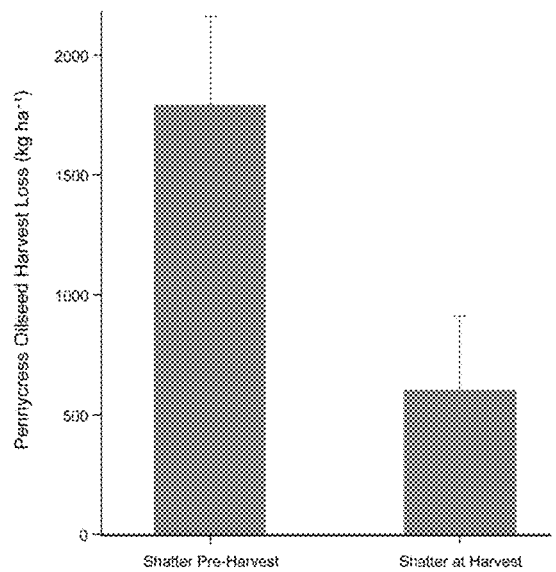

Images were taken of field grown wild type and mutant plants at a time past normal harvest date (FIGS. 2C-D). To measure pre harvest losses due to environmental conditions, plastic containing of known area were place under the canopy of wild type pennycress plants two weeks prior to normal harvest date. Weight of seeds that dropped pre harvest into the container divided by the container area were converted to kg/ha as shown in FIG. 10E. New plastic container were placed in the field immediately prior to harvest. Seeds that dropped into the containing during the harvest were used to calculate loss during harvest as shown in FIG. 10E.

Measuring Shatter Resistance

Shatter resistance was quantitatively measured using a gram force meter attached to an alligator clip. One lateral side of a pod was clipped and the other side was manually pulled until the pod split apart at the septum. The maximum force recorded by the meter was consider the force needed to break open the pod.

Sequencing

PCR primers were designed to amplify the candidate pennycress genes (Table 1) and the products were subject to Sanger sequencing.

TABLE 1

PCR primers.

| primer | forward primer sequence | SEQ ID NO: | reverse primer sequence | SEQ ID NO: |
|---|---|---|---|---|
| SPT | GGGCAATGTTATT ACCTCCG | 51 | GGCTCTATGACAG ACCAATC | 52 |

Results

Figure 10F:
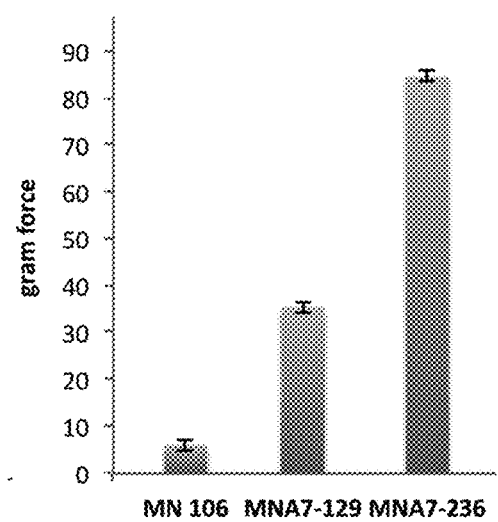
Figure 10G:
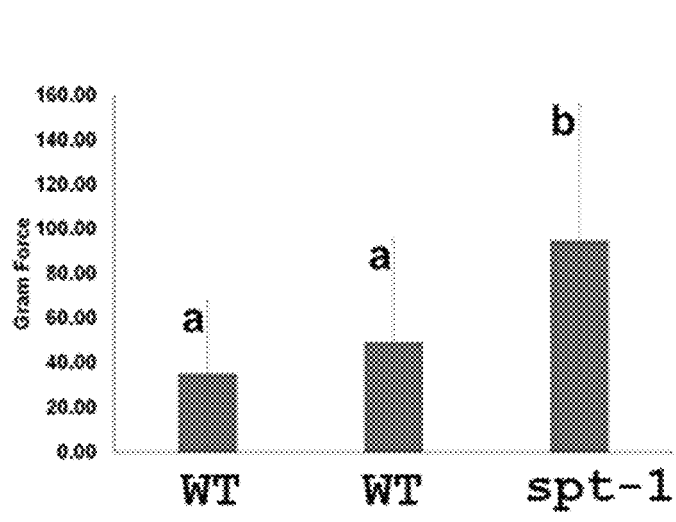
Figure 11A:
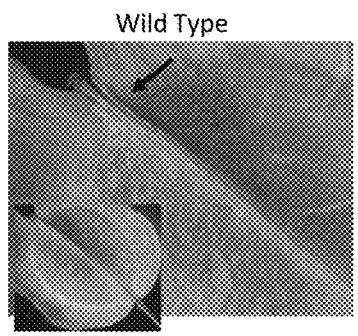
FIGS. 11A-11E show an analysis of seedpod shatter in pennycress plants. A-C) Microscopic images of seedpods from a wild type pennycress plant (A), mutant pennycress plant having a modified ALCATRAZ gene (line ME5) (B), and seedpods from a mutant pennycress plant having a modified ALCATRAZ gene (line alc-4) (C). D) A graph with averages of the amounts of pulling force necessary to break the pods open. Asterisks represent significant differences compared to wild type as determined by Student's t-test. Bars represent standard deviations; n=12. E) Greater force is required to break open the seedpods from a mutant pennycress plant having a modified ALCATRAZ gene (lines alc-1, alc-2, alc-3, and alc-4).
Figure 11B:
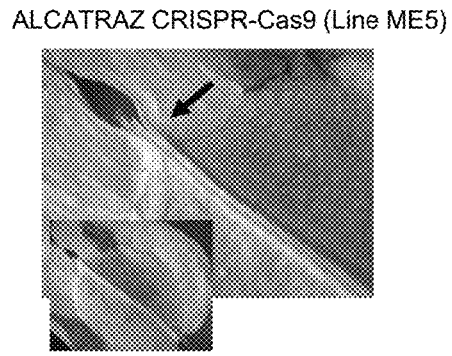
Figure 11C:
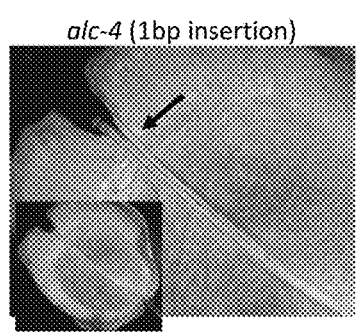
Figure 11D:
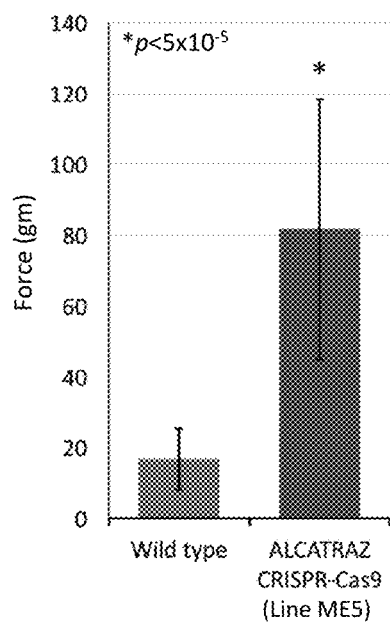
Figure 11E:
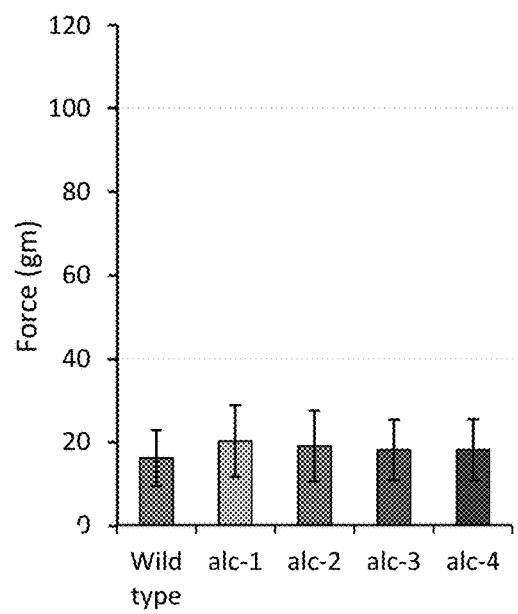

Pod shatter can drastically reduce yield, either from natural pod breakage in the field or due to losses during harvest (FIG. 10E). Several M2 lines showing reduced seedpod shatter were identified. The reanalysis of M3 progeny from two of these lines, MN A7-129 and MN A7-236, is shown in FIGS. 10F and 10G. The mutant pods required statistically significant greater force than wild type for breakage. Furthermore, these mutants exhibited reduced shattering under field conditions relative to wild type (FIGS. 10A-10C). WGS revealed the presence of a mutation in a putative *Arabidopsis* ortholog of SPATULA (SPT) in MN A7-129 (FIG. 9 and FIG. 10D). The mutation results in the substitution of tryptophan for a highly conserved arginine. Importantly in *Arabidopsis*, spt mutants exhibit increased pod shatter resistance.

These results demonstrate that a domesticated pennycress plant with reduced seedpod shatter can be designed by modifying the SPT gene.

Example 2: Generation and Characterization of Indehiscent (Ind; Also Referred to as Reduced Pod Shatter1-1 (rps1-1)) Line E42

Materials and Methods

Solutions:
  A) 0.2 M sodium phosphate monobasic ($NaH_2PO_4 * H_2O$) 6.9 g/250 mL
  B) 0.2 M sodium phosphate dibasic ($NaH_2PO_4$ anhydrous) 7.1 g/250 mL
  For 50 mL of 0.1 M sodium phosphate buffer at pH 7:
    9.75 mL A
    15.25 mL B
    25.0 mL $dH_2O$
  0.2% EMS in buffer:
    20 mL 0.1M Sodium Phosphate Buffer, pH 7
    40 µL EMS liquid (Sigma #M0880-5G)
  0.1 M sodium thiosulfate at pH 7.3:
    12.4 g sodium thiosulfate in 500 mL Primary Seed Surface Sterilization Wild-type pennycress (*Thlaspi arvense*) seeds (Spring 32 ecotype) were surface sterilized for 10 minutes in a 30% bleach, 0.05% SDS solution before being rinsed 3× with sterile water. Sterilized seeds were immediately subjected to EMS treatment.

Ethyl Methane Sulfonate (EMS) Treatment of Pennycress Seeds

Sterilized pennycress seeds (41 g) were agitated in distilled water overnight. Four 250 mL, Erlenmeyer flasks with 10 g seed each, and 1 g in a separate small flask as a control, were agitated. The water was decanted.

25 mLs of 0.2% EMS in 0.1M sodium phosphate buffer (pH 7) was added. The control received only phosphate buffer with no EMS. The flasks were shaken in fume hood for 18 hours. The EMS solution was decanted off into an EMS waste bottle.

To rinse the seeds, 25 mLs of $dH_2O$ was added to each flask, and the flasks were shaken for 20 minutes. The rinse water was decanted into the EMS waste bottle.

To deactivate the EMS, seeds were washed for 20 minutes in 0.1M sodium thiosulfate (pH 7.3). The sodium thiosulfate solution was decanted into the EMS waste bottle.

The seeds were rinsed 4 times with $dH_2O$ for 15 minutes.

The seeds were suspended in 0.1% agarose, and germinated directly in autoclaved Reddiearth soil at a density of approximately 10 seeds per 4-inch pot.

Plant Growth Conditions

EMS-treated pennycress seeds were germinated and grown in an environmental growth chamber at 21° C., 16:8 6400K fluorescent light/dark, 50% humidity. Approximately 14 days after planting, plants were thinned and transplanted to a density of 4 plants per 4-inch pot. These $M_1$-generation plants showed telltale chlorotic leaf sectors that are indicative of a successful mutagenesis.

After dry down, these $M_1$-generation plants were catalogued and harvested. The $M_2$-generation seeds were surface sterilized, planted and grown according to the protocols previously described.

Results

Identification and Characterization of RPS1-1 Mutant Line E42

Figure 13E:
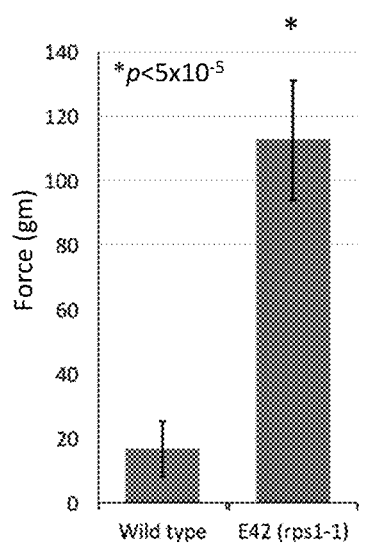
Figure 13F:
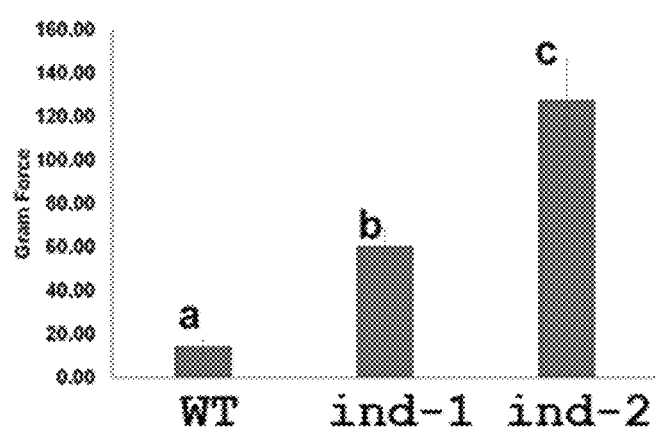

Putative reduced seedpod shatter mutants in the $M_2$-generation were identified as those requiring relatively more force to rupture the pods compared to wild type when harvesting with a closed hand. Seeds ($M_3$-generation) from putative $M_2$-generation mutants were planted and grown in potting soil-containing 4-inch pots in a growth chamber and the pod shatter phenotype re-assessed upon plant senescence. Siblings from only one line (line E42, herein named reduced pod shatter 1-1 or rps1-1; also herein named ind-3) reproduced an obvious reduced seedpod shatter phenotype (FIG. 13). That phenotype was also observed in overwintered field-grown $F_2$-generation plants arising from the following crosses: rps1-1×wild-type Elizabeth; rps1-1× wild-type MN106.

Figure 16:
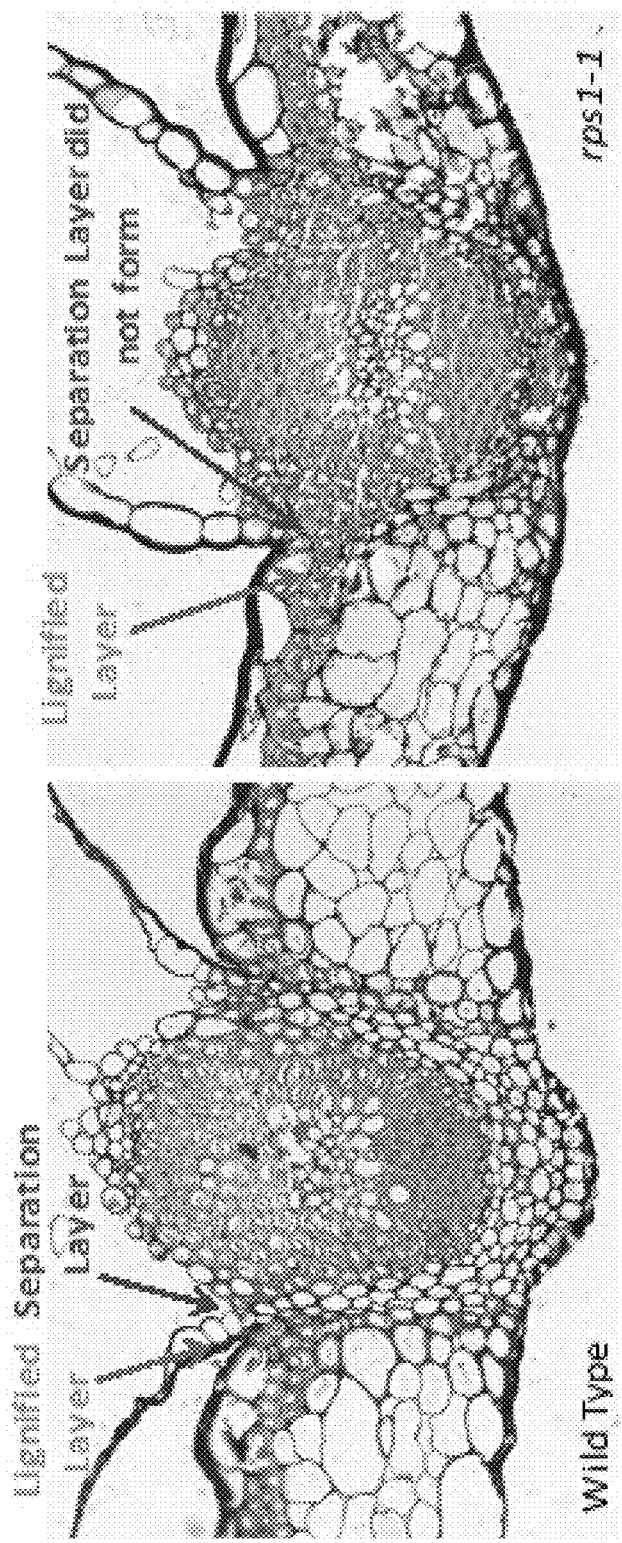
FIG. 16 contains microscopic images of toluidine blue-stained cross sections of a wild-type seedpod (left panel) and a seedpod from a pennycress plant having a modified IND gene (line ind-3 (rps1-1) right panel)) showing that the separation layer of cells did not form in the rps1-1 pod dehiscence zone.
Figures 19A, 19B:
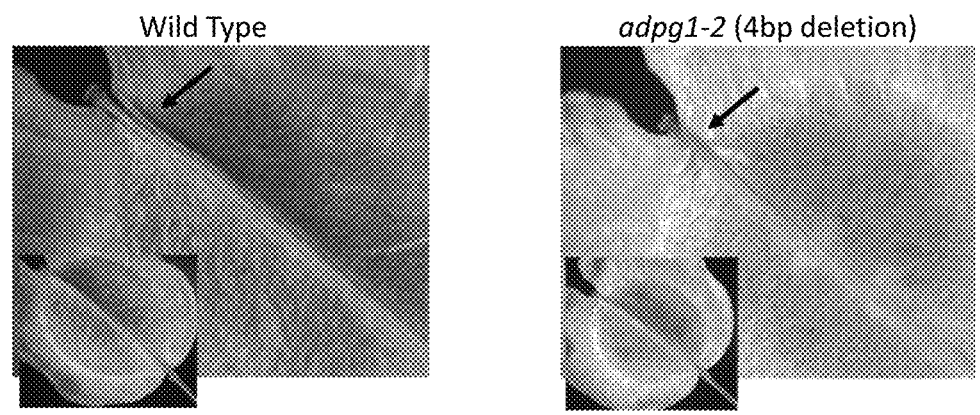
FIGS. 19A-19C show an analysis of seedpod shatter in pennycress plants. A) A microscopic images of seedpods from a wild type pennycress plant. B) A microscopic images of seedpods from a mutant pennycress plant having a modified ADPG1 gene (line adgp1-2). C) Greater force is required to break open the seedpods from a mutant pennycress plant having a modified ADPG1 gene (lines adpg1-1 and adpg1-2). Asterisks represent significant differences compared to wild type as determined by Student's t-test. Bars represent standard deviations; n=30.
Figure 19C:
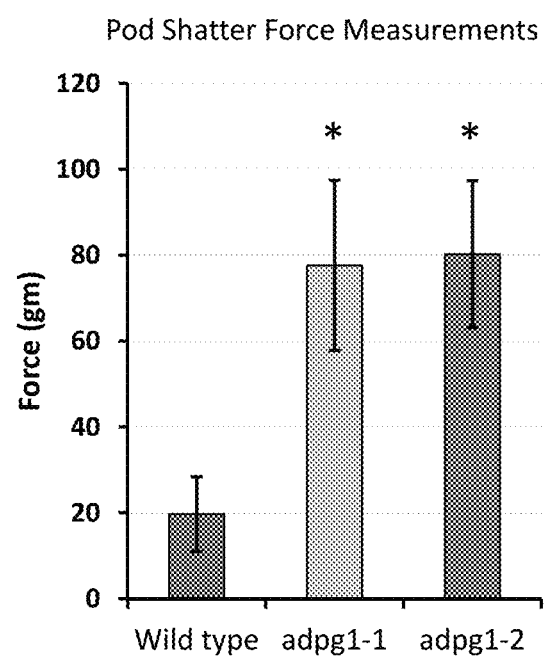
Figure 20:
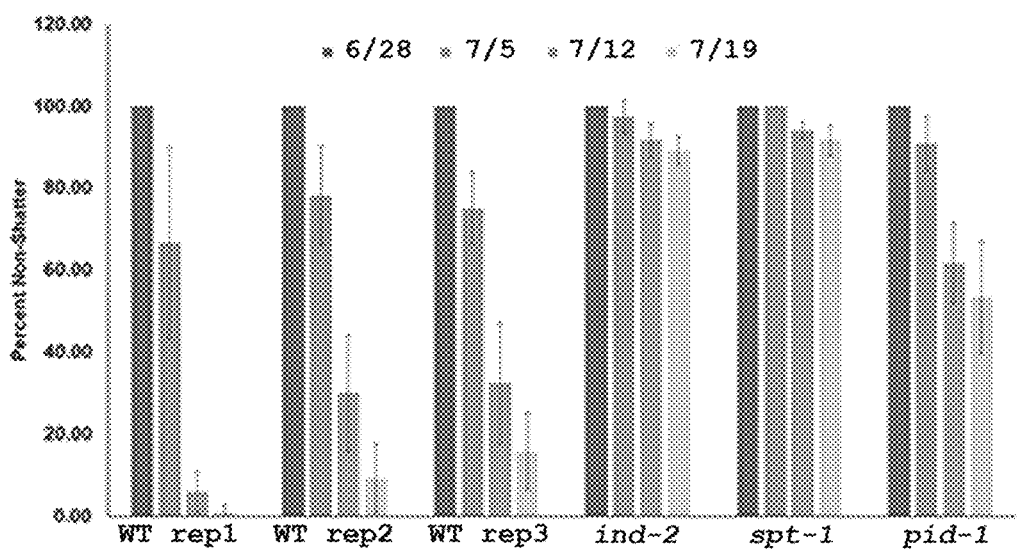
FIG. 20 is a graph showing the percent of non-shattered pods on plants over time. The percent of pods remaining on plants was measured at one-week intervals after pod maturation. All three reps of wild type showed nearly a 100% loss after three weeks whereas ind-2, spt-1, and pid-1 lines retained 60-90% of their seedpods during the same timeframe. All mutant phenotypes at the later time points are significantly different from wild type based on an ANOVA statistical analysis. Bars represent standard deviations.

The growth of rps1-1 plants was indistinguishable from that of wild-type plants (FIG. 13). When pulling the senesced seedpods apart with fingers, rps1-1 pods did not break at the dehiscence zone like wild type, but instead tore within the valve. Microscopic examination of the seedpod dehiscence zone showed that wild type pods often-times were slightly breaking apart, which was a phenotype not observed in rps1-1 pods (FIG. 13). Microscopic examination of toluidine blue-stained sections of rps1-1 seedpods revealed the lignified layer and separation layer within the dehiscence zone were poorly formed or absent (FIG. 16).

Genetic crosses were also made between rps1-1 plants and wild-type Spring 32 plants. $F_1$-generation plants exhibited wild-type pod shatter whereas $F_2$-generation plants segregated 3:1 wild-type to reduced seedpod shatter (61 plants out of 217 showed the pod shatter phenotype=28.1%). These results confirmed the rps1-1 mutation to be recessive and segregated in a Mendelian fashion.

Figure 14A:
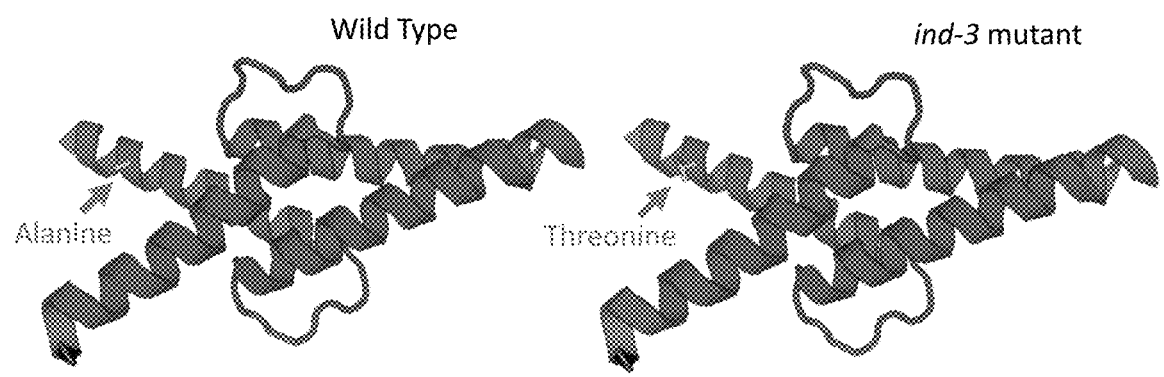
FIGS. 14A-14B show an exemplary mechanism for IND loss of function in seedpods from a mutant pennycress plant having a modified IND gene (line ind-3). A) Protein modeling of IND was performed using SWISS-MODEL (swiss-model.expasy.org/). B) The alanine to threonine amino acid substitution in ind-3 likely affects protein binding to the DNA. IND encodes a transcription factor that regulates expression of seedpod shatter-related genes.
Figure 14B:
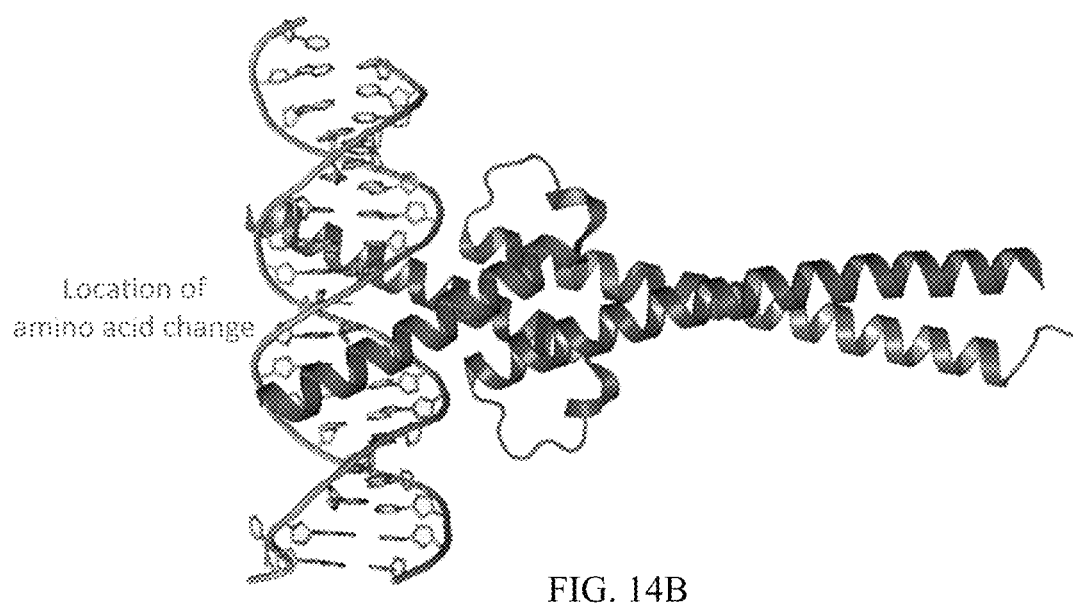

EMS mutagenesis typically introduces single-nucleotide transition mutations (e.g. G to A) into plant genomes. To identify the mutation in rps1-1 plants, DNA was extracted from rps1-1 and wild-type leaf tissue using either the CTAB protocol (below) or the Qiagen DNeasy Plant Mini Kit (product number 69106). PCR amplification of the INDEHISCENT (IND; also referred to as REDUCED SEEDPOD SHATTER (RPS)), SPATULA (SPT), ALCATRAZ (ALC), and REPLUMLESS (RPL) genes was performed and the resultant DNA sequenced. No mutations were initially identified in these genes. To resolve this, DNA from 42 F$_2$-generation rps1-1×wild-type Spring 32 plants was extracted using the Qiagen DNeasy Plant Mini Kit and pooled. The pooled DNA was sequenced using a HiSeq 2500 sequencer. Detailed sequence analyses confirmed that a G to A transition mutation in the IND gene coding sequence co-segregated with the reduced seedpod shatter phenotype. This transition mutation at nucleotide residue 301 as set forth in SEQ ID NO:15 results in an alanine (A) to threonine (T) amino acid change at residue 101 in the amino acid sequence set forth in SEQ ID NO:16. The amino acid change resides in the DNA binding domain of the IND polypeptide (FIG. 14A, B) and likely disrupts binding of the IND transcription factor to promoters of seedpod shatter-related genes it regulates.

Example 3: Shatter Generation and Characterization of ALC Mutant Lines ME3, ME5, and ME6 by Direct Targeting of ALC with CRISPR-SaCas9

Materials and Methods

Construction of the Pennycress ALCATRAZ (ALC) Gene-Specific CRISPR-saCas9 Vector The constructs and cloning procedures for generation of *Thlaspi arvense* (pennycress) ALC-specific CRISPR-Sa-Cas9 constructs were as described elsewhere (see, e.g., Steinert et al., 2015, *Plant J.*, 84:1295-305; and Fauser et al., 2014, *Plant J.*, 79: 348-359).

The plant selectable marker (formerly NPT) was replaced with a hygromycin resistance (Hygromycin phosphotransferase (HPT)) gene in the pDe-SaCas9 binary vector.

Oligos were annealed to create a 20mer protospacer specific to the pennycress ALC sequence:
PennyALC_CRISPR-SaCAS9_FWD:

```
                                      (SEQ ID NO: 53)
5' ATTGTGCGATTACCACCAACACAG 3'
```

PennyALC_CRISPR-SaCAS9_REV:

```
                                      (SEQ ID NO: 54)
5' AAACCTGTGTTGGTGGTAATCGCA 3'
```

Vector Transformation into *Agrobacterium*

The pDe-SaCas9_Hyg vector containing the *Staphylococcus aureus* Cas9 (SaCas9) cassette with the pennycress ALC sequence-specific protospacer was transformed into *Agrobacterium tumefaciens* strain GV3101 using the freeze/thaw method described elsewhere (see, e.g., indiana.edu/~pikweb/Protocols %20page.html)

The transformation product was plated on 1% agar Luria Broth (LB) plates with gentamycin (50 µg/ml) rifampicin (50 µg/ml) and spectinomycin (75 µg/ml). Single colonies were selected after two days of growth at 28° C.

Plant Transformation—Pennycress Floral Dip

Day One:

5 mL of LB+5 uL with appropriate antibiotics (Rifampin (50), Spectinomycin (75), and/or Gentamycin (50)) were inoculated with *Agrobacterium*. The cultures were allowed to grow, with shaking, overnight at 28° C.

Day Two (Early Morning):

25 mL of Luria Broth+25 uL appropriate antibiotics (Rifampin (50), Spectinomycin (75), and/or Gentamycin (50)) were inoculated with the initial culture from day one. The cultures were allowed to grow, with shaking, overnight at 28° C.

Day Two (Late Afternoon):

250 mL of Luria Broth+250 uL appropriate antibiotic (Rifampin (50), Spectinomycin (75), and/or Gentamycin (50)) were inoculated with 25 mL culture. The cultures were allowed to grow, with shaking, overnight at 28° C.

Day Three:

When the culture had grown to an OD$_{600}$ of ~1 (or looks thick and silky), the culture was decanted into large centrifuge tubes (all evenly weighted with analytical balance), and spun at 3,500 RPM at room temperature for 10 minutes to pellet cells. The supernatant was decanted off. The pelleted cells were resuspended in a solution of 5% sucrose and 0.02% Silwet L-77. The suspension was poured into clean beakers and placed in a vacuum chamber.

Newly flowering inflorescences of pennycress were fully submerged into the beakers, and subjected to a pressure of 30 PSI for 10 minutes.

After racemes of pennycress plants (Spring32 variety; these plants were 5 generations removed from seeds) were dipped, they were covered loosely with Saran wrap to maintain humidity and kept in the dark overnight before being uncovered and placed back in the environmental growth chamber.

Screening Transgenic Plants and Growth Condition

Pennycress seeds were surface sterilized by first rinsing in 70% ethanol then incubating 10 minutes in a 30% bleach, 0.05% SDS solution before being rinsed two times with sterile water and plated on selective plates (0.8% agar/one half-strength Murashige and Skoog salts with hygromycin B selection at 40 U ml$^{-1}$. Plates were wrapped in parafilm and kept in an environmental growth chamber at 21° C., 16:8 day/night for 8 days until hygromycin selection was apparent.

Surviving hygromycin-resistant T1-generation seedlings were transplanted into autoclaved Reddiearth soil mix and grown in an environmental growth chamber set to 16 hour days/8 hour nights at 21° C. and 50% humidity. T2-generation seeds were planted, and ~1.5 mg of leaf tissue from each T2-generation plant was harvested with a 3 mm hole punch, then processed using the Thermo Scientific™ Phire™ Plant Direct PCR Kit (Catalog #F130WH) as per manufacturer's instructions. PCR (20 µl volume) was performed on samples from six plants whose pods putatively required more hand force than wild type to shatter upon plant senescence. For the PCR, the following two primers were used, which amplified a 679 base pair fragment containing the protospacer location where the CRISPR-SaCas9 guide RNA and endonuclease had been targeted to bind and cut the genomic DNA:

```
ALCPCRF2:
                                      (SEQ ID NO: 55)
AGGAGCTAAACATCGAAATTCGTTGAAGAG

ALCPCRR2:
                                      (SEQ ID NO: 56)
TGTCGCAGATACTAGAGGAACATCACATCA
```

10 µl of the PCR product was digested with T7 Endonuclease I (Fisher Scientific catalog #M0302L) as per manufacturer's instructions then electrophoresed in a 1% agarose gel (FIG. 15). T7 endonuclease cleaves DNA that contains CRISPR-Cas9-induced DNA mismatches, in this case producing ~185 base pair fragment and a ~494 base pair fragment. The PCR products from all six plants were sequenced, and the three that gave positive results from the T7 endonuclease assay (lines ME3, ME5, and ME6) were found to have mutations in each chromosome pair in the locations expected for CRISPR-Cas9-induced mutations (e.g. at the protospacer adjacent to the NNGGGT PAM site where the guide was targeted to bind. Sequence chromatograms and descriptions of the mutations can be found in FIG. 15.

Example 4: Shatter Generation and Characterization of ADPG1 Mutant Lines by Direct Targeting of ADPG1 with CRISPR-SaCas9

Materials and Methods

The protocols used to generate ADPG1-specific CRISPR-SpCas9 constructs and to identify adpg1 mutations and mutant lines were the same as described in Example 4 above, except instead of using an SaCas9 vector, a modified SpCas9 vector as described in Fauser et al., 2014, *Plant J.,* 79: 348-359 was used. As with the pDe-SaCas9 binary vector, we replaced the plant selectable marker (formerly NPT) in the pDe-SpCas9 binary vector with a hygromycin resistance (Hygromycin phosphotransferase (HPT)) gene. The ADPG1-targeting gRNA protospacer sequence that was used in this vector (highlighted in bold and underlined in SEQ ID NO:29), which is adjacent to the NGG PAM site (underlined and italicized in SEQ ID NO:29), is as follows:
PennyADPG1_CRISPR-SpCAS9_FWD:

(SEQ ID NO: 57)
5' GATGGATATGGTCATGAAGA 3'

PennyADPG1_CRISPR-SpCAS9_REV:

(SEQ ID NO: 58)
5' TCTTCATGACCATATCCATC 3'

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A pennycress plant comprising a modification in an indehiscent (IND) gene, wherein an unmodified IND gene encodes a polypeptide having at least 95% sequence identity to SEQ ID NO:9, wherein the plant comprising the modified IND gene exhibits reduced seedpod shatter compared to a corresponding plant lacking the modification.

2. The plant of claim 1, wherein the modification comprises a substitution.

3. The plant of claim 1, wherein
the modified IND gene comprises a C to T substitution at position 247 relative to SEQ ID NO:11, and the modified IND polypeptide comprises SEQ ID NO:12;
the modified IND gene comprises a G to A substitution at position 260 relative to SEQ ID NO:13, and the modified IND polypeptide comprises SEQ ID NO:14; or
the modified IND gene comprises a G to A substitution at position 301 relative to SEQ ID NO:15, and the modified IND polypeptide comprises SEQ ID NO: 16.

4. The plant of claim 1, wherein the plant comprises seedpods that require about 20 grams to about 120 grams of pulling force to shatter.

5. The plant of claim 1, wherein the plant comprises seedpods that are resistant to shatter under less than about 30 grams force.

6. Seed produced by the plant of claim 1.

7. A method for generating a modified pennycress plant having reduced seedpod shatter compared to a corresponding pennycress plant lacking the modification, the method comprising:
    modifying an indehiscent (IND) gene in the pennycress genome, wherein an unmodified IND gene encodes a polypeptide having at least 95% sequence identity to SEQ ID NO: 9,
    generating a modified pennycress plant, wherein the modified plant exhibits reduced seedpod shatter compared to a corresponding pennycress plant lacking the modification.

8. The method of claim 7, wherein the modifying comprises site-specific gene editing, wherein the site-specific gene editing comprising introducing a guide sequence and a nuclease into a plant cell, wherein the guide sequence comprises a nucleic acid sequence specific to the IND gene, and wherein the nuclease is a CRISPR associated system (Cas) nuclease.

9. The method of claim 7, wherein the modifying comprises mutagenesis, wherein the mutagenesis comprises introducing a mutagen into a plant cell, wherein the mutagen comprises ethyl methane sulphonate (EMS).

10. The method of claim 7, wherein the modifying comprises a substitution.

11. The method of claim 7, wherein
    the modified IND gene comprises a C to T substitution at position 247 relative to SEQ ID NO:11, and the modified IND polypeptide comprises SEQ ID NO:12;
    the modified IND gene comprises a G to A substitution at position 260 relative to SEQ ID NO:13, and the modified IND polypeptide comprises SEQ ID NO:14; or
    the modified IND gene comprises a G to A substitution at position 301 relative to SEQ ID NO:15, and the modified IND polypeptide comprises SEQ ID NO:16.

12. The method of claim 7, further comprising:
    selecting a plant cell having a modification in the IND gene; and
    regenerating a modified plant from the selected plant cell, wherein the plant exhibits reduced seedpod shatter.

13. The method of claim 7, wherein the modified plant comprises seedpods that require about 20 grams to about 120 grams of pulling force to shatter.

14. The method of claim 7, wherein the modified plant comprises seedpods that are resistant to shatter under less than about 30 grams force.

* * * * *

SEQUENCE LISTING

```
Sequence total quantity: 70
SEQ ID NO: 1            moltype = DNA  length = 1806
FEATURE                 Location/Qualifiers
source                  1..1806
                        mol_type = genomic DNA
                        organism = Thlaspi arvense
SEQUENCE: 1
atgatatcac aaagagaaga gagagaagag aagagagtga tgggagataa gaaattgatt   60
tcatcgtctt cttctattgc ctcggtttac gatactcgta ataataacaa tcatcatcac  120
ccaccgtctt cctccgacga gatttctcag tttctccggc atatttcga ccgttcttct   180
cctctcccct cttactattc tccggcgacg atgacgacgg cggcaatcgg agtgcacggc  240
gacccacatg cagacaaccc ccggagcttc gtttctcatc cgccgtctga ctctgcgctc  300
ccgtcgaagc gccccgctga ttactctgag gttttaatag gctccgccgt tggatcagcc  360
tccgccgttg gatcaggctc agccccgtgt tttggtttct ccggaggtaa taacattgcc  420
caaggaaaca gctcagggac tcgagtttcg tcttcttccg ttggagctag cgggaatgac  480
accgacgagt acgattgcga aagcgaggtc tctctctctc tatgtgcatg ttctaaaagt  540
tcccatcttt gtctgtttcc tgagaaaatg ttatactgtg actttctcta acggatctgt  600
actttctttt ctcaccattc aagtgagcaa attaaatttg cctttttttt ctgtgtgtgt  660
gttttttag tgaagtttgt gaatgttaat aatgcacaca gagtgtttgt tgatttgctt  720
gaatgaaatc aggaaggagt agaagctgtg gttgatgatg atcttccctc aaagtctggt  780
cettctcgta gctcatcaaa gcgatgcaga gctgctgaag ttcataattt gtctgaaaag  840
gttttttatt tgctccttgt ttttgttttc tctcccaaaa tcacattcct ttttactcag  900
agattgatgt gatcttgttc tgacagagga ggagaagtag gatcaacgaa aaaatgaaag  960
ctttacaaag tctcatccca aattcaaaca aggtaaaaat acatacaaat gctgaatcat 1020
tctctcattt gtctcttgtt attgtgtctg attatataat gtccattgca atgcgttgat 1080
gattggtggg aagacggata aggcttcaat gcttgatgaa gctatagagt atctgaaaca 1140
gcttcagctt caagtccagg tcacaaaata tccattctca aaaagatatg atacattcac 1200
ttttcccgaa tcaatcttat gaacagatta ctctgtgttt tgcagatgtt gacaatgagg 1260
aatggaataa acttgcatcc tctgtgctta cctggaacta cattacaccc attgcaactc 1320
tctcaggttc gagggatgcc tcaagaagca accaatgatc atctgcttaa tcacaccaac 1380
caattcggtt cgacctctaa cgcacctgag atgatcaaca ccgtgccttc ctcatactcg 1440
ttggaacctt ccgtccgcag tcactttgga cctttccctc tccttacttc acacgcggtg 1500
cgtggtttca taacacattt tcaatctata aaccctagat tcttgaaagc tagtgttctt 1560
actagaaatt tattgttttt tcgtaaagga gatgagtcga gaaggtggac taactcatca 1620
caggttgagc attggtcatt ccaacacaaa cttaaccggt aaagtcttcc tgatttctga 1680
attctcgtga agaagttttt aagacattga caatgttaaa aatgttgcga cgtttgggta 1740
tttgcagggg cacaagctgt gtttaatgga caagaacaac ctgacataaa agatcgactt 1800
acttga                                                            1806

SEQ ID NO: 2            moltype = AA  length = 375
FEATURE                 Location/Qualifiers
source                  1..375
                        mol_type = protein
                        organism = Thlaspi arvense
SEQUENCE: 2
```

MISQREEREE KRVMGDKKLI SSSSSIASVY DTRNNNNHHH PPSSSDEISQ FLRHIFDRSS    60
PLPSYYSPAT MTTAAIGVHG DPHADNPRSF VSHPPSDSAL PSKRPADYSE VLIGSAVGSA   120
SAVGSGSAPC FGFSGGNNIA QGNSSGTRVS SSSVGASGND TDEYDCESEE GVEAVVDDDL   180
PSKSGPSRSS SKRCRAAEVH NLSEKRRRSR INEKMKALQS LIPNSNKTDK ASMLDEAIEY   240
LKQLQLQVQM LTMRNGINLH PLCLPGTTLH PLQLSQVRGM PQEATNDHLL NHTNQFGSTS   300
NAPEMINTVP SSYSLEPSVR SHFGPFPLLT SHAEMSREGG LTHHRLSIGH SNTNLTGAQA   360
VFNGQEQPDI KDRLT                                                   375

SEQ ID NO: 3            moltype = DNA  length = 1806
FEATURE                 Location/Qualifiers
source                  1..1806
                        mol_type = other DNA
                        organism = synthetic construct
SEQUENCE: 3
atgatatcac aaagagaaga gagagaagag aagagagtga tgggagataa gaaattgatt    60
tcatcgtctt cttctattgc ctcggtttac gatactcgta ataataacaa tcatcatcac   120
ccaccgtctt cctccgacga gatttctcag tttctctggc atatttcga ccgttcttct    180
cctctccctt cttactattc tccggcgacg atgacgacgg cggcaatcga agtgcacggc   240
gacccacatg cagacaaccc ccggagcttc gtttctcatc cgccgtctga ctctgcgctc   300
ccgtcgaagc gccccgctga ttactctgag gttttaatag gctccgccgt tggatcagcc   360
tccgccgttg gatcaggctc agcccgtgt tttggtttct ccgagggtaa taacattgcc   420
caaggaaaca gctcagggac tcgagtttcg tcttcttctg ttggagctag cgggaatgac   480
accgacgagt acgattgcga agcgaggtc tctctctctc tatgtgcatg ttctaaaagt   540
tcccatcttt gtctgtttcc tgagaaaatg ttatactgtg actttctcta acggatctgt   600
actttctttt ctcaccattc aagtgagcaa attaaatttg cctttttttt ctgtgtgtgt   660
gttttttag tgaagtttgt gaatgttaat aatgcacaca gagtgttgt tgatttgctt   720
gaatgaaatc aggaaggagt agaagctgtg gttgatgatg atcttccctc aaagtctggt   780
ccttctcgta gctcatcaaa gcgatgcaga gctgctgaag ttcataattt gtctgaaaag   840
gtttttattt tgctccttgt ttttgttttc tctcccaaaa tcacattcct ttttactcag   900
agattgatgt gatcttgttc tgacagagga ggagaagtga gatcaacgaa aaaatgaaag   960
ctttacaaag tctcatccca aattcaaaca aggtaaaaat acatacaaat gctgaatcat  1020
tctctcattt gtctcttgtt attgtgtctg attatataat gtccattgca atgcgttgat  1080
gattggtggg aagacggata aggcttcaat gcttgatgaa gctatagagt atctgaaaca  1140
gcttcagctt caagtccagg tcacaaaata tccattctca aaaagatatg atacattcac  1200
ttttcccgaa tcaatcttat gaacagatta ctctgtgttt tgcagatgtt gacaatgagg  1260
aatggaataa acttgcatcc tctgtgctta cctggaacta cattcaccc attgcaactc  1320
tctcaggttc gagggatgcc tcaagaagca accaatgatc atctgcttaa tcacaccaac  1380
caattcggtt cgacctctaa cgcacctgag atgatcaaca ccgtgccttc ctcatactg  1440
tggaaccttt ccgtccgcag tcactttgga ccttttcctc tccttacttc acacgcggtg  1500
cgtggtttca taacacattt tcaatctata aaccctagat tcttgaaagc tagtgttctt  1560
actagaaatt tattgttttt tcgtaaagga gatgagtcga gaaggtggac taactcatca  1620
caggttgagc attggtcatt ccaacacaaa cttaaccggt aaagtcttcc tgatttctga  1680
attcgtgga agaagttttt aagacattga caatgttaaa aatgttgcga cgtttgggta  1740
tttgcagggg cacaagctgt gtttaatgga caagaacaac ctgacataaa agatcgactt  1800
acttga                                                            1806

SEQ ID NO: 4            moltype = AA  length = 375
FEATURE                 Location/Qualifiers
source                  1..375
                        mol_type = protein
                        organism = synthetic construct
SEQUENCE: 4
MISQREEREE KRVMGDKKLI SSSSSIASVY DTRNNNNHHH PPSSSDEISQ FLWHIFDRSS    60
PLPSYYSPAT MTTAAIGVHG DPHADNPRSF VSHPPSDSAL PSKRPADYSE VLIGSAVGSA   120
SAVGSGSAPC FGFSGGNNIA QGNSSGTRVS SSSVGASGND TDEYDCESEE GVEAVVDDDL   180
PSKSGPSRSS SKRCRAAEVH NLSEKRRRSR INEKMKALQS LIPNSNKTDK ASMLDEAIEY   240
LKQLQLQVQM LTMRNGINLH PLCLPGTTLH PLQLSQVRGM PQEATNDHLL NHTNQFGSTS   300
NAPEMINTVP SSYSLEPSVR SHFGPFPLLT SHAEMSREGG LTHHRLSIGH SNTNLTGAQA   360
VFNGQEQPDI KDRLT                                                   375

SEQ ID NO: 5            moltype = DNA  length = 973
FEATURE                 Location/Qualifiers
source                  1..973
                        mol_type = genomic DNA
                        organism = Thlaspi arvense
SEQUENCE: 5
atgggcaatc ccgacgacgg tgatcgtctt cctcctccat cttcttccga cgaactctcg    60
agcgttctcc ggcagattct gtcccgtgcc cgataactca aacttcgtc gtcaccaccg   120
aggagagtcg tttcctccgc tgaaatgttc gaccggacct tccctttcgt tcccggccga   180
gcggtttctt ccgccgccta aaagtcgct ggcgaagaca aatgtgcttt cgaaaacaag   240
gtaagctaac atttttaagc tgtcgagaaa cttcactcgc ttcgtttatg aattaagcta   300
acatttcttt gtaatggtaa caacactaaa gagaaatgga ggagctaaac atcgaaattc   360
gttgaagaga aacaatgatg cacaattcca caacttgtct gaaaaggttc tgtcttttaa   420
tcttctaaag attctgatt tgagaaagaa gcaatttgt gatttaatt tatagaatct   480
gaaattattg gcagaggagg aggagcaaga tcaacgagaa aatgaaagct tgcagaaac   540
tgataccca ttccaacaag gtaaatgaaa aagttggaaa tctttctact ctgaataca   600
atcgtgagaa acaccgttat gcttttgttt gttgttttgt agactgataa agcctcaatg   660
ctcgatgaag ctatagagta tatgaagcag cttcaacttc aagtgcaggt tttggcttt   720
actaagatca tatacaacca aattataatt ttttgtaaaa ctcagcgctt atttgatcat   780

```
acaatggata atgcagactt tagcagtcat gaatggttta ggcctaaacc caatgcgatt    840
accaccaaca cagacaagga tcaatgaggc cttacacatg cagactctgc ttggcggttc    900
tcactcgctt gttcaccgtg aaccacccga agcaagtcaa gaaatgtgct tttccgctgc    960
ggctcgtctt taa                                                      973

SEQ ID NO: 6            moltype = AA   length = 207
FEATURE                 Location/Qualifiers
source                  1..207
                        mol_type = protein
                        organism = Thlaspi arvense
SEQUENCE: 6
MGNPDDGDRL PPPSSSDELS SVLRQILSRA PITQPSSSPP RRVVSSAEMF DRTFPFVPGG     60
AVSSAAYKVA GEDKCAFENK RNGGAKHRNS LKRNNDAQFH NLSEKRRRSK INEKMKALQK    120
LIPNSNKTDK ASMLDEAIEY MKQLQLQVQT LAVMNGLGLN PMRLPPTQTR INEALHMQTL    180
LGGSHSLVHR EPPEASQEMC FSAAARL                                        207

SEQ ID NO: 7            moltype = DNA   length = 977
FEATURE                 Location/Qualifiers
source                  1..977
                        mol_type = other DNA
                        organism = synthetic construct
SEQUENCE: 7
atgggcaatc ccgacgacgg tgatcgtctt cctcctccat cttcttccga cgaactctcg     60
agcgttctcc ggcagattct gtcccgtgcc ccgataactc aaccttcgtc gtcaccaccg    120
aggagagtcg tttcctccgc tgaaatgttc gaccggacct ccctttcgt tcccggcgga    180
gcggtttctt ccgccgccta taagtcgct ggcgaagaca aatgtgcttt cgaaaacaag    240
gtaagctaac attttttaagc tgtcgagaaa cttcactcgc ttcgtttatg aattaagcta    300
acatttctt gtaatggtaa caacactaaa gagaaatgga ggagctaaac atcgaaattc    360
gttgaagaga aacaatgatg cacaattcca caacttgtct gaaaaggttc tgtcttttaa    420
tcttctaaag attctcgatt tgagaaagaa aagcaattgt gattttaatt tatagaatct    480
gaaattattt gcagaggagg aggagcaaga tcaacgagaa aatgaaagct ttgcagaaac    540
tgatacccaa ttccaacaag gtaaatgaaa aaagttggaa tctttctact ctgaatacaa    600
atcgtgagaa acaccgttat gcttttgttt gtttgttttgt agactgataa agcctcaatg    660
ctcgatgaag ctatagagta tatgaagcag cttcaacttc aagtgcaggt tttttggcttt    720
actaagatca tatacaacca aattataatt ttttgtaaaa ctcagcgctt atttgatcat    780
acaatggata atgcagactt tagcagtcat gaatggttta ggcctaaacc caatgcgtct    840
cattaccacc aacacagaca aggatcaatg aggccttaca catgcagact ctgcttggcg    900
gttctcactc gcttgttcac cgtgaaccac ccgaagcaag tcaagaaatg tgcttttccg    960
ctgcggctcg tctttaa                                                  977

SEQ ID NO: 8            moltype = AA   length = 205
FEATURE                 Location/Qualifiers
source                  1..205
                        mol_type = protein
                        organism = synthetic construct
SEQUENCE: 8
MGNPDDGDRL PPPSSSDELS SVLRQILSRA PITQPSSSPP RRVVSSAEMF DRTFPFVPGG     60
AVSSAAYKVA GEDKCAFENK RNGGAKHRNS LKRNNDAQFH NLSEKRRRSK INEKMKALQK    120
LIPNSNKTDK ASMLDEAIEY MKQLQLQVQT LAVMNGLGLI SLPPTQTRIN EALHMQTLLG    180
GSHSLVHREP EASQEMCFS AAARL                                           205

SEQ ID NO: 9            moltype = DNA   length = 519
FEATURE                 Location/Qualifiers
source                  1..519
                        mol_type = genomic DNA
                        organism = Thlaspi arvense
SEQUENCE: 9
atgaattgga caaacctaa tgatctcatc acacaagaat accctttct ccacgatcct       60
catctcatga tagatccacc tcccgaaacc ctaagtcatt tccagccccc gccgacactt    120
ttctccggtc acggagggga ggaagaagaa gaagaagata atgaagagga agagatggat    180
gcgatgaagg agatgcagta cacgatcgct gccatgcagc ccgtggacat cgatccagcc    240
accgttccta aaccgaaccg ccgtaacgta agggtaagcg acgacactca gacggtggtg    300
actcgtcggc gtcgagaaaa gataagcgag aagatccgaa tattgaagag gatggtgcca    360
ggcggtgcga agatggacac agcctccatg ctcgacgagg ccatccgtta taccaagttc    420
ttgaaacggc aggtgaagct tcttcagcct cactctcagc ttggagctcc tatgtctgac    480
ccctcttgcc tttgttatta ccacaactcc caaacctaa                          519

SEQ ID NO: 10           moltype = AA   length = 172
FEATURE                 Location/Qualifiers
source                  1..172
                        mol_type = protein
                        organism = Thlaspi arvense
SEQUENCE: 10
MNWNKPNDLI TQEYPFLHDP HLMIDPPPET LSHFQPPPTL FSGHGGEEEE EDNEEEMD       60
AMKEMQYTIA AMQPVDIDPA TVPKPNRRNV RVSDDTQTVV ARRREKISE KIRILKRMVP    120
GGAKMDTASM LDEAIRYTKF LKRQVKLLQP HSQLGAPMSD PSCLCYYHNS QT            172

SEQ ID NO: 11           moltype = DNA   length = 519
FEATURE                 Location/Qualifiers
```

```
source                  1..519
                        mol_type = other DNA
                        organism = synthetic construct
SEQUENCE: 11
atgaattgga acaaacctaa tgatctcatc acacaagaat accccttcct ccacgatcct   60
catctcatga tagatccacc tcccgaaacc ctaagtcatt tccagccccc gccgacactt  120
ttctccggtc acggagggga ggaagaagaa gaagaagata atgaagagga agagatggat  180
gcgatgaagg agatgcagta cacgatcgct gccatgcagc ccgtggacat cgatccagcc  240
accgtttcta aaccgaaccg ccgtaacgta agggtaagcg acgacactca gacggtggtg  300
gctcgtcggc gtcgagaaaa gataagcgag aagatccgaa tattgaagag gatggtgcca  360
ggcggtgcga agatggacac agcctccatg ctcgacgaag ccatccgtta taccaagttc  420
ttgaaacggc aggtgaagct tcttcagcct cactctcagc ttggagctcc tatgtctgac  480
ccctcttgcc tttgttatta ccacaactcc caaacctaa                         519

SEQ ID NO: 12           moltype = AA  length = 172
FEATURE                 Location/Qualifiers
source                  1..172
                        mol_type = protein
                        organism = synthetic construct
SEQUENCE: 12
MNWNKPNDLI TQEYPFLHDP HLMIDPPPET LSHFQPPPTL FSGHGGEEEE EEDNEEEEMD   60
AMKEMQYTIA AMQPVDIDPA TVSKPNRRNV RVSDDTQTVV ARRRREKISE KIRILKRMVP  120
GGAKMDTASM LDEAIRYTKF LKRQVKLLQP HSQLGAPMSD PSCLCYYHNS QT          172

SEQ ID NO: 13           moltype = DNA  length = 519
FEATURE                 Location/Qualifiers
source                  1..519
                        mol_type = other DNA
                        organism = synthetic construct
SEQUENCE: 13
atgaattgga acaaacctaa tgatctcatc acacaagaat accccttcct ccacgatcct   60
catctcatga tagatccacc tcccgaaacc ctaagtcatt tccagccccc gccgacactt  120
ttctccggtc acggagggga ggaagaagaa gaagaagata atgaagagga agagatggat  180
gcgatgaagg agatgcagta cacgatcgct gccatgcagc ccgtggacat cgatccagcc  240
accgttccta aaccgaacca ccgtaacgta agggtaagcg acgacactca gacggtggtg  300
gctcgtcggc gtcgagaaaa gataagcgag aagatccgaa tattgaagag gatggtgcca  360
ggcggtgcga agatggacac agcctccatg ctcgacgaag ccatccgtta taccaagttc  420
ttgaaacggc aggtgaagct tcttcagcct cactctcagc ttggagctcc tatgtctgac  480
ccctcttgcc tttgttatta ccacaactcc caaacctaa                         519

SEQ ID NO: 14           moltype = AA  length = 172
FEATURE                 Location/Qualifiers
source                  1..172
                        mol_type = protein
                        organism = synthetic construct
SEQUENCE: 14
MNWNKPNDLI TQEYPFLHDP HLMIDPPPET LSHFQPPPTL FSGHGGEEEE EEDNEEEEMD   60
AMKEMQYTIA AMQPVDIDPA TVPKPNHRNV RVSDDTQTVV ARRRREKISE KIRILKRMVP  120
GGAKMDTASM LDEAIRYTKF LKRQVKLLQP HSQLGAPMSD PSCLCYYHNS QT          172

SEQ ID NO: 15           moltype = DNA  length = 519
FEATURE                 Location/Qualifiers
source                  1..519
                        mol_type = other DNA
                        organism = synthetic construct
SEQUENCE: 15
atgaattgga acaaacctaa tgatctcatc acacaagaat accccttcct ccacgatcct   60
catctcatga tagatccacc tcccgaaacc ctaagtcatt tccagccccc gccgacactt  120
ttctccggtc acggagggga ggaagaagaa gaagaagata atgaagagga agagatggat  180
gcgatgaagg agatgcagta cacgatcgct gccatgcagc ccgtggacat cgatccagcc  240
accgttccta aaccgaaccg ccgtaacgta agggtaagcg acgacactca gacggtggtg  300
actcgtcggc gtcgagaaaa gataagcgag aagatccgaa tattgaagag gatggtgcca  360
ggcggtgcga agatggacac agcctccatg ctcgacgaag ccatccgtta taccaagttc  420
ttgaaacggc aggtgaagct tcttcagcct cactctcagc ttggagctcc tatgtctgac  480
ccctcttgcc tttgttatta ccacaactcc caaacctaa                         519

SEQ ID NO: 16           moltype = AA  length = 172
FEATURE                 Location/Qualifiers
source                  1..172
                        mol_type = protein
                        organism = synthetic construct
SEQUENCE: 16
MNWNKPNDLI TQEYPFLHDP HLMIDPPPET LSHFQPPPTL FSGHGGEEEE EEDNEEEEMD   60
AMKEMQYTIA AMQPVDIDPA TVPKPNRRNV RVSDDTQTVV TRRRREKISE KIRILKRMVP  120
GGAKMDTASM LDEAIRYTKF LKRQVKLLQP HSQLGAPMSD PSCLCYYHNS QT          172

SEQ ID NO: 17           moltype = DNA  length = 747
FEATURE                 Location/Qualifiers
source                  1..747
```

```
                        mol_type = genomic DNA
                        organism = Thlaspi arvense
SEQUENCE: 17
atggaagagg gtgggagtag tcacgacgca gagagtagca agaagatagg gagagggaag    60
atagagataa agaggataga gaacacaacg aatcgtcaag taactttctg caaacgacgc   120
aatggtcttc tcaagaaagc ttatgagctc tctgtcttgt gtgatgccga agttgccctc   180
gttatcttct ccactcgtgg ccgtctctat gagtatgcca acaacagtgt gaagggtaca   240
attgaaaggt acaagaaagc ttgttcagat gccgtcaatc cccctccgt caccgaagct    300
aatactcagt actatcagca agaagcctct aagcttcgga ggcagattcg agacattcag   360
aactcaaaca ggcatattgt tggggaatca cttggttcct tgaacttcaa ggaactcaaa   420
aacctcgaag gacgccttga aaaaggaatt agccgcgtcc gatccaagaa gaatgagttg   480
ttagtggcag agattgagta tatgcagaag agggaaatgg atttgcaaca cgataacatg   540
tacctgcgag ctaagatatc cgaaggcgtg aggttgaatc cggaacagca cggatcgagt   600
gtgatacaag aacagcgat ttacgaatcc ggtgtgtctt ctcatgatca gtcgcagcat    660
tataatcgga actatattcc agtgaacctt cttgaaccaa atcagcaatt ctccggtcaa   720
gaccaacctc ctcttcaact tgtttaa                                      747

SEQ ID NO: 18           moltype = AA   length = 248
FEATURE                 Location/Qualifiers
source                  1..248
                        mol_type = protein
                        organism = Thlaspi arvense
SEQUENCE: 18
MEEGGSSHDA ESSKKIGRGK IEIKRIENTT NRQVTFCKRR NGLLKKAYEL SVLCDAEVAL    60
VIFSTRGRLY EYANNSVKGT IERYKKACSD AVNPPSVTEA NTQYYQQEAS KLRRQIRDIQ   120
NSNRHIVGES LGSLNFKELK NLEGRLEKGI SRVRSKKNEL LVAEIEYMQK REMDLQHDNM   180
YLRAKISEGV RLNPEQHGSS VIQGTAIYES GVSSHDQSQH YNRNYIPVNL LEPNQQFSGQ   240
DQPPLQLV                                                           248

SEQ ID NO: 19           moltype = DNA   length = 747
FEATURE                 Location/Qualifiers
source                  1..747
                        mol_type = other DNA
                        organism = synthetic construct
SEQUENCE: 19
atggaagagg gtgggaatag tcacgacgca gagagtagca agaagatagg gagagggaag    60
atagagataa agaggataga gaacacaacg aatcgtcaag taactttctg caaacgacgc   120
aatggtcttc tcaagaaagc ttatgagctc tctgtcttgt gtgatgccga agttgccctc   180
gttatcttct ccactcgtgg ccgtctctat gagtatgcca acaacagtgt gaagggtaca   240
attgaaaggt acaagaaagc ttgttcagat gccgtcaatc cccctccgt caccgaagct    300
aatactcagt actatcagca agaagcctct aagcttcgga ggcagattcg agacattcag   360
aactcaaaca ggcatattgt tggggaatca cttggttcct tgaacttcaa ggaactcaaa   420
aacctcgaag gacgccttga aaaaggaatt agccgcgtcc gatccaagaa gaatgagttg   480
ttagtggcag agattgagta tatgcagaag agggaaatgg atttgcaaca cgataacatg   540
tacctgcgag ctaagatatc cgaaggcgtg aggttgaatc cggaacagca cggatcgagt   600
gtgatacaag aacagcgat ttacgaatcc ggtgtgtctt ctcatgatca gtcgcagcat    660
tataatcgga actatattcc agtgaacctt cttgaaccaa atcagcaatt ctccggtcaa   720
gaccaacctc ctcttcaact tgtttaa                                      747

SEQ ID NO: 20           moltype = AA   length = 248
FEATURE                 Location/Qualifiers
source                  1..248
                        mol_type = protein
                        organism = synthetic construct
SEQUENCE: 20
MEEGGNSHDA ESSKKIGRGK IEIKRIENTT NRQVTFCKRR NGLLKKAYEL SVLCDAEVAL    60
VIFSTRGRLY EYANNSVKGT IERYKKACSD AVNPPSVTEA NTQYYQQEAS KLRRQIRDIQ   120
NSNRHIVGES LGSLNFKELK NLEGRLEKGI SRVRSKKNEL LVAEIEYMQK REMDLQHDNM   180
YLRAKISEGV RLNPEQHGSS VIQGTAIYES GVSSHDQSQH YNRNYIPVNL LEPNQQFSGQ   240
DQPPLQLV                                                           248

SEQ ID NO: 21           moltype = DNA   length = 741
FEATURE                 Location/Qualifiers
source                  1..741
                        mol_type = genomic DNA
                        organism = Thlaspi arvense
SEQUENCE: 21
atggagggtg gtgcgagtaa tgaagtagca gagagcagca agaagatagg gagagggaag    60
atagagataa agaggataga gaatactacg aatcgtcaag taactttctg caaacgacgc   120
aatggttttgc tcaagaaagc ttacgagctc tccgtcttgt gtgatgcgga ggttgctctc   180
gtcatattct ccactcgagg tcgtctctac gagtacgcca acaacagtgt aagaggaacg   240
atcgaaaggt acaagaaagc ttgctccgac gccgtaatc ctccttccgt caccgaagct    300
aatactcagt attatcagca agagtcgtcg aagctacgga gacagattcg agacattcag   360
aatctgaaca gacacattct tggtagtct cttggttcct tgaatctcaa ggaactaaag   420
aacctcgaag gtaggcttga gaaaggcatc agtcgcgtcc gctccaagaa gcacgagatg   480
ttagttgcag agatagagta catgcaaaaa agggaaatcg agctgcaaaa cgataacatg   540
tatctccgat ccaagattac ggaaaggca ggagtacagc agcaggaatc gagtgtgata   600
catcaaggaa cggtttacga gtcgggtgta tcgtcttctc atcagactga gcagtataac   660
cggagttata ttccggttaa tctgctcgaa ccaaatccga attcctccga ccaagaccaa   720
```

```
ccacctctcc aacttgtcta a                                              741

SEQ ID NO: 22            moltype = AA   length = 246
FEATURE                  Location/Qualifiers
source                   1..246
                         mol_type = protein
                         organism = Thlaspi arvense
SEQUENCE: 22
MEGGASNEVA ESSKKIGRGK IEIKRIENTT NRQVTFCKRR NGLLKKAYEL SVLCDAEVAL      60
VIFSTRGRLY EYANNSVRGT IERYKKACSD AVNPPSVTEA NTQYYQQESS KLRRQIRDIQ     120
NLNRHILGES LGSLNLKELK NLEGRLEKGI SRVRSKKHEM LVAEIEYMQK REIELQNDNM     180
YLRSKITERA GVQQQESSVI HQGTVYESGV SSSHQTEQYN RSYIPVNLLE PNPNSSDQDQ     240
PPLQLV                                                                246

SEQ ID NO: 23            moltype = DNA   length = 741
FEATURE                  Location/Qualifiers
source                   1..741
                         mol_type = other DNA
                         organism = synthetic construct
SEQUENCE: 23
atggagggtg gtgcgagtaa tgaagtagca gagagcagca agaagatagg gagagggaag      60
atagagataa agaggataga gaatactacg aatcgtcaag taacttttctg caaacgacgc    120
aatggtttgc tcaagaaagc ttacgagctc tccgtcttgt gtgatgcgga ggttactctc    180
gtcatattct ccactcgagg tcgtctctac gagtacgcca acaacagtgt aagaggaacg    240
atcgaaaggt acaagaaagc ttgctccgac gccgtgaatc ctccttccgt caccgaagct    300
aatactcagt attatcagca agagtcgtcc aagctacgga gacagattcg agacattcag    360
aatctgaaca gacacattct tggtgagtct cttggttcct tgaatctcaa ggaactaaag    420
aacctcgaag gtaggcttga aaaggcatc agtcgcgtcc gctccaagaa gcacgagatg    480
ttagttgcag agatagagta catgcaaaaa agggaaatcg agctgcaaaa cgataacatg    540
tatctccgat ccaagattac ggaaagggca ggagtacagc agcaggaatc gagtgtgtaa    600
catcaaggaa cggtttacga gtcgggtgta tcgtcttctc atcagactgg gcagtataac    660
cggagttata ttccggttaa tctgctcgaa ccaaatccga attcctccga ccaagaccaa    720
ccacctctcc aacttgtcta a                                              741

SEQ ID NO: 24            moltype = AA   length = 246
FEATURE                  Location/Qualifiers
source                   1..246
                         mol_type = protein
                         organism = synthetic construct
SEQUENCE: 24
MEGGASNEVA ESSKKIGRGK IEIKRIENTT NRQVTFCKRR NGLLKKAYEL SVLCDAEVTL      60
VIFSTRGRLY EYANNSVRGT IERYKKACSD AVNPPSVTEA NTQYYQQESS KLRRQIRDIQ     120
NLNRHILGES LGSLNLKELK NLEGRLEKGI SRVRSKKHEM LVAEIEYMQK REIELQNDNM     180
YLRSKITERA GVQQQESSVI HQGTVYESGV SSSHQTEQYN RSYIPVNLLE PNPNSSDQDQ     240
PPLQLV                                                                246

SEQ ID NO: 25            moltype = DNA   length = 1320
FEATURE                  Location/Qualifiers
source                   1..1320
                         mol_type = genomic DNA
                         organism = Thlaspi arvense
SEQUENCE: 25
atgttacggg aatcagacgg tgagatgagc ttagagacga cgaactcgcc gattagcagc      60
ggaacagaga gctgcagcag tttcagccgg ttatctttcg acgcgccgcc gtcaaccacc    120
gcgattatcc ccgaggaaga gagccttctc tctattaaac cgcaccgatc ctccgattct    180
gcatactcgg agatccgacg gcggcgaaaa caaggcctca ccttccgaga ttttcgactc    240
atgcgtcgaa tcggcgccgg agacatcggg accgtgtact tgtgccgtct cgccggagac    300
gaagaagaga gccggagctc gtatttcgcg atgaaagtgg tggacaaaga agcgcttgcg    360
atgaagaaga agatgcacag agcagagatg gagaagacga ttctgaagat gcttgaccat    420
ccgttttttgc cgactcttta cgccgagttt gacgcatcgc attctctttg catcgtcatg    480
gagtattgct ccggcggaga tttgcactcc ctccgtcaca aacagctcaa ccgcagattc    540
tcccttttcct ccgccagatt ttacgcggct gaagttcttg tggcgctgga atatctacac    600
atgctgggta tcatctacag agatctgaag cctgaaaata tcttagttag atcggacggt    660
cacattatgc tctctgactt tgatctctcc ttatgctcag atcaatcgc agccgttgaa    720
tcctccacat cttcaccgga gaatcaaccc cgttcttccc ggcgccgact cactcgactc    780
tctaggatct tccaccgagt cttgcggtcc aaaaaggttc agacgctcga accgaaccgt    840
ctctttgttg ccgaaccggt caccgctcgg tccggttcgt tgttggtac gcatgaatac    900
gtggcaccag aagtcgcctc aggtgggtct catggaaatg ccgttgactg gtgggccttc    960
ggagtattcc tctacgagat gatctacgg cggactccat tcgccgcgcc gacgaatgac   1020
gtcatccttc gtaacatcgt gaagagaccg ttgagtttcc cgaccgattc gccgtcgacg   1080
atgttcgagc ttcacgcgcg gggattgatc tccgggttgc tcaacaagga tccgaacaaa   1140
cgactcgggg cacggcgagg cgcggcggag gttaaagtgc atccgttttt caaaggtcta   1200
aactttgcgc tcattcgtac attaactccg ccggagattc cctccgaggt caggatccg   1260
aagaaatcgt cgacgttcgg tggtagagct agtaaaccag cggcgttcga ttactttttga   1320

SEQ ID NO: 26            moltype = AA   length = 439
FEATURE                  Location/Qualifiers
source                   1..439
                         mol_type = protein
```

```
                        organism = Thlaspi arvense
SEQUENCE: 26
MLRESDGEMS LETTNSPISS GTESCSSFSR LSFDAPPSTT AIIPEEESLL SIKPHRSSDF    60
AYSEIRRRRK QGLTFRDFRL MRRIGAGDIG TVYLCRLAGD EEESRSSYFA MKVVDKEALA   120
MKKKMHRAEM EKTILKMLDH PFLPTLYAEF DASHFSCIVM EYCSGGDLHS LRHKQLNRRF   180
SLSSARFYAA EVLVALEYLH MLGIIYRDLK PENILVRSDG HIMLSDFDLS LCSDSIAAVE   240
SSTSSPENQP RSSRRRLTRL SRIFHRVLRS KKVQTLEPNR LFVAEPVTAR SGSFVGTHEY   300
VAPEVASGGS HGNAVDWWAF GVFLYEMIYG RTPFAAPTND VILRNIVKRP LSFPTDSPST   360
MFELHARGLI SGLLNKDPNK RLGSRRGAAE VKVHPFFKGL NFALIRTLTP PEIPSEVRIP   420
KKSSTFGGRA SKPAAFDYF                                                439

SEQ ID NO: 27           moltype = DNA   length = 1320
FEATURE                 Location/Qualifiers
source                  1..1320
                        mol_type = other DNA
                        organism = synthetic construct
SEQUENCE: 27
atgttacggg aatcagacgg tgagatgagc ttagagacga cgaactcgcc gattagcagc    60
ggaacagaga gctgcagcag tttcagccgg ttatctttcg acgcgccgcc gtcaaccacc   120
gcgattatcc ccgaggaaga gagccttctc tctattaaac cgcaccgatc ctccgatttc   180
gcatactcgg agatccgacg gcggcggaaa caaggcctca ccttccgaga ttttcgactc   240
atgcgtcgaa tcggcgccgg agacatcggg accgtgtact tgtgccgtct cgccggagac   300
gaagaagaga gccggagctc gtatttcgcg atgaaagtgg tggacaaaga agcgcttgcg   360
atgaagaaga gatgcacag agcagagatg gagaagacga ttctgaagat gcttgaccat   420
ccgtttttgc cgactcttta cgccgagttt gacgcatcgc atttctctta catcgtcatg   480
gagtattgct ccggcggaga tttgcactcc ctccgtcaca aacagctcaa ccgcagattc   540
tccctttcct ccgccagatt ttacgcggct gaagttcttg tggcgctgga atatctacac   600
atgctgggta tcatctacag agatctgaag cctgaaaata tcttagttag atcggacggt   660
cacattatgc tctctgactt tgatctctcc ttatgctccg actcaatcgc agccgttgaa   720
tcctccacat cttcaccgga gaatcaaccc cgttcttccc gacgccgcct cactcgactc   780
tctaggatct tccaccgagt cttgcgtgcc aaaaaggttc agacgctcga accgaaccgt   840
ctctttgttg ccgaaccggt caccgctcgg tccggttcgt tgttggtac gcatgaatac    900
gtggcaccag aagtcgcctc aggtgggtct catggaaatg ccgttgactg gtgggccttc   960
ggagtattcc tctacgagat gatctaccgg cggactccaa tcgccgcgcc gacgaatgac  1020
gtcatccttc gtaacatcgt gaagagaccg ttgagtttcc cgaccgattc gccgtcgacg  1080
atgttcgagc ttcacgcgcg gggattgatc tccgggttgc tcaacaagga tccgaacaaa  1140
cgactcgggt cacggcgagg cgcggcggag gttaaagtgc atccgttttt caaaggtcta  1200
aactttgcgc tcattcgtac attaactccg ccggagattc cctccgaggt caggataccg  1260
aagaaatcgt cgacgttcgg tggtagagct agtaaaccag cggcgttcga ttactttga   1320

SEQ ID NO: 28           moltype = AA   length = 439
FEATURE                 Location/Qualifiers
source                  1..439
                        mol_type = protein
                        organism = synthetic construct
SEQUENCE: 28
MLRESDGEMS LETTNSPISS GTESCSSFSR LSFDAPPSTT AIIPEEESLL SIKPHRSSDF    60
AYSEIRRRRK QGLTFRDFRL MRRIGAGDIG TVYLCRLAGD EEESRSSYFA MKVVDKEALA   120
MKKKMHRAEM EKTILKMLDH PFLPTLYAEF DASHFSYIVM EYCSGGDLHS LRHKQLNRRF   180
SLSSARFYAA EVLVALEYLH MLGIIYRDLK PENILVRSDG HIMLSDFDLS LCSDSIAAVE   240
SSTSSPENQP RSSRRRLTRL SRIFHRVLRS KKVQTLEPNR LFVAEPVTAR SGSFVGTHEY   300
VAPEVASGGS HGNAVDWWAF GVFLYEMIYG RTPFAAPTND VILRNIVKRP LSFPTDSPST   360
MFELHARGLI SGLLNKDPNK RLGSRRGAAE VKVHPFFKGL NFALIRTLTP PEIPSEVRIP   420
KKSSTFGGRA SKPAAFDYF                                                439

SEQ ID NO: 29           moltype = DNA   length = 1311
FEATURE                 Location/Qualifiers
source                  1..1311
                        mol_type = genomic DNA
                        organism = Thlaspi arvense
SEQUENCE: 29
atggctcgtc gtttcggact tcttgctatc ttcttatgtg ttcttttgat gctctcgtgg    60
tgcgaagctt tgagtagcaa cgttgatgat ggatatggtc atgaagatgg aagcttcgaa   120
tccgatagct tactcaaact taagaacgac gacgacgacg ttcttacctt gaaaagctcc   180
gataaaacca cttccgaatc atcaactgtt agtgttaccg atttcggtgc taaaggagat   240
ggggaaaacg atgatactca ggcccttcaag aaagcatgga gaaagcatg ttcaacaaag   300
ggagttacta gtttcttaat tcctaaagga aagacttatc tccttaagtc tactcgattc   360
agaggcccat gcaaatcttt acgtaacttt cagatcctag gcactttact agcatctaca   420
aaacgatctg attataagaa tgacagaaac cattggcttg tcttggagga cgttaacaat   480
ctatcactgg atggcggctc gacgggaatt attgatggca acggaaaaat ctggtggcaa   540
aattcatgca aaatcgacca atctaagcca tgcacaaaag ccccaacggc tcttactttc   600
tacaacttaa agaatttgaa tgtgaagaat ctgagtgaa aaatgcgca gcagattcag    660
atttcgattg agaaatgcaa caatgttaac gtcaacaatg tcgagatcac tgctcctgac   720
gatgtcccaa acaccgatgg tattcacatc actaactaca aaaacattcg aatctccaat   780
tcagacattg gcacaggtga tgattgcata tccattgagg atggatccca aaatgttcaa   840
atcaatgatt taacttgcgg ccccggtcac gggatcagca ttgggagttt ggggatgac   900
aattcgaaag cttatgtctc ggggattaat gtagatggtc taagctctc ttctactgat   960
aatggagtta gaattaaaac ttaccaggga ggatcaggaa ctgccaagaa cattaaattt  1020
caaaatattc gtatggaaaa tgtcaagaat ccaatcataa tcgaccagaa ctactgcgac  1080
```

```
aaggacaaat gcgaagaaca agaatccgcg gtgcaagtaa acaatgtggt gtaccggaac   1140
ataaccggta cgagcgcaac ggatgtggcg ataatgttta attgcagtga gaaatatcca   1200
tgccaaggga ttgtgcttga aacgtgaat atcgaaggag gaacagcttc ttgcaaaaat   1260
gccaatgtta aggatcaagg cactgtatct cctcagtgct cttccacttg a           1311
```

```
SEQ ID NO: 30          moltype = AA   length = 436
FEATURE                Location/Qualifiers
source                 1..436
                       mol_type = protein
                       organism = Thlaspi arvense
SEQUENCE: 30
MARRFGLLAI FLCVLLMLSW CEALSSNVDD GYGHEDGSFE SDSLLKLKND DDDVLTLKSS    60
DKTTSESSTV SVTDFGAKGD GENDDTQAFK KAWKKACSTK GVTSFLIPKG KTYLLKSTRF   120
RGPCKSLRNF QILGTLSAST KRSDYKNDRN HWLVLEDVNN LSLDGGSTGI IDGNGKIWWQ   180
NSCKIDQSKP CTKAPTALTF YNLKNLNVKN LRVRNAQQIQ ISIEKCNNVN VNNVEITAPD   240
DSPNTDGIHI TNTQNIRISN SDIGTGDDCI SIEDGSQNVQ INDLTCGPGH GISIGSLGDD   300
NSKAYVSGIN VDGAKLSSTD NGVRIKTYQG GSGTAKNIKF QNIRMENVKN PIIIDQNYCD   360
KDKCEEQESA VQVNNVVYRN ITGTSATDVA IMFNCSEKYP CQGIVLENVN IEGGTASCKN   420
ANVKDQGTVS PQCSST                                                   436
```

```
SEQ ID NO: 31          moltype = DNA   length = 1311
FEATURE                Location/Qualifiers
source                 1..1311
                       mol_type = other DNA
                       organism = synthetic construct
SEQUENCE: 31
atggctcgtc gtttcggact tcttgctatc ttcttatgtg ttcttttgat gctctcgtgg    60
tgcgaagctt tgagtagcaa cgttgatgat ggatatggtc atgaagatgg aagcttcgaa   120
tccgatagct tactcaaact taagaacgac gacgacgacg ttcttacctt gaaaagctcc   180
gataaaacca cttccgaatc atcaactgtt agtgttaccg atttcggtgc taaaggagat   240
ggggaaaacg atgatactca ggccttcaag aaagcatgga gaaagcatg ttcaacaaag   300
ggagttacta gtttcttaat tcctaaagga aagacttatc tccttaagtc tactcgattc   360
agaggcccat gcaaatcttt acgtaacttt cagatcctag gcactttatc agcatctaca   420
aaacgatctg attataagaa tgacagaaac cattggcttg tcttgaggac gttaacaat   480
ctatcactgg atggcggctc gacgggaatt ttgatggca acggaaaat ctggtggcaa   540
aattcatgca aaatcgacca atcaagcca tgcacaaaag ccccaacggc tcttactttc   600
tacaacttaa agaatttgaa tgtgaagaat ctgagagtga gaaatgcgca gcagattcag   660
atttcgattg agaaatgcaa caatgttaac gtcaacaatg tcgagatcac tgctcctgac   720
gatagtccca acaccgatgg tattcacatc actaatacac aaaacattcg aatctccaat   780
tcagacattg gcacaggtga tgattgcata tccattgagg atggatccca aaatgttcaa   840
atcaatgatt taacttgcgg ccccggtcac gggatcagca ttgggagttt ggggatgac   900
aattcgaaag cttatgtctc ggggattaat gtagatggtg ctaagctctc ttctactgat   960
aatggagtta gaattaaaac ttaccaggga ggatcaggaa ctgccaagaa cattaaattt  1020
caaaatattc gtatggaaaa tgtcaagaat ccaatcataa tcgaccagaa ctactgcgac  1080
aaggacaaat gcgaagaaca agaatccgcg gtgcaagtaa acaatgtggt gtaccggaac  1140
ataaccggta cgagcgcaac ggatgtggcg ataatgttta attgcagtga gaaatatcca  1200
tgccaaggga ttgtgcttga aacgtgaat atcgaaggag gaacagcttc ttgcaaaaat  1260
gccaatgtta aggatcaagg cactgtatct cctcagtgct cttccacttg a           1311
```

```
SEQ ID NO: 32          moltype = AA   length = 56
FEATURE                Location/Qualifiers
source                 1..56
                       mol_type = protein
                       organism = synthetic construct
SEQUENCE: 32
MARRFGLLAI FLCVLLMLSW CEALSSNVDD GYGHEMEASN PIAYSNLRTT TTTFLP        56
```

```
SEQ ID NO: 33          moltype = DNA   length = 1311
FEATURE                Location/Qualifiers
source                 1..1311
                       mol_type = other DNA
                       organism = synthetic construct
SEQUENCE: 33
atggctcgtc gtttcggact tcttgctatc ttcttatgtg ttcttttgat gctctcgtgg    60
tgcgaagctt tgagtagcaa cgttgatgat ggatatggtc atgaagatgg aagcttcgaa   120
tccgatagct tactcaaact taagaacgac gacgacgacg ttcttacctt gaaaagctcc   180
gataaaacca cttccgaatc atcaactgtt agtgttaccg atttcggtgc taaaggagat   240
ggggaaaacg atgatactca ggccttcaag aaagcatgga gaaagcatg ttcaacaaag   300
ggagttacta gtttcttaat tcctaaagga aagacttatc tccttaagtc tactcgattc   360
agaggcccat gcaaatcttt acgtaacttt cagatcctag gcactttatc agcatctaca   420
aaacgatctg attataagaa tgacagaaac cattggcttg tcttgaggac gttaacaat   480
ctatcactgg atggcggctc gacgggaatt ttgatggca acggaaaat ctggtggcaa   540
aattcatgca aaatcgacca atcaagcca tgcacaaaag ccccaacggc tcttactttc   600
tacaacttaa agaatttgaa tgtgaagaat ctgagagtga gaaatgcgca gcagattcag   660
atttcgattg agaaatgcaa caatgttaac gtcaacaatg tcgagatcac tgctcctgac   720
gatagtccca acaccgatgg tattcacatc actaatacac aaaacattcg aatctccaat   780
tcagacattg gcacaggtga tgattgcata tccattgagg atggatccca aaatgttcaa   840
atcaatgatt taacttgcgg ccccggtcac gggatcagca ttgggagttt ggggatgac   900
aattcgaaag cttatgtctc ggggattaat gtagatggtg ctaagctctc ttctactgat   960
```

```
aatggagtta gaattaaaac ttaccaggga ggatcaggaa ctgccaagaa cattaaattt   1020
caaaatattc gtatgaaaaa tgtcaagaat ccaatcataa tcgaccagaa ctactgcgac   1080
aaggacaaat gcgaagaaca agaatccgcg gtgcaagtaa acaatgtggt gtaccggaac   1140
ataaccggta cgagcgcaac ggatgtggcg ataatgttta attgcagtga gaaatatcca   1200
tgccaaggga ttgtgcttga gaacgtgaat atcgaaggag aacagcttc ttgcaaaaat    1260
gccaatgtta aggatcaagg cactgtatct cctcagtgct cttccacttg a            1311
```

```
SEQ ID NO: 34           moltype = AA   length = 55
FEATURE                 Location/Qualifiers
source                  1..55
                        mol_type = protein
                        organism = synthetic construct
SEQUENCE: 34
MARRFGLLAI FLCVLLMLSW CEALSSNVDD GYGQMEASNP IAYSNLRTTT TTFLP         55

SEQ ID NO: 35           moltype = AA   length = 373
FEATURE                 Location/Qualifiers
source                  1..373
                        mol_type = protein
                        organism = Arabidopsis thaliana
SEQUENCE: 35
MISQREEREE KKQRVMGDKK LISSSSSSSV YDTRINHHLH HPPSSSDEIS QFLRHIFDRS    60
SPLPSYYSPA TTTTTASLIG VHGSGDPHAD NSRSLVSHHP PSDSVLMSKR VGDFSEVLIG    120
GGSGSAAACF GFSGGGNNNN VQGNSSGTRV SSSSVGASGN ETDEYDCESE EGGEAVVDEA    180
PSSSKSGPSSR SSSKRCRAAE VHNLSEKRRR SRINEKMKAL QSLIPNSNKT DKASMLDEAI   240
EYLKQLQLQV QMLTMRNGIN LHPLCLPGTT LHPLQLSQIR PPEATNDPLL NHTNQFASTS    300
NAPEMINTVA SSYALEPSIR SHFGPFPLLT SPVEMSREGG LTHPRLNIGH SNANITGEQA    360
LFDGQPDLKD RIT                                                      373

SEQ ID NO: 36           moltype = AA   length = 297
FEATURE                 Location/Qualifiers
source                  1..297
                        mol_type = protein
                        organism = Glycine max
SEQUENCE: 36
MAGDIGRALP PPDSEEFSTL FNQLLHNSPP LGMDPNHSPS DFTPHNTTIN INSNNNNNTV    60
PSSPSNFNFS DPHHYIPASD ATTFKQHNIN HNNNHTPDFT SSHVEKSVEA SKPVPPPRSS    120
SKRSRAAEFH NLSEKRRRSR INEKMKALQN LIPNSNKTDK ASMLDEAIEY LKQLQLQVQM    180
LMMRNGLSLH PMSLPGGLRP MIMPQTGLNL DGSNGFQNST CAIASSSNDE SLVRHAFSFP    240
KQCSISNKSI GVPSVKNIAT SDTSSTFHPS IKDALYGNMP QPFMDTTKIG KPSPDVS       297

SEQ ID NO: 37           moltype = AA   length = 188
FEATURE                 Location/Qualifiers
source                  1..188
                        mol_type = protein
                        organism = Oryza sativa
SEQUENCE: 37
EAGGSSEPEA AAGARPRGGS GSKRSRAAEV HNLSEKRRRS KINEKMKALQ SLIPNSNKTD    60
KASMLDEAIE YLKQLQLQVQ MLSMRNGVYL NPSYLSGALE PAQASQMFAA LGGNNVTVVH   120
PGTVMPPVNQ SSGAHHLFDP LNSPPQNQPQ SLILPSVPST AIPEPPFHLE SSQSHLRQFQ   180
LPGSSEVI                                                           188

SEQ ID NO: 38           moltype = AA   length = 314
FEATURE                 Location/Qualifiers
source                  1..314
                        mol_type = protein
                        organism = Solanum lycopersicum
SEQUENCE: 38
MADPYRTNPH ASSSLESEDM SSFFLNFLQG TPASSSATAA AGFYNRSGPA PVAESSSSLN    60
FSDPGRFYAA EFKEGVENVF ASAGLGECDG MNSANRREFL EDDKVDNFGF SSEECDGLDM   120
PSDPTHPRSS KRSRSAEVHN LSEKRRRSRI NEKLKALQNL IPNSNKTDKA SMLDEAIEYL   180
KQLQLQVQIL TLRNGLSLYP GYVPGSLQSV QLPSGNEFDG RSFMLSANGG ATLPVNREMP   240
QTAFEISNQN PSGKPTITSH NTENAVALET TIQNHYGLLN HLASSKDMCR DNTLSRLHLD   300
MSCSGNNSSS GVSS                                                    314

SEQ ID NO: 39           moltype = AA   length = 198
FEATURE                 Location/Qualifiers
source                  1..198
                        mol_type = protein
                        organism = Arabidopsis thaliana
SEQUENCE: 39
MENGMYKKKG VCDSCVSSKS RSNHSPKRSM MEPQPHHLLM DWNKANDLLT QEHAAFLNDP    60
HHLMLDPPPE TLIHLDEDEE YDEDMDAMKE MQYMIAVMQP VDIDPATVPK PNRRNVRISD   120
DPQTVVARRR RERISEKIRI LKRIVPGGAK MDTASMLDEA IRYTKFLKRQ VRILQPHSQI   180
GAPMANPSYL CYYHNSQP                                                198

SEQ ID NO: 40           moltype = AA   length = 270
FEATURE                 Location/Qualifiers
source                  1..270
```

```
                        mol_type = protein
                        organism = Glycine max
SEQUENCE: 40
MDTNTSTLFT NVNSTWNLEK METNEQQQQH DDHSIILQVQ DPMGSGIWPI NNYQNLLQMH    60
QTPNTTTSST VIVPPSSSSG FLGDILGVHH NLEEDEEPEE ELGAMKEMMY KIAAMQPVDI   120
DPATIRKPKR RNVRISDDPQ SVAARHRRER ISEKIRILQR LVPGGTKMDT ASMLDEAIRY   180
VKFLKRQIRL LQSIPQPSRQ PPQCIGVAST TPHASTLLLA PSSDWPFAPN VLPRSTAVSA   240
SMDMSAGLGF DGHAHACDGS SSFNHHEVIS                                    270

SEQ ID NO: 41           moltype = AA   length = 270
FEATURE                 Location/Qualifiers
source                  1..270
                        mol_type = protein
                        organism = Oryza sativa
SEQUENCE: 41
MDTNTSTLFT NVNSTWNLEK METNEQQQH DDHSIILQVQ DPMGSGIWPI NNYQNLLQMH     60
QTPNTTTSST VIVPPSSSSG FLGDILGVHH NLEEDEEPEE ELGAMKEMMY KIAAMQPVDI   120
DPATIRKPKR RNVRISDDPQ SVAARHRRER ISEKIRILQR LVPGGTKMDT ASMLDEAIRY   180
VKFLKRQIRL LQSIPQPSRQ PPQCIGVAST TPHASTLLLA PSSDWPFAPN VLPRSTAVSA   240
SMDMSAGLGF DGHAHACDGS SSFNHHEVIS                                    270

SEQ ID NO: 42           moltype = AA   length = 283
FEATURE                 Location/Qualifiers
source                  1..283
                        mol_type = protein
                        organism = Solanum lycopersicum
SEQUENCE: 42
MDINHINKLT TSTWDPTMSN MDNQQVFRDQ QQQQQPCLSS IPNDHIYHEH HHHQQQFHFE    60
HNPIWPSFPL QNPQHHHLPS SSTQQQQQQQ EEVVVVPFDH VLNNHVQTLI EDQEHDDQDE   120
DEEEEEELGA MKEMMFKIAS MQPVDIDPST IRKPKRRNVR ISNDPQSVAA RLRRERISEK   180
IRILQRLVPG GTKMDTASML DEAIRYVKFL KRQIRQLQSS NHNLPPAQIP VSSCPNNENW   240
ANNIVTPSTK GLILGSSSST TTNNVTTFVG NTTLDPPYEV IGN                     283

SEQ ID NO: 43           moltype = DNA   length = 108
FEATURE                 Location/Qualifiers
variation               54
                        note = n = a, c, t or g
source                  1..108
                        mol_type = other DNA
                        organism = synthetic construct
SEQUENCE: 43
atccttgtct gtgttggtgg taatcagcat tgggtttagg cctaaaccat tcangactgc    60
taaagtctgc attatccatt gtatgatcaa ataagcgctg agttttac                108

SEQ ID NO: 44           moltype = DNA   length = 108
FEATURE                 Location/Qualifiers
source                  1..108
                        mol_type = other DNA
                        organism = synthetic construct
SEQUENCE: 44
atccttgtct gtgttggtgg taatnncatt tgggcntang ccnntcccga ncgcgacngc    60
cagcgtcagc cntagcnngn gcangaacnc ncngacgntg antttnan                108

SEQ ID NO: 45           moltype = DNA   length = 107
FEATURE                 Location/Qualifiers
source                  1..107
                        mol_type = other DNA
                        organism = synthetic construct
SEQUENCE: 45
atccttgtct gtgttggtga taangcnttg aggncaagcc cantccagnc ngganngntn    60
ngnnctnncn tatgcatngt nngatnannn ntgagctgan ntttana                 107

SEQ ID NO: 46           moltype = DNA   length = 108
FEATURE                 Location/Qualifiers
source                  1..108
                        mol_type = genomic DNA
                        organism = Thlaspi arvense
SEQUENCE: 46
atccttgtct gtgttggtgg taatcgcatt gggtttaggc ctaaaccatt catgactgct    60
aaagtctgca ttatccattg tatgatcaaa taagcgctga gttttaca                108

SEQ ID NO: 47           moltype = AA   length = 438
FEATURE                 Location/Qualifiers
source                  1..438
                        mol_type = protein
                        organism = Arabidopsis thaliana
SEQUENCE: 47
MLRESDGEMS LGTTNSPISS GTESCSSFSR LSFDAPPSTI PEEESFLSLK PHRSSDFAYA    60
EIRRRKKQGL TFRDFRLMRR IGAGDIGTVY LCRLAGDEEE SRSSYFAMKV VDKEALALKK   120
```

```
KMHRAEMEKT ILKMLDHPFL PTLYAEFEAS HFSCIVMEYC SGGDLHSLRH RQPHRRFSLS    180
SARFYAAEVL VALEYLHMLG IIYRDLKPEN ILVRSDGHIM LSDFDLSLCS DSIAAVESSS    240
SSPENQQLRS PRRFTRLARL FQRVLRSKKV QTLEPTRLFV AEPVTARSGS FVGTHEYVAP    300
EVASGGSHGN AVDWWAFGVF LYEMIYGKTP FVAPTNDVIL RNIVKRQLSF PTDSPATMFE    360
LHARNLISGL LNKDPTKRLG SRRGAAEVKV HPFFKGLNFA LIRTLTPPEI PSSVVKKPMK    420
SATFSGRSSN KPAAFDYF                                                 438

SEQ ID NO: 48           moltype = AA  length = 452
FEATURE                 Location/Qualifiers
source                  1..452
                        mol_type = protein
                        organism = Glycine max
SEQUENCE: 48
METGGGRDSG MSSETINSST QRTSMSNESV CSTSFSRLSF DLPPPSSSPE TLFVKPHRSS     60
DFAYSAILRR KSALTFRDFH LLRRIGAGDI GTVYLCRLRH DAGDEDDDED PCFYAMKVVD    120
KEAVALKKKA QRAEMERKIL KMVDHPFLPT LYAEFEASNF SCIVMEYCSG GDLHSLQHNH    180
PNNRFSLSSA RFYAAEVLVA LEYLHMLGII YRDLKPENVL VRSDGHIMLS DFDLSLCSDA    240
IPAVESPDCS LDPAFAPALR YTRQYSTPFS CLSNRVFRSR KVQTLQPNRL FVAEPVGARS    300
CSFVGTHEYV SPEVASGNSH GNAVDWWSFG IFIYEMVYGR TPFAGSSNEA TLRSIIKKPL    360
AFPTSTPSST LEMHARDLIS GLLNKDPNRR LGSKRGSADV KKHPFFAGLN LALIRTVTPP    420
EVPSLRRHKT TPFYYPANVN NSRQQLTAFD YF                                  452

SEQ ID NO: 49           moltype = AA  length = 484
FEATURE                 Location/Qualifiers
source                  1..484
                        mol_type = protein
                        organism = Oryza sativa
SEQUENCE: 49
MVAAVRAPVK PEMVELSPAA MERYSSDADT TAPNSSLSSA ASSTGSLARC SSLSRLSFDC     60
SPSAAVAAAA TSCSPPRASV LLRPHRSGDV AWAAIRAAST TSAAPLGPRD FKLVRRIGGG    120
DIGTVYLCRL RSSPERESPC MYAMKVVDRR AVARKQKLGR AAAEKRILRQ LDHPFLPTLF    180
ADFDATPHFS CAVMEFCPGG DLHSLRHRMP SRRFPLPSAR FYAAEVLLAI EYLHMMGIVY    240
RDLKPENVLI RADGHIMLTD FDLSLQSTTS PSLDGDTDTD DEASGGASCF PDHLLRFKRR    300
RNAVAAPRPR FVAEPVDARS CSFVGTHEYV APEVASGGAH GAAVDWWAYG VFLYELIYGR    360
TPFAGATNEA TLRNIVRRPL AFPSGSGSCG PADADARDLI ARLLAKDPAA RLGSRRGAAD    420
VKSHPFFKSL NLALLRSSRP PVVPGAGAGA APLHRSQSCK AAPTTPPPPT TTKPANATAR    480
FDLF                                                                484

SEQ ID NO: 50           moltype = AA  length = 462
FEATURE                 Location/Qualifiers
source                  1..462
                        mol_type = protein
                        organism = Solanum lycopersicum
SEQUENCE: 50
MATTNRDESD KDSTASSSIT MPESSRRSWM SSTNLSSFSS RRSSISLCNE NPYFSNSHKP     60
HKSNQISWEL IRRIRVESGQ IKLEHFRLLR RVGGGDIGSV YLCEIRNPVV GLPQCFYAMK    120
VVDREAVEIR KKLQRGEMEK EILGIIDHPF LPTLYAQFEA SHYSCLVMEY CPGGDLHAVR    180
QRQPGKRFSI SSAKYAAEI LLALEYLHMM GIVYRDLKPE NVLVRSDGHI MLSDFDLSFK    240
CDEVVPTLVK SKTTKSIAKT PRNSYCAMPI QPVLSCFLSQ KTEQNHENQE EDQEIVAEPI    300
NARSKSFVGT HEYLAPEVIS GQGHGSAVDW WTLGVFLYEL IFGTTPFKGE NNEKTLVNIL    360
KKPLTFPRIA ISSSKEYEEM VKVQDLISRL LVKNPKKRIG SLQGSVEIKK HEFFKGVNWA    420
LIRSIKPPQV PNDLVKMRGV VPKLSKKQRE EPYQIPQYFD YF                       462

SEQ ID NO: 51           moltype = DNA  length = 20
FEATURE                 Location/Qualifiers
source                  1..20
                        mol_type = other DNA
                        organism = synthetic construct
SEQUENCE: 51
gggcaatgtt attacctccg                                                20

SEQ ID NO: 52           moltype = DNA  length = 20
FEATURE                 Location/Qualifiers
source                  1..20
                        mol_type = other DNA
                        organism = synthetic construct
SEQUENCE: 52
ggctctatga cagaccaatc                                                20

SEQ ID NO: 53           moltype = DNA  length = 24
FEATURE                 Location/Qualifiers
source                  1..24
                        mol_type = other DNA
                        organism = synthetic construct
SEQUENCE: 53
attgtgcgat taccaccaac acag                                           24

SEQ ID NO: 54           moltype = DNA  length = 24
FEATURE                 Location/Qualifiers
```

```
source                  1..24
                        mol_type = other DNA
                        organism = synthetic construct
SEQUENCE: 54
aaacctgtgt tggtggtaat cgca                                            24

SEQ ID NO: 55           moltype = DNA   length = 30
FEATURE                 Location/Qualifiers
source                  1..30
                        mol_type = other DNA
                        organism = synthetic construct
SEQUENCE: 55
aggagctaaa catcgaaatt cgttgaagag                                      30

SEQ ID NO: 56           moltype = DNA   length = 30
FEATURE                 Location/Qualifiers
source                  1..30
                        mol_type = other DNA
                        organism = synthetic construct
SEQUENCE: 56
tgtcgcagat actagaggaa catcacatca                                      30

SEQ ID NO: 57           moltype = DNA   length = 20
FEATURE                 Location/Qualifiers
source                  1..20
                        mol_type = other DNA
                        organism = synthetic construct
SEQUENCE: 57
gatggatatg gtcatgaaga                                                 20

SEQ ID NO: 58           moltype = DNA   length = 20
FEATURE                 Location/Qualifiers
source                  1..20
                        mol_type = other DNA
                        organism = synthetic construct
SEQUENCE: 58
tcttcatgac catatccatc                                                 20

SEQ ID NO: 59           moltype = DNA   length = 50
FEATURE                 Location/Qualifiers
source                  1..50
                        mol_type = genomic DNA
                        organism = Thlaspi arvense
SEQUENCE: 59
cttgtctgtg ttggtggtaa tcgcattggg tttaggccta aaccattcat                50

SEQ ID NO: 60           moltype = DNA   length = 50
FEATURE                 Location/Qualifiers
source                  1..50
                        mol_type = other DNA
                        organism = synthetic construct
SEQUENCE: 60
cttgtctgtg ttggtggtaa tcacattggg tttaggccta aaccattcat                50

SEQ ID NO: 61           moltype = DNA   length = 44
FEATURE                 Location/Qualifiers
source                  1..44
                        mol_type = other DNA
                        organism = synthetic construct
SEQUENCE: 61
cttgtctgtg ttggtggtaa tgggtttagg cctaaaccat tcat                      44

SEQ ID NO: 62           moltype = DNA   length = 41
FEATURE                 Location/Qualifiers
source                  1..41
                        mol_type = other DNA
                        organism = synthetic construct
SEQUENCE: 62
cttgtctgtg ttggtggtgg gtttaggcct aaaccattca t                         41

SEQ ID NO: 63           moltype = DNA   length = 45
FEATURE                 Location/Qualifiers
source                  1..45
                        mol_type = other DNA
                        organism = synthetic construct
SEQUENCE: 63
cttgtctgtg ttggtggtaa ttgggtttag gcctaaacca ttcat                     45

SEQ ID NO: 64           moltype = DNA   length = 45
```

```
FEATURE                 Location/Qualifiers
source                  1..45
                        mol_type = other DNA
                        organism = synthetic construct
SEQUENCE: 64
cttgtctgtg ttggtggtgc atgggtttag gcctaaacca ttcat              45

SEQ ID NO: 65           moltype = DNA  length = 47
FEATURE                 Location/Qualifiers
source                  1..47
                        mol_type = other DNA
                        organism = synthetic construct
SEQUENCE: 65
cttgtctgtg ttggtggtaa tcatgggttt aggcctaaac cattcat            47

SEQ ID NO: 66           moltype = DNA  length = 49
FEATURE                 Location/Qualifiers
source                  1..49
                        mol_type = other DNA
                        organism = synthetic construct
SEQUENCE: 66
cttgtctgtg ttggtgatta agcattgggt ttaggcctaa accattcat          49

SEQ ID NO: 67           moltype = DNA  length = 50
FEATURE                 Location/Qualifiers
source                  1..50
                        mol_type = other DNA
                        organism = synthetic construct
SEQUENCE: 67
cttgtctgtg ttggtggtaa tcagcattgg gtttaggcct aaaccattca         50

SEQ ID NO: 68           moltype = DNA  length = 50
FEATURE                 Location/Qualifiers
source                  1..50
                        mol_type = other DNA
                        organism = synthetic construct
SEQUENCE: 68
cttgtctgtg ttggtggtaa tctgcattgg gtttaggcct aaaccattca         50

SEQ ID NO: 69           moltype = DNA  length = 591
FEATURE                 Location/Qualifiers
source                  1..591
                        mol_type = genomic DNA
                        organism = Thlaspi arvense
SEQUENCE: 69
atgtttggct caaaagcaga tccacccata accccaatag tcatgatgga gcctcaacct    60
catcatctcc tcatgaattg gaacaaacct aatgatctca tcacacaaga ataccctttt   120
ctccacgatc ctcatctcat gatagatcca cctcccgaaa ccctaagtca tttccagccc   180
ccgccgacac ttttctccgg tcacggaggg gaggaagaag aagaagaaga taatgaagag   240
gaagagatgg atgcgatgaa ggagatgcag tacacgatcg ctgccatgca gcccgtggac   300
atcgatccag ccaccgttcc taaaccgaac cgccgtaacg taagggtaag cgacgacact   360
cagacggtgg tggctcgtcg gcgtcgagaa aagataagcg agaagatccg aatattgaag   420
aggatggtgc caggcggtgc gaagatggac acagcctcca tgctcgacga agccatccgt   480
tataccaagt tcttgaaacg gcaggtgaag cttcttcagc ctcactctca gcttggagct   540
cctatgtctg accctcttg cctttgttat taccacaact cccaaaccta a             591

SEQ ID NO: 70           moltype = AA  length = 196
FEATURE                 Location/Qualifiers
source                  1..196
                        mol_type = protein
                        organism = Thlaspi arvense
SEQUENCE: 70
MFGSKADPPI TPIVMMEPQP HHLLMNWNKP NDLITQEYPF LHDPHLMIDP PPETLSHFQP    60
PPTLFSGHGG EEEEEEDNEE EEMDAMKEMQ YTIAAMQPVD IDPATVPKPN RRNVRVSDDT   120
QTVVARRRE KISEKIRILK RMVPGGAKMD TASMLDEAIR YTKFLKRQVK LLQPHSQLGA    180
PMSDPSCLCY YHNSQT                                                   196
```